US011743603B2

(12) United States Patent
Minagawa et al.

(10) Patent No.: US 11,743,603 B2
(45) Date of Patent: Aug. 29, 2023

(54) SOLID-STATE IMAGING DEVICE AND INFORMATION PROCESSING METHOD OF SOLID-STATE IMAGING DEVICE

(71) Applicant: Sony Semiconductor Solutions Corporation, Kanagawa (JP)

(72) Inventors: Yusuke Minagawa, Tokyo (JP); Taishin Yoshida, Tokyo (JP); Marie Toyoshima, Kanagawa (JP); Toru Akishita, Tokyo (JP); Tomohiro Morimoto, Kanagawa (JP); Masafumi Kusakawa, Tokyo (JP); Ikuhiro Tamura, Kanagawa (JP); Takahiro Akahane, Tokyo (JP); Eiji Hirata, Tokyo (JP); Yoshinobu Furusawa, Fukuoka (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 909 days.

(21) Appl. No.: 16/477,989

(22) PCT Filed: Nov. 29, 2017

(86) PCT No.: PCT/JP2017/042846
§ 371 (c)(1),
(2) Date: Jul. 15, 2019

(87) PCT Pub. No.: WO2018/135142
PCT Pub. Date: Jul. 26, 2018

(65) Prior Publication Data
US 2019/0347963 A1 Nov. 14, 2019

(30) Foreign Application Priority Data

Jan. 23, 2017 (JP) ................................. 2017-009259

(51) Int. Cl.
H04N 25/00 (2023.01)
G06F 21/72 (2013.01)
(Continued)

(52) U.S. Cl.
CPC ............. H04N 25/00 (2023.01); G06F 21/72 (2013.01); G09C 1/00 (2013.01);
(Continued)

(58) Field of Classification Search
CPC ........ G09C 1/00; G06F 21/72; G06V 10/147; H01L 27/14634; H01L 27/14636;
(Continued)

(56) References Cited

U.S. PATENT DOCUMENTS 10,038,867 B2 * 7/2018 Kim ....................... H04L 9/3278
10,224,769 B2    3/2019 Yamagishi
(Continued)

FOREIGN PATENT DOCUMENTS

CN    1963865    5/2007
CN    102569314  7/2012
(Continued)

OTHER PUBLICATIONS

International Preliminary Report on Patentability dated Aug. 1, 2019 in connection with International Application No. PCT/JP2017/042846.
(Continued)

Primary Examiner — Albert H Cutler
(74) Attorney, Agent, or Firm — Wolf, Greenfield & Sacks, P.C.

(57) ABSTRACT

A solid-state imaging device adapted to encrypt data is described. The solid-state imaging device may include a sensor die comprising an array of imaging pixels formed on a first side of the sensor die and first wiring layers formed on a second side of the sensor die, wherein at least one of the
(Continued)

imaging pixels is configured to generate specific signals; a logic die comprising second wiring layers formed on a first side of the logic die; and an encryption processor on the logic die configured to generate encrypted data using the specific signals. The first side of the logic die may be mounted adjacent to the second side of the sensor die and the first wiring layers electrically connect to the second wiring layers, wherein the at least one of the imaging pixels, the encryption processor, and a connecting conductor in which the specific signals pass through from the at least one of the imaging pixels to the encryption processor are located interior to the solid-state imaging device.

20 Claims, 36 Drawing Sheets

(51) Int. Cl.
| | | |
|---|---|---|
| *G09C 1/00* | (2006.01) | |
| *H01L 27/146* | (2006.01) | |
| *H04N 25/633* | (2023.01) | |
| *H04L 9/32* | (2006.01) | |
| *H04N 25/65* | (2023.01) | |
| *H04N 25/67* | (2023.01) | |
| *H04N 25/79* | (2023.01) | |
| *H04N 25/75* | (2023.01) | |

(52) U.S. Cl.
CPC .. *H01L 27/14634* (2013.01); *H01L 27/14636* (2013.01); *H04N 25/633* (2023.01); *H04L 9/3231* (2013.01); *H04N 25/65* (2023.01); *H04N 25/67* (2023.01)

(58) Field of Classification Search
CPC .......... H01L 27/14601; H04N 5/36963; H04N 5/363; H04N 5/365; H04N 5/379; H04N 5/335; H04N 5/378; H04N 25/00; H04N 25/633; H04N 25/65; H04N 25/67; H04N 25/79; H04N 25/75; H04L 9/3231
See application file for complete search history.

(56) References Cited

U.S. PATENT DOCUMENTS

| | | | |
|---|---|---|---|
| 2001/0025342 A1* | 9/2001 | Uchida | ................. H04L 9/3231 |
| | | | 713/186 |
| 2003/0140240 A1 | 7/2003 | Jaffe | |
| 2009/0141931 A1* | 6/2009 | Yadid-Pecht | .......... H04N 5/232 |
| | | | 348/308 |
| 2012/0153419 A1 | 6/2012 | Itonaga et al. | |
| 2013/0235243 A1* | 9/2013 | Sano | ................. H01L 27/14636 |
| | | | 348/308 |
| 2014/0145288 A1 | 5/2014 | Hayashi | |
| 2014/0247395 A1 | 9/2014 | Van Belle | |
| 2015/0089241 A1 | 3/2015 | Zhao | |
| 2018/0115723 A1* | 4/2018 | Takayanagi | ....... H01L 27/14609 |

FOREIGN PATENT DOCUMENTS

| | | |
|---|---|---|
| CN | 102572314 | 7/2012 |
| CN | 104574380 | 4/2015 |
| EP | 1 263 208 A1 | 12/2002 |
| EP | 1 608 101 A1 | 12/2005 |
| JP | 2004-173154 A | 6/2004 |
| JP | 2011096851 A | 5/2011 |
| JP | 2012532391 A | 12/2012 |
| KR | 20160082788 A | 7/2016 |
| WO | WO-2015068588 A1 | 5/2015 |
| WO | WO-2016167076 A1 | 10/2016 |
| WO | WO 2016/185901 A1 | 11/2016 |

OTHER PUBLICATIONS

International Search Report and Written Opinion dated Feb. 2, 2018 in connection with International Application No. PCT/JP2017/042846.
Communication pursuant to Article 94(3) EPC dated Jun. 9, 2020 in connection with European Application No. 17817911.5.
Cao et al., CMOS image sensor based physical unclonable function for coherent sensor-level authentication. IEEE Transactions on Circuits and Systems I: Regular Papers. Nov. 2015;62(11):2629-40.

* cited by examiner

[Fig. 1]
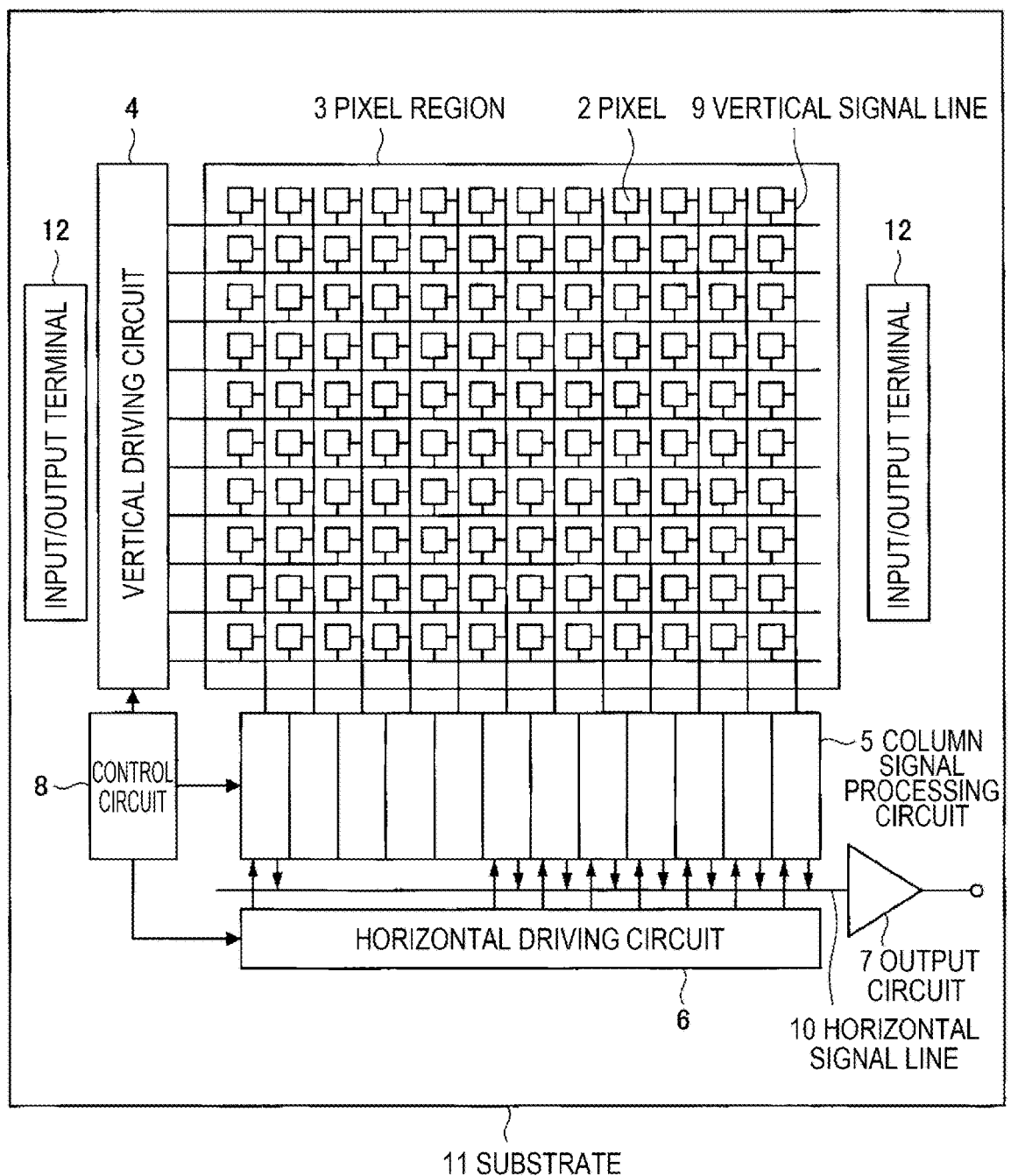

[Fig. 2]
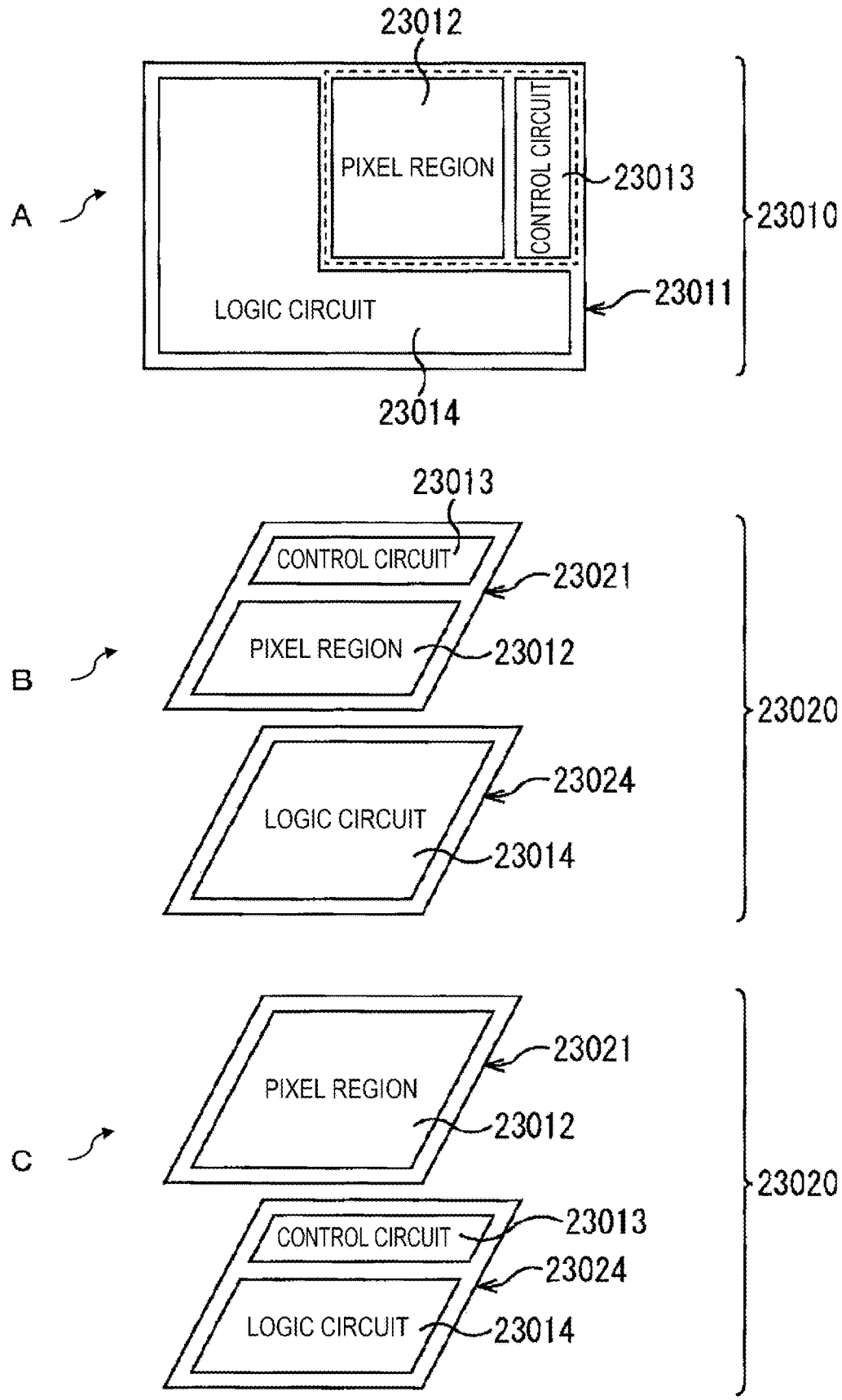

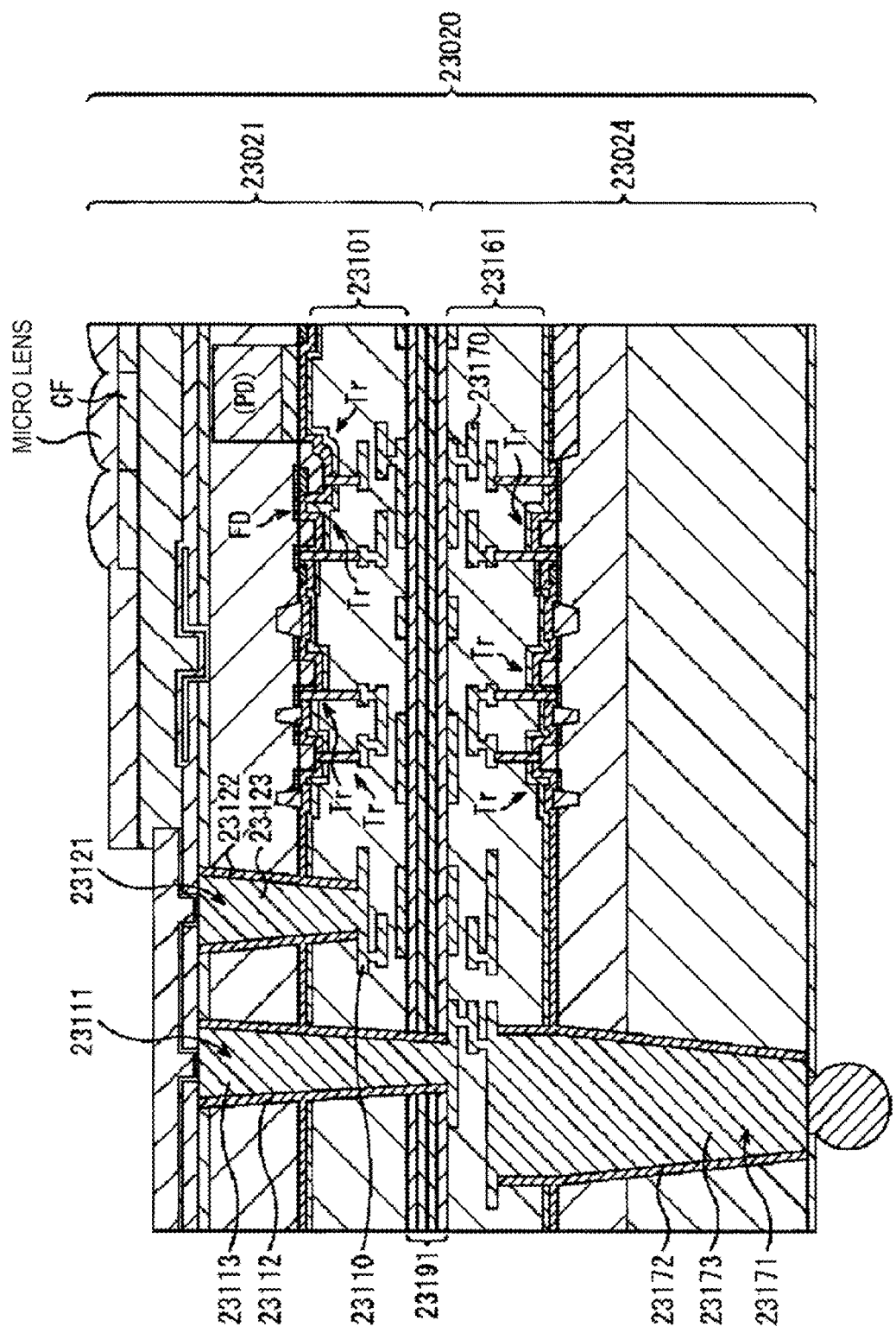
[FIG. 3]

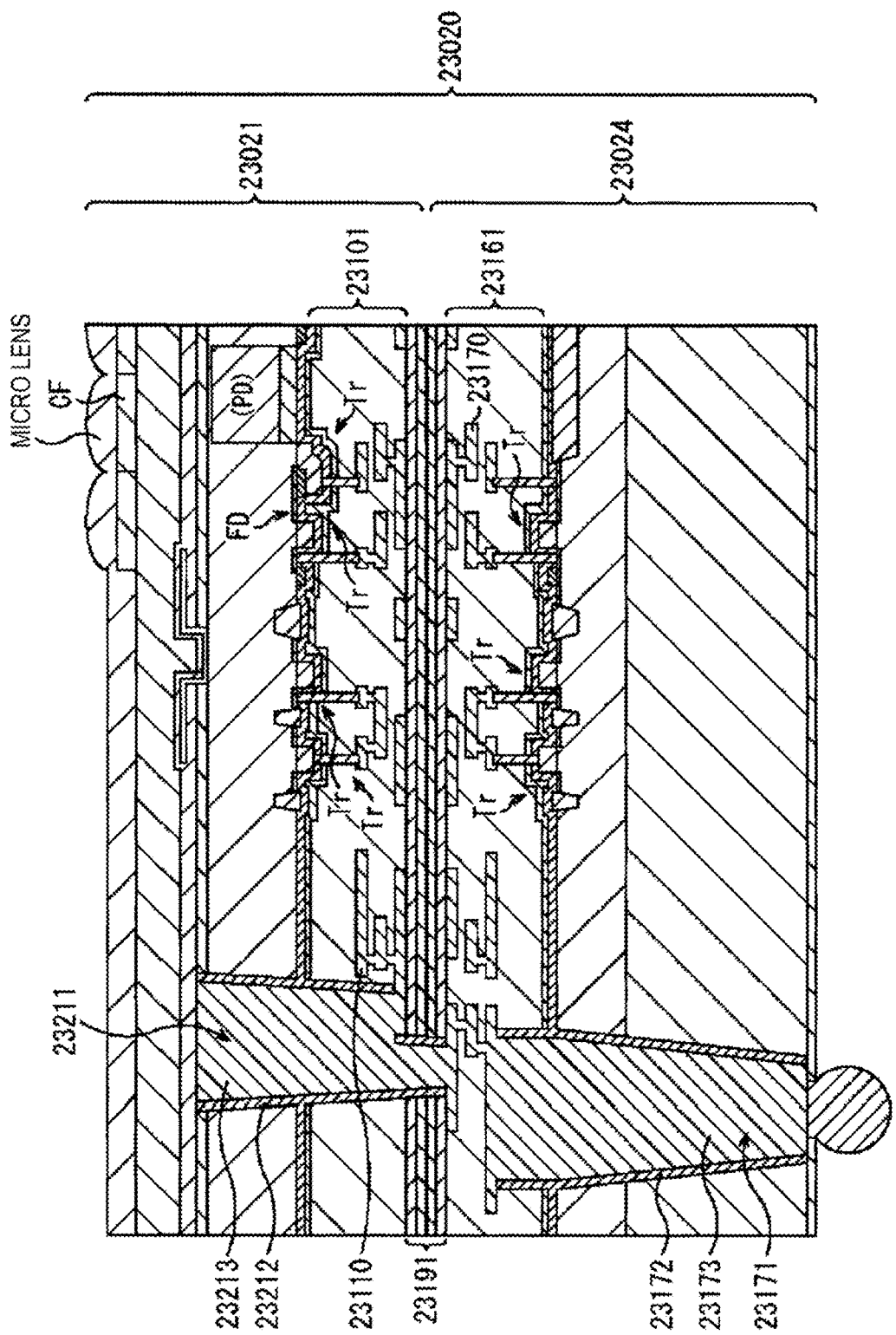

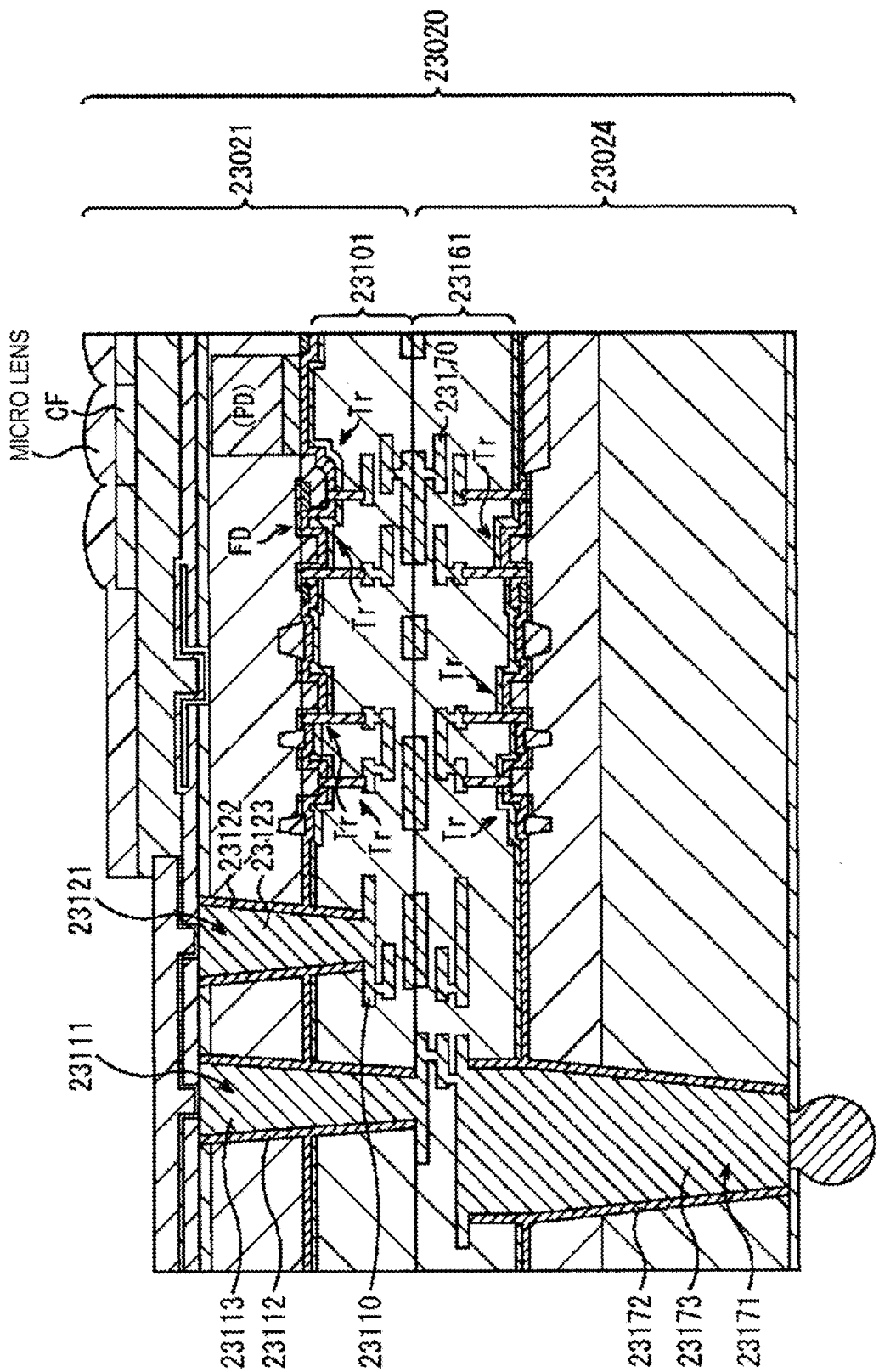

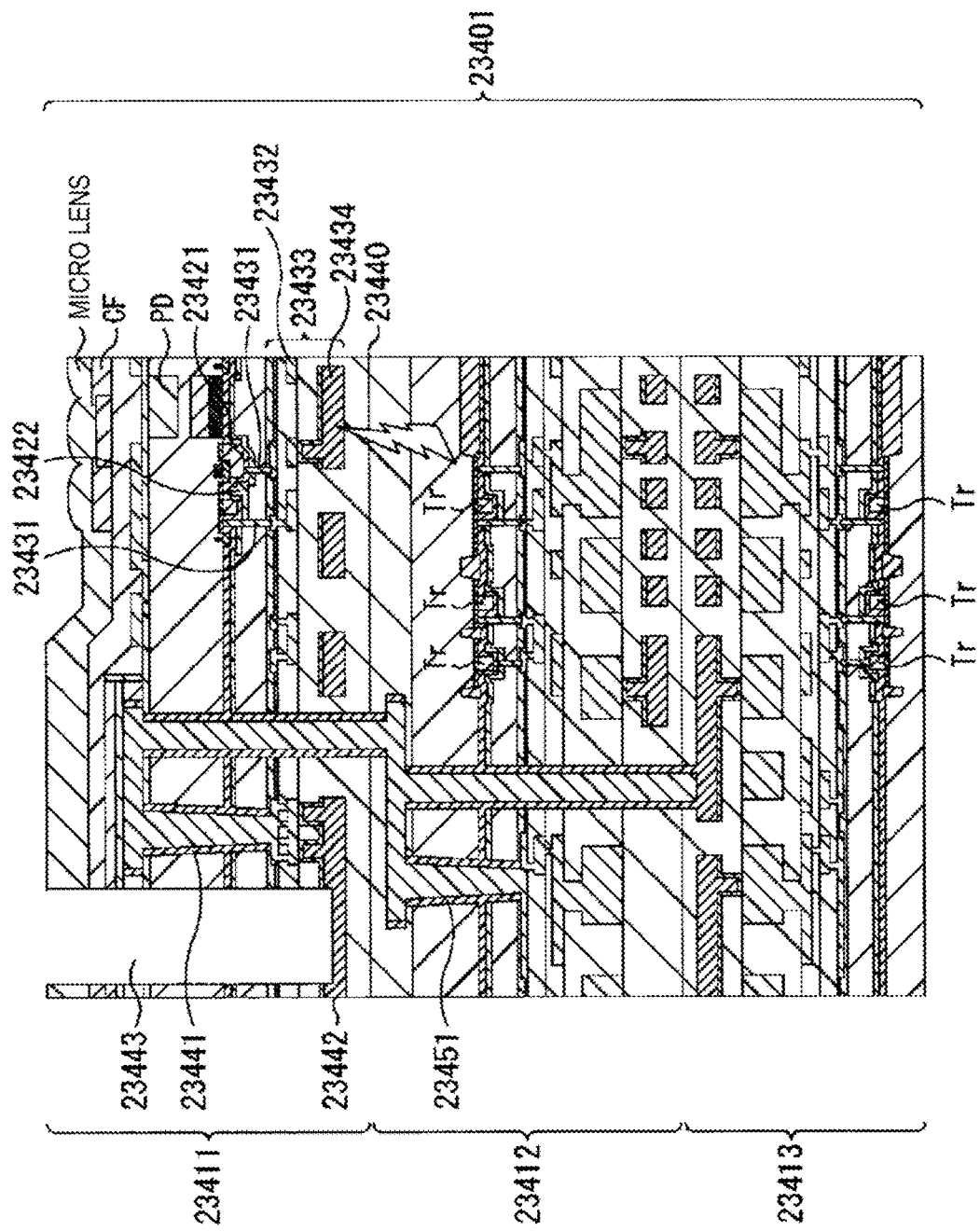

[Fig. 7]
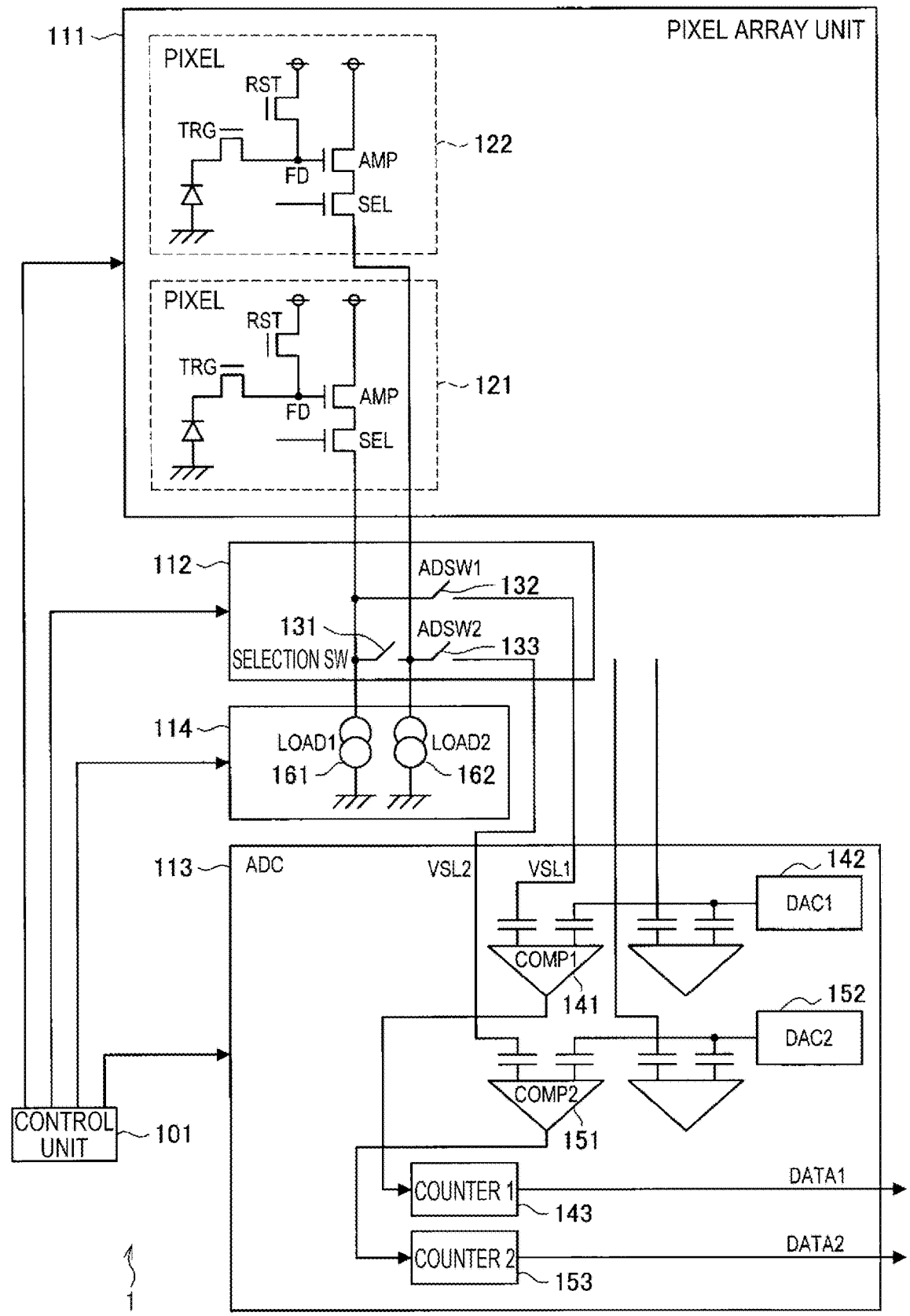

[Fig. 8]
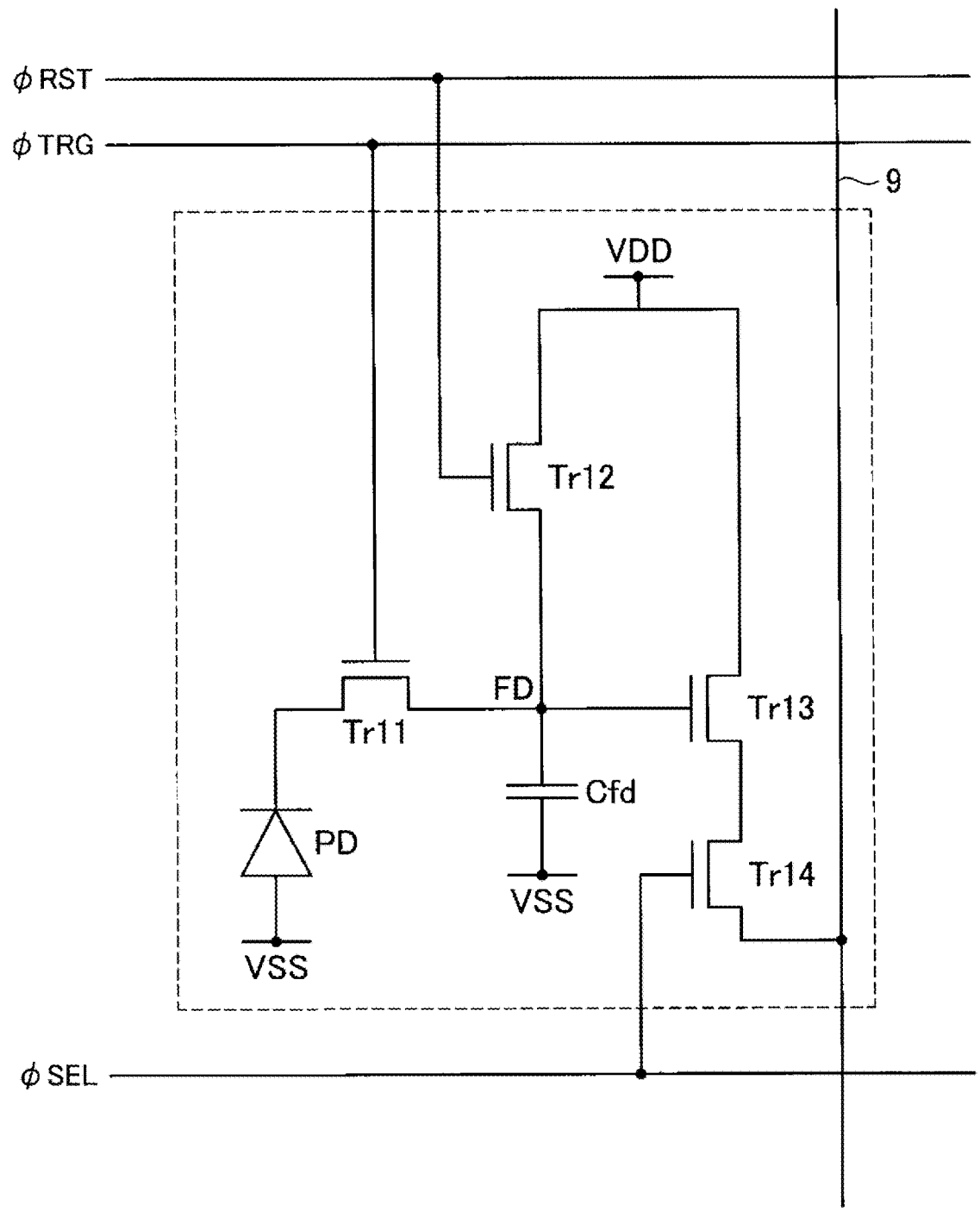

[Fig. 9]
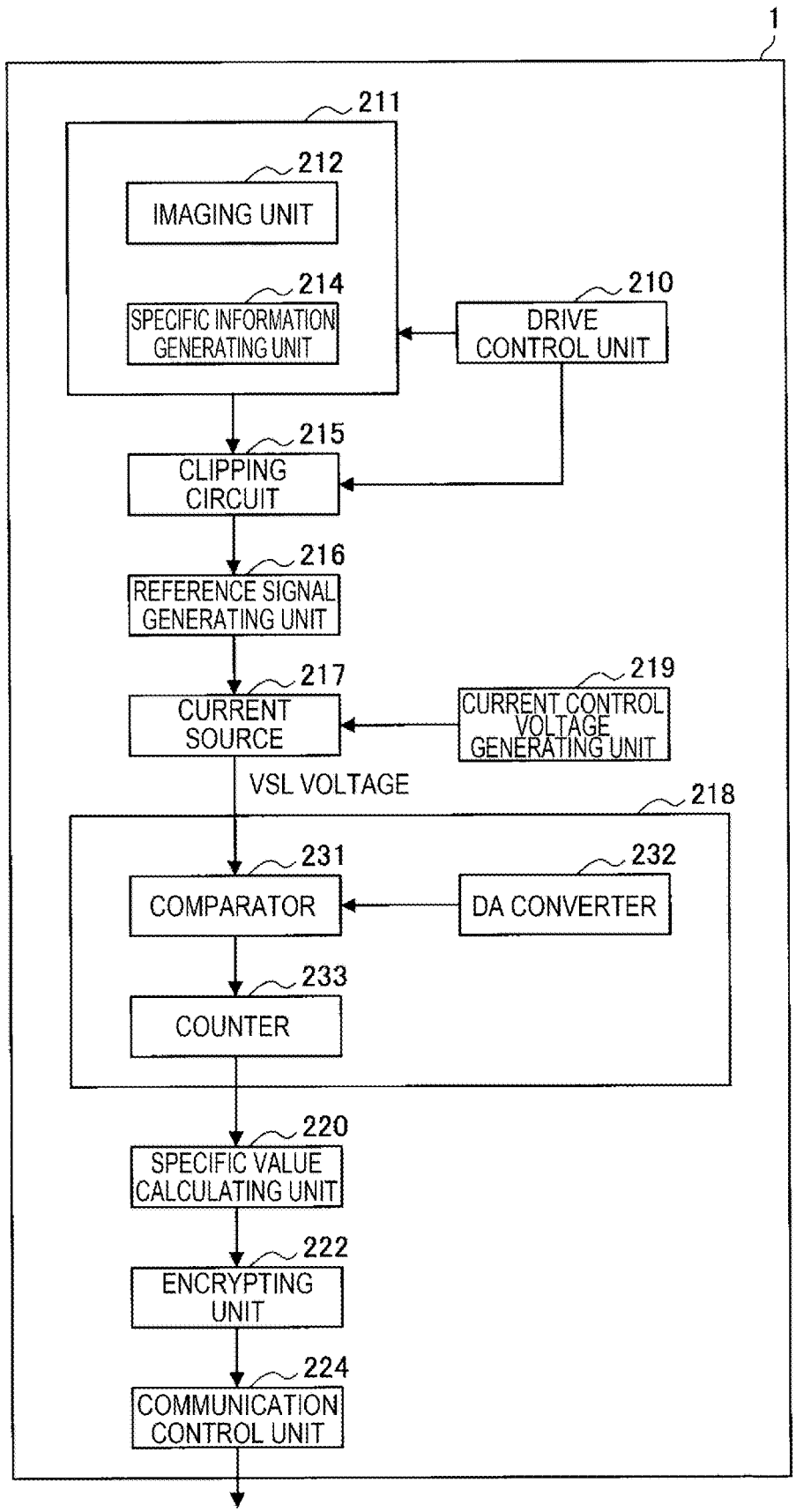

[FIG. 10A]
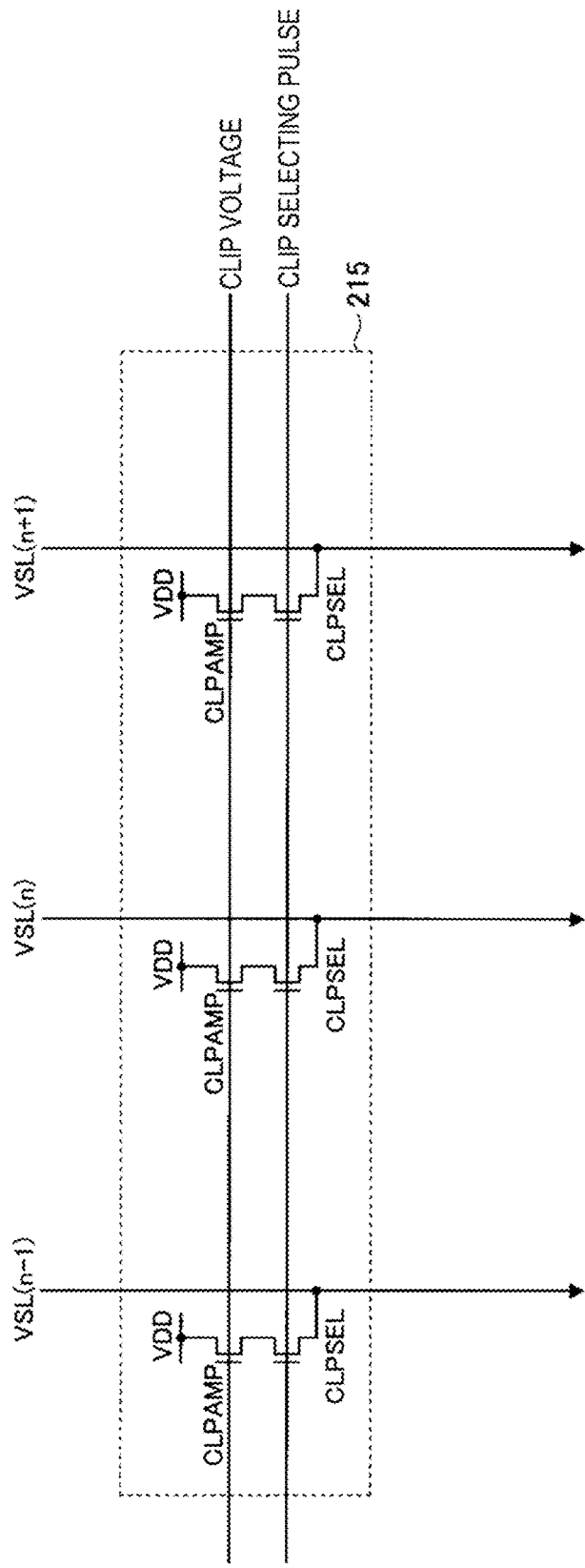

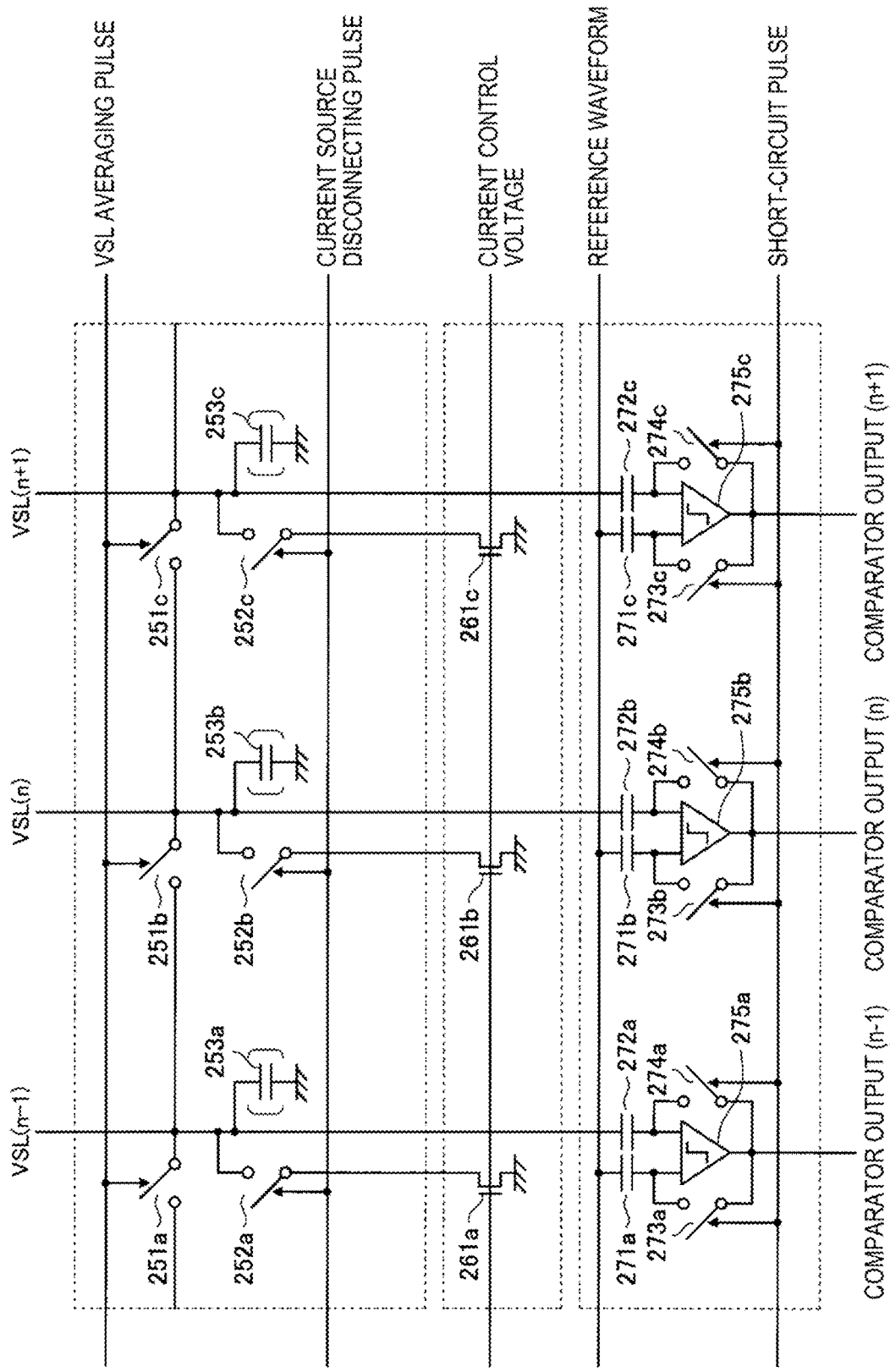

[Fig. 11A]
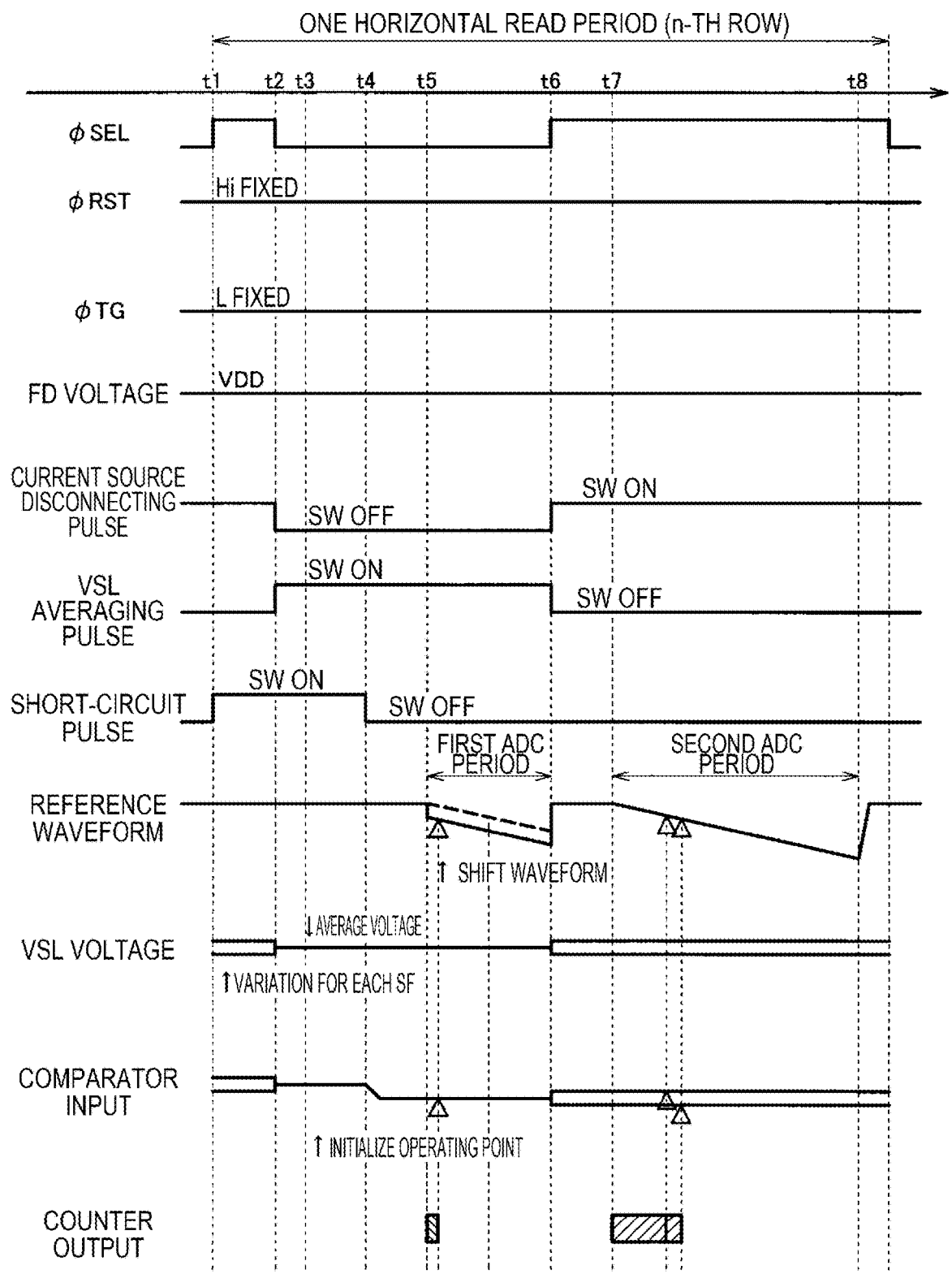

[Fig. 11B]
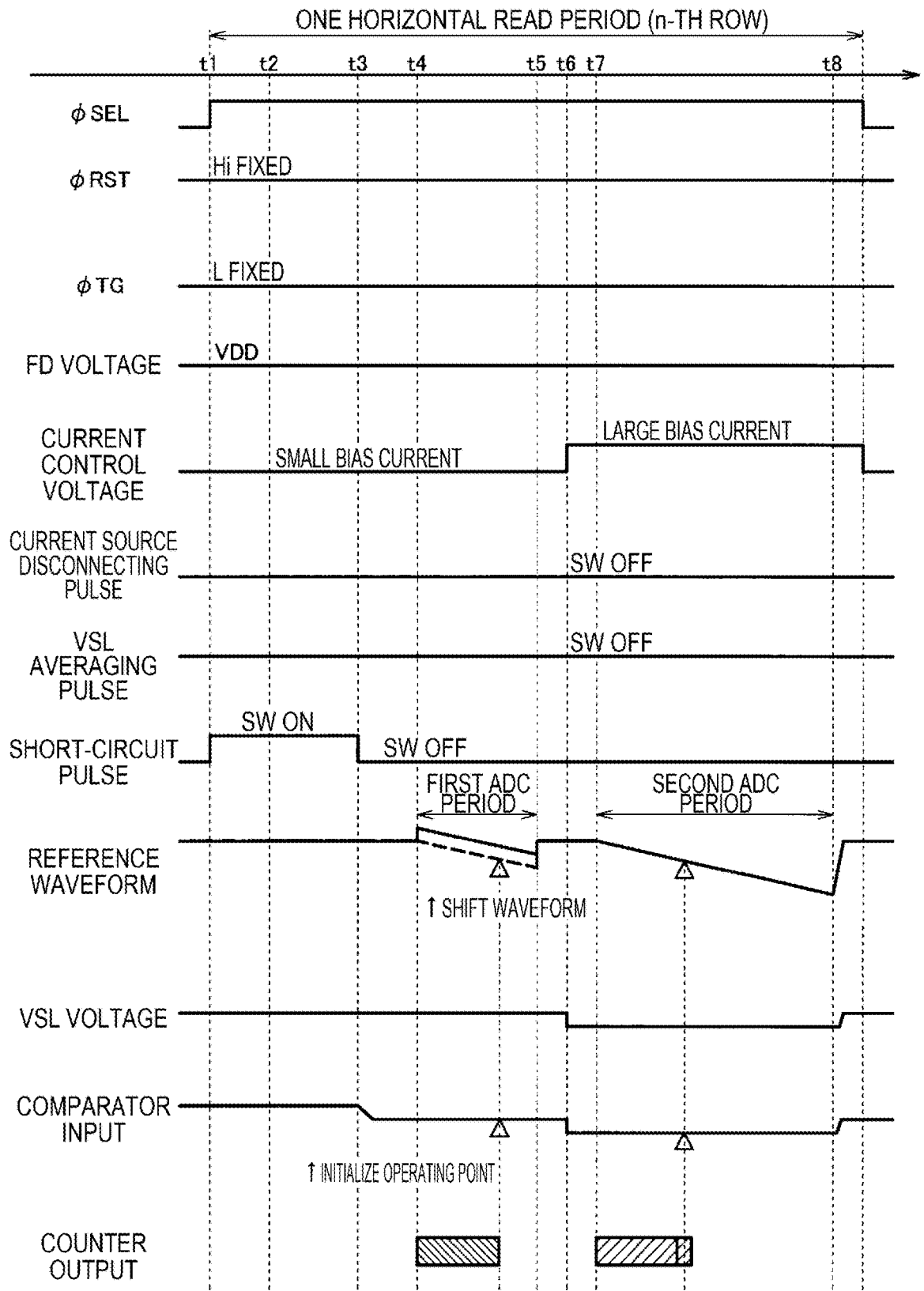

[Fig. 11C]
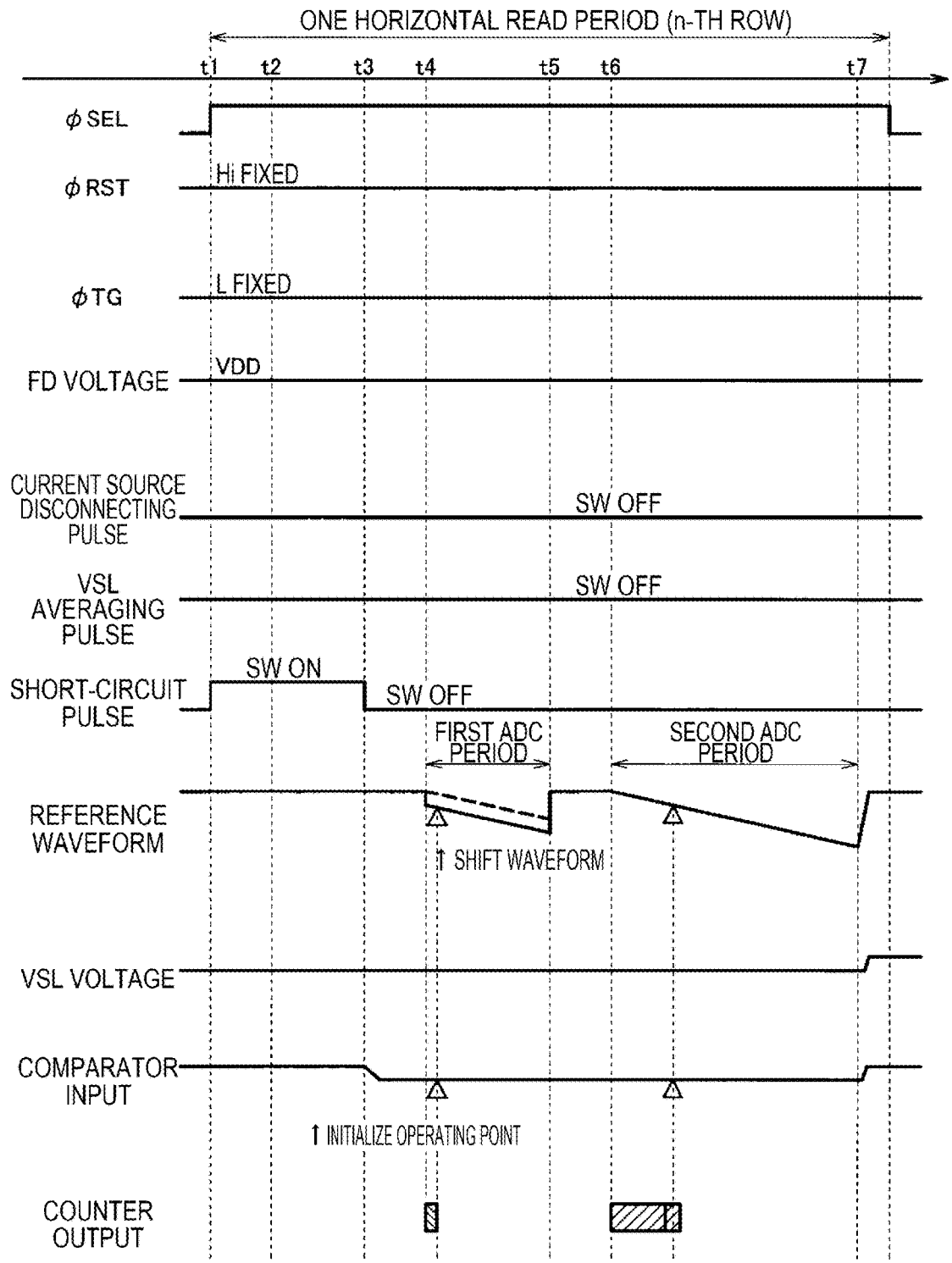

[Fig. 11D]
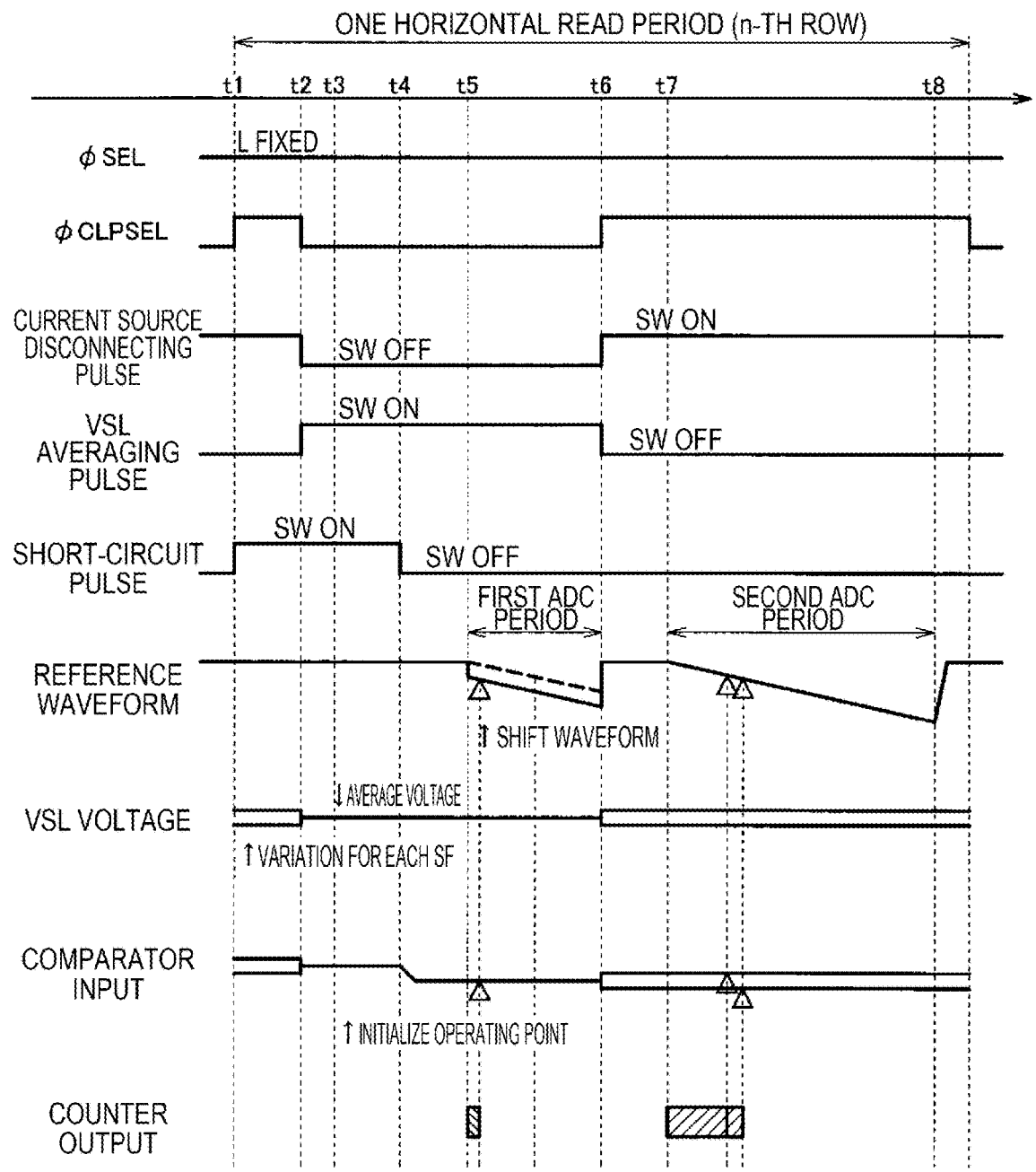

[Fig. 11E]
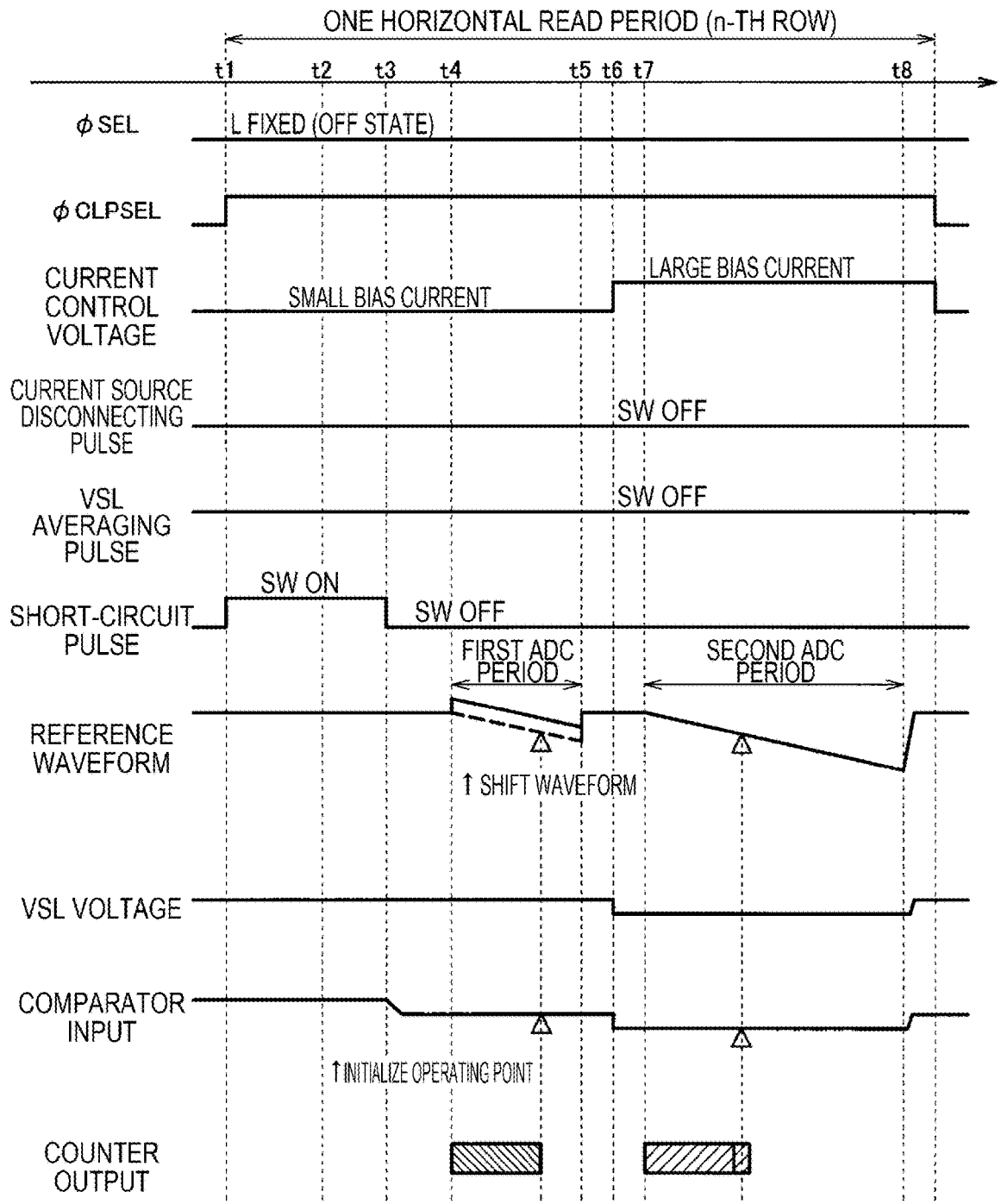

[Fig. 11F]
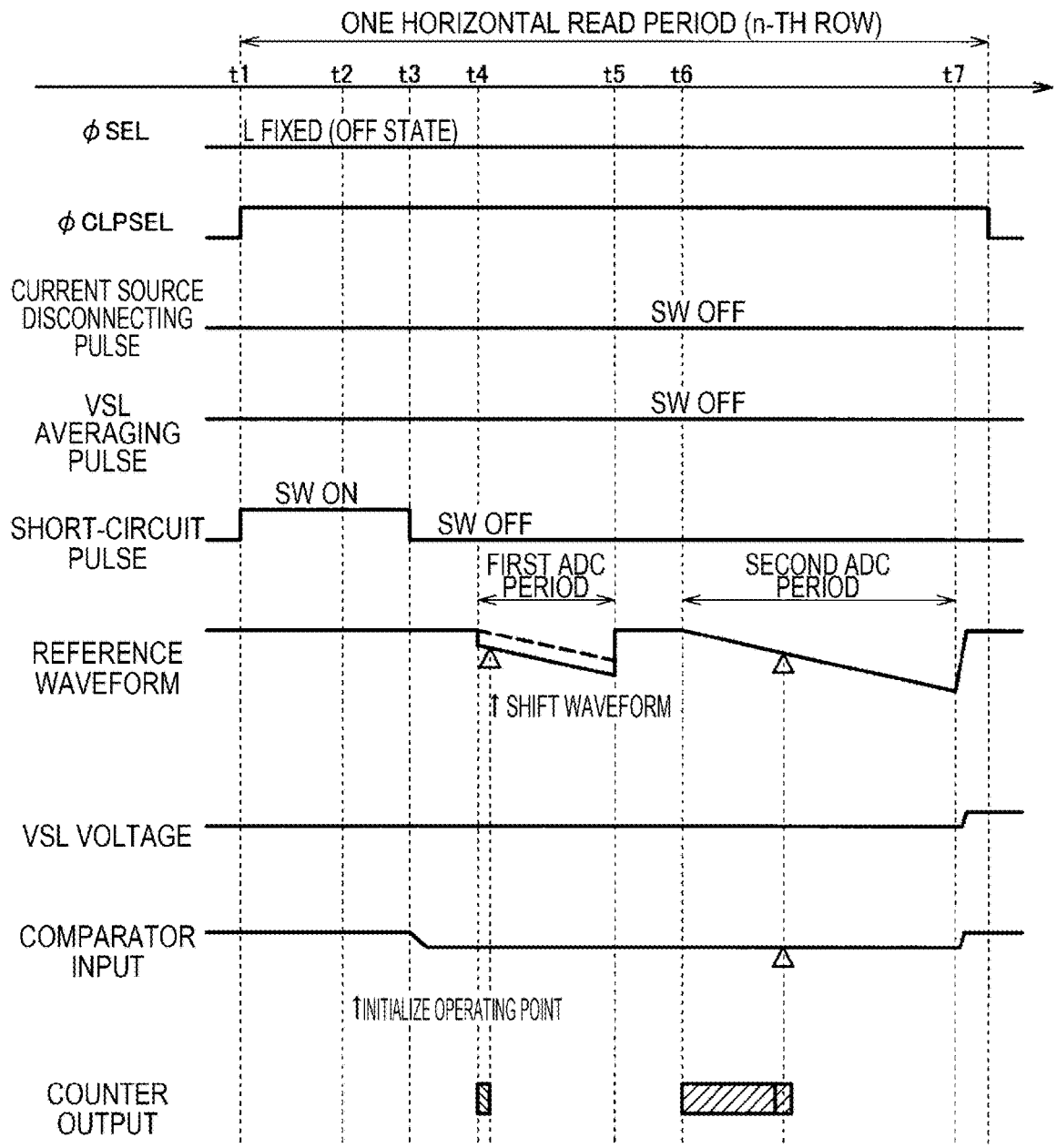

[Fig. 11G]
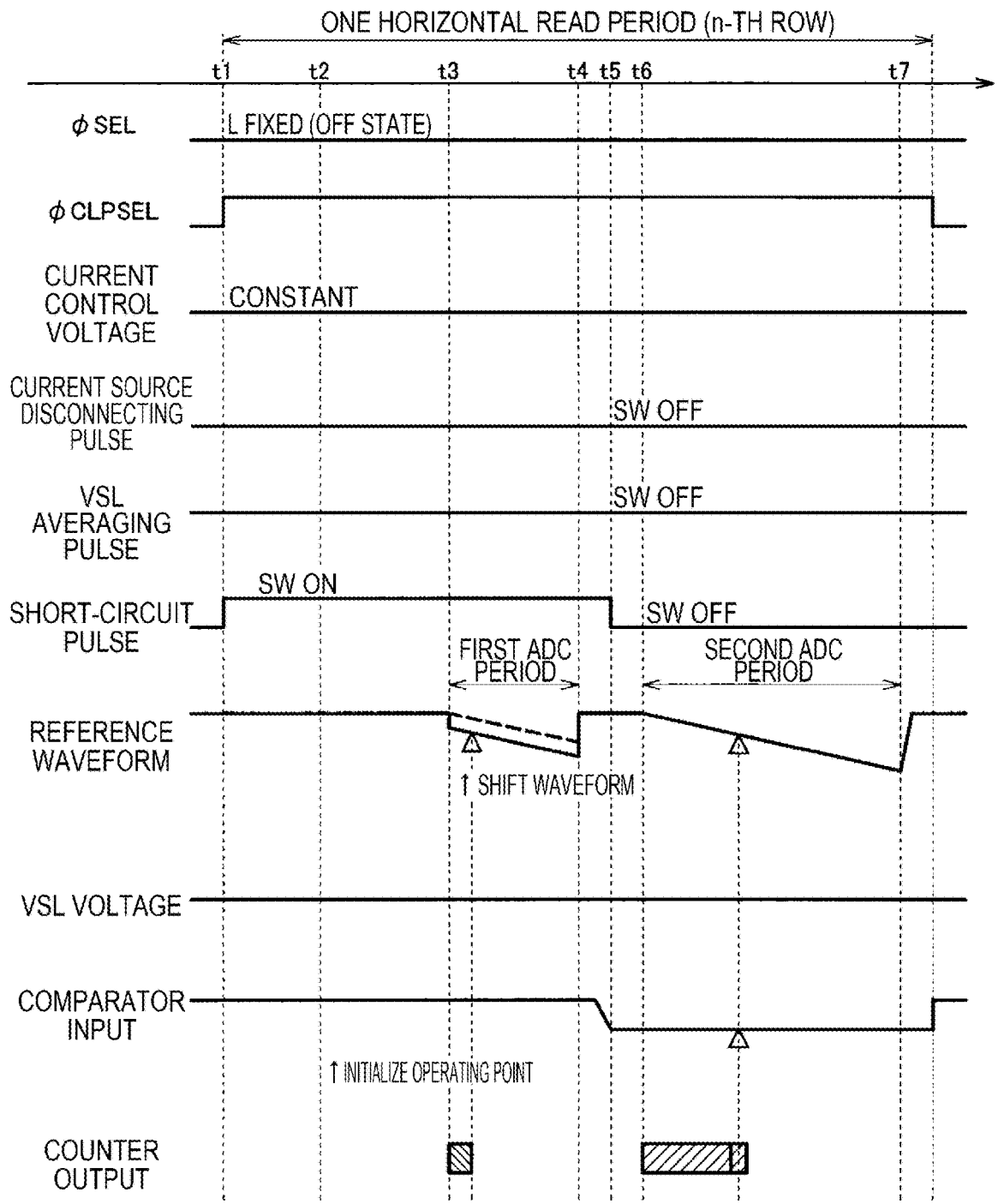

[Fig. 11H]
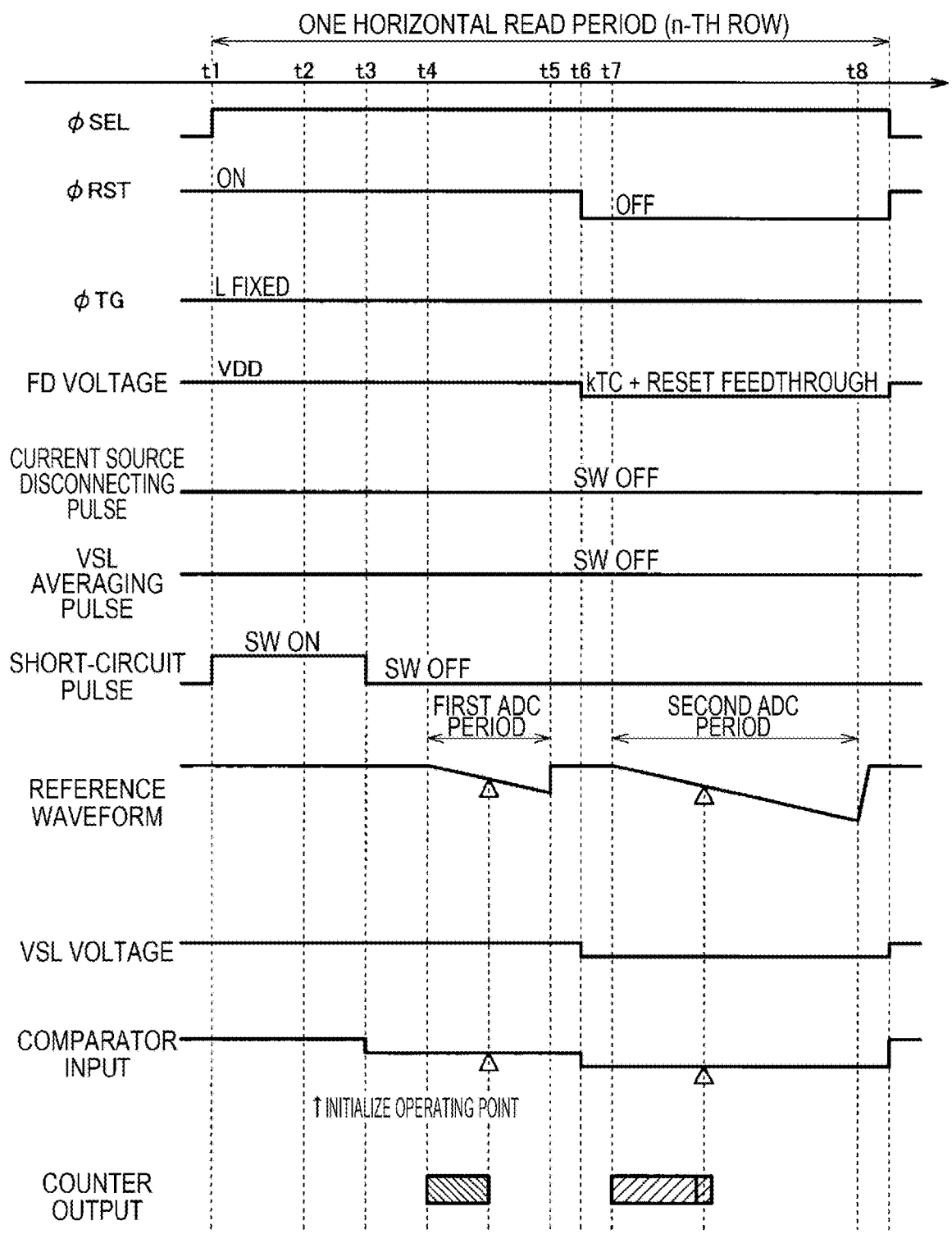

[Fig. 12]
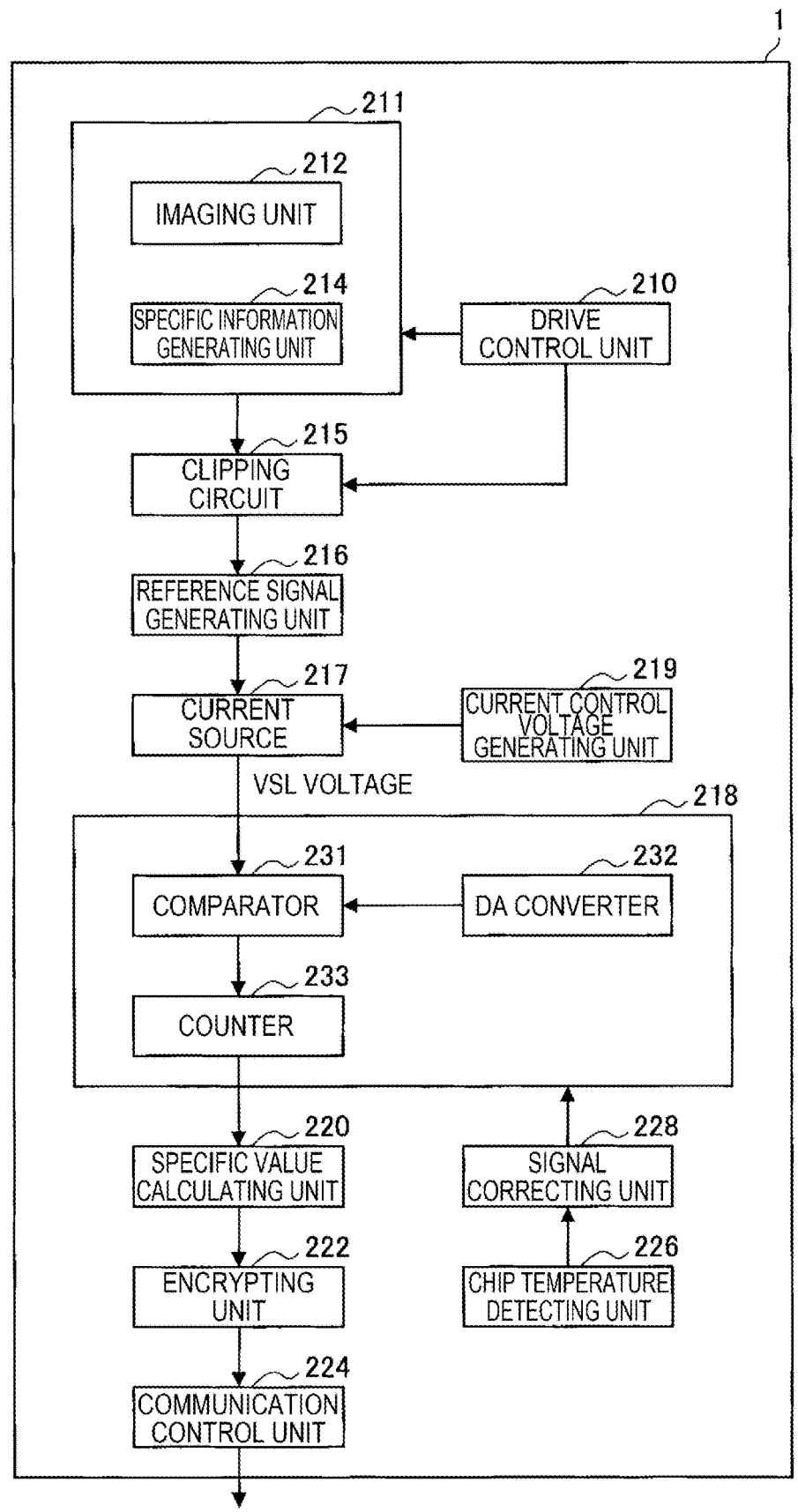

[Fig. 13]
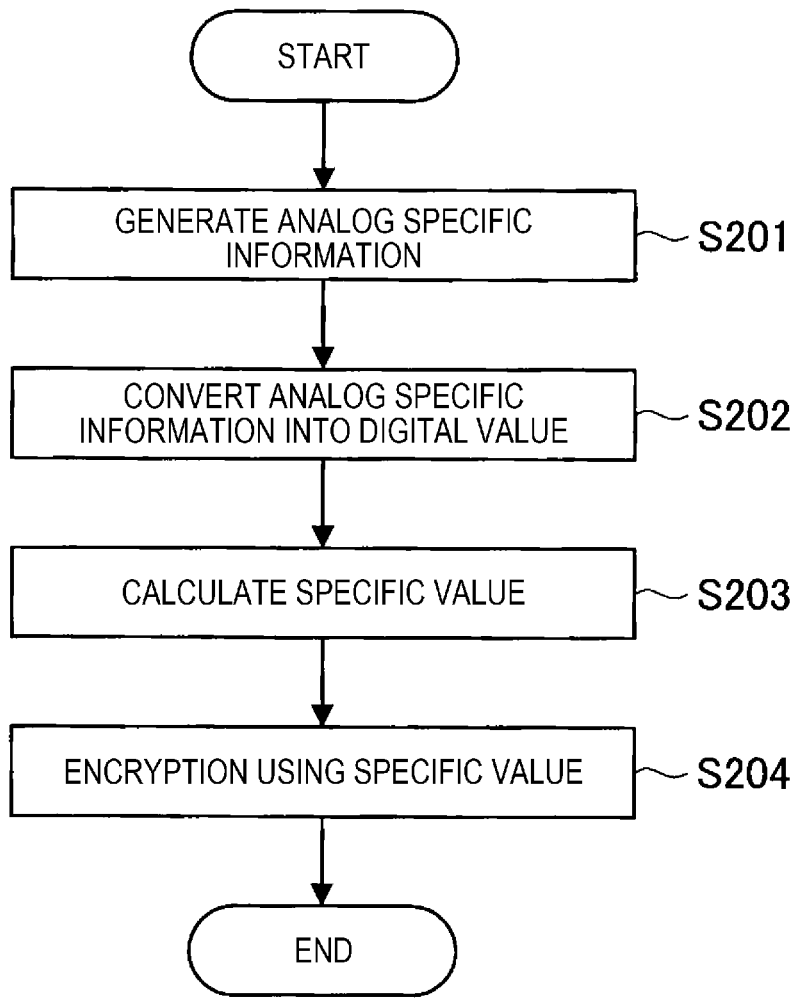

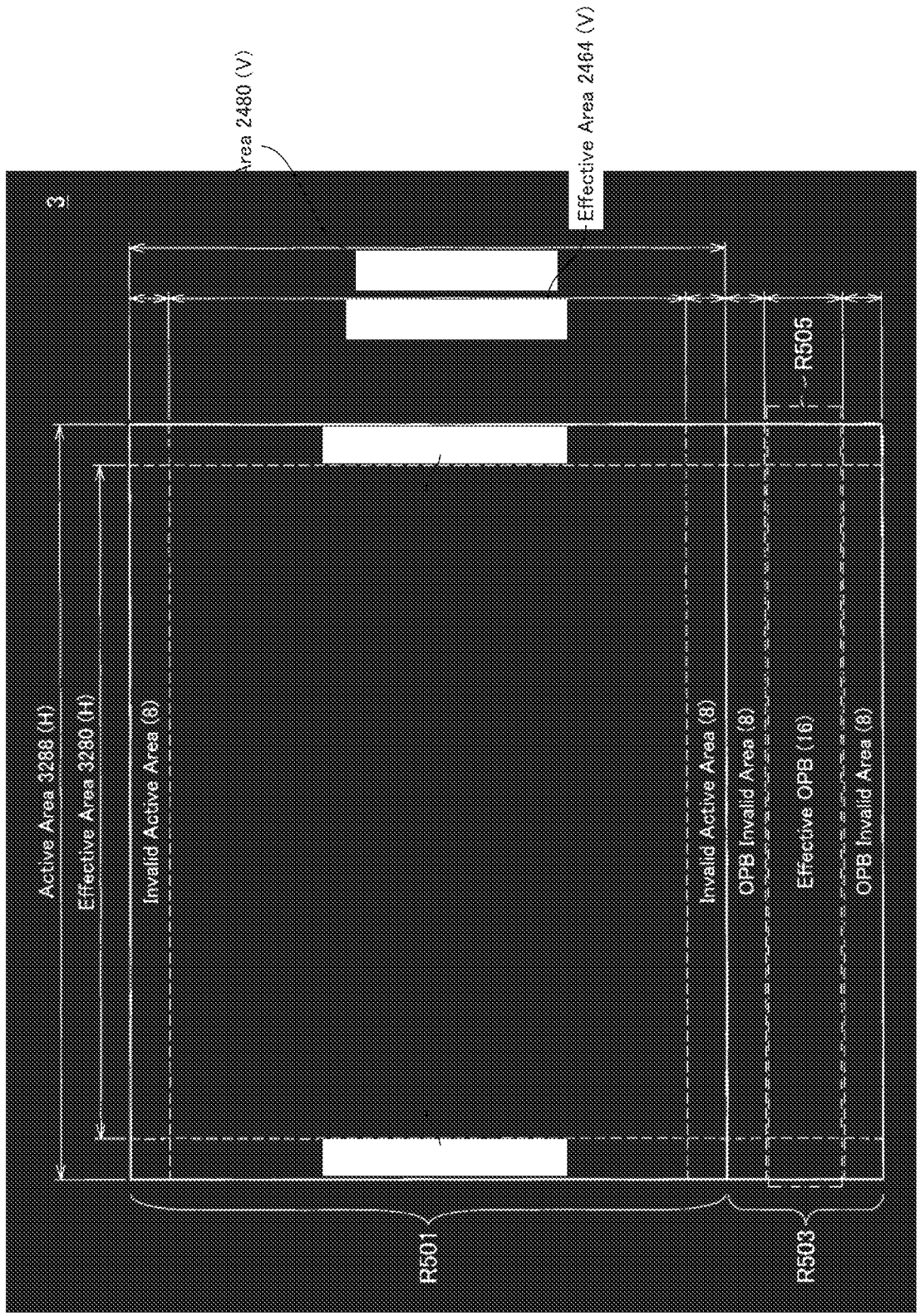

[FIG. 15]
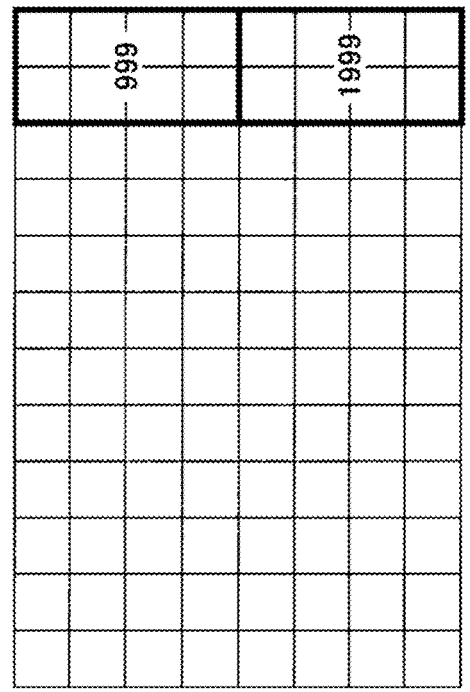
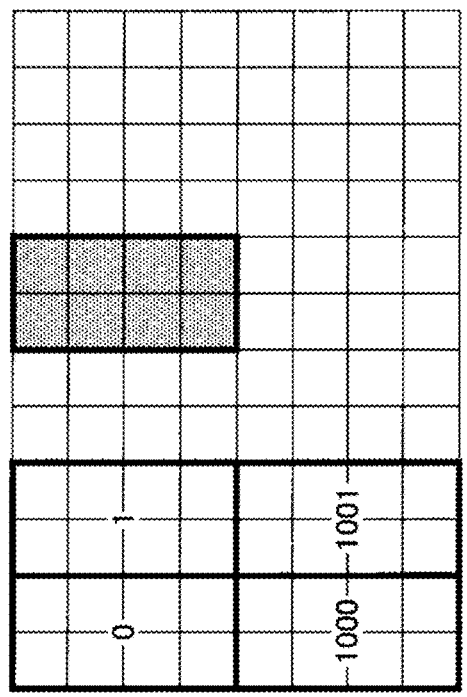

[Fig. 16]
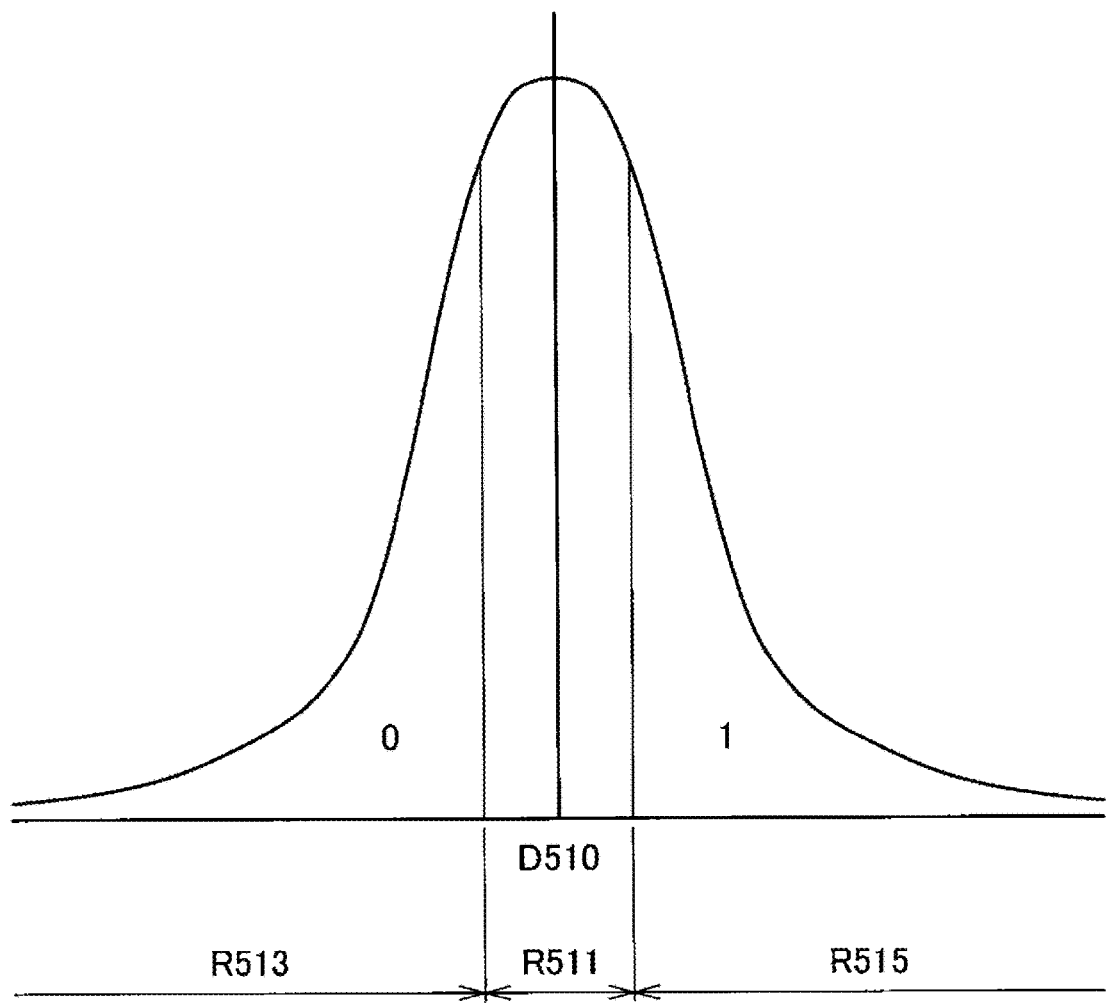
[Fig. 17]
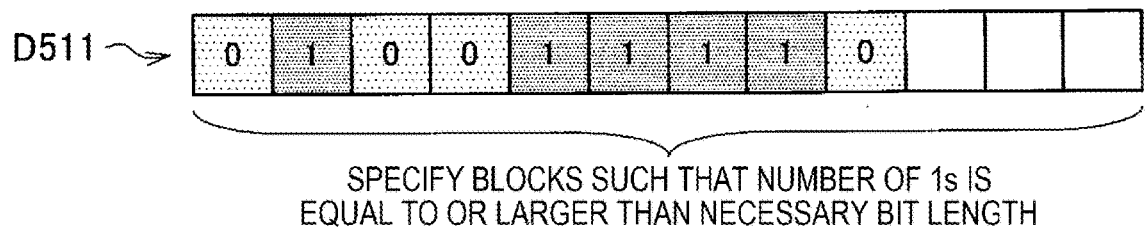

[Fig. 18]
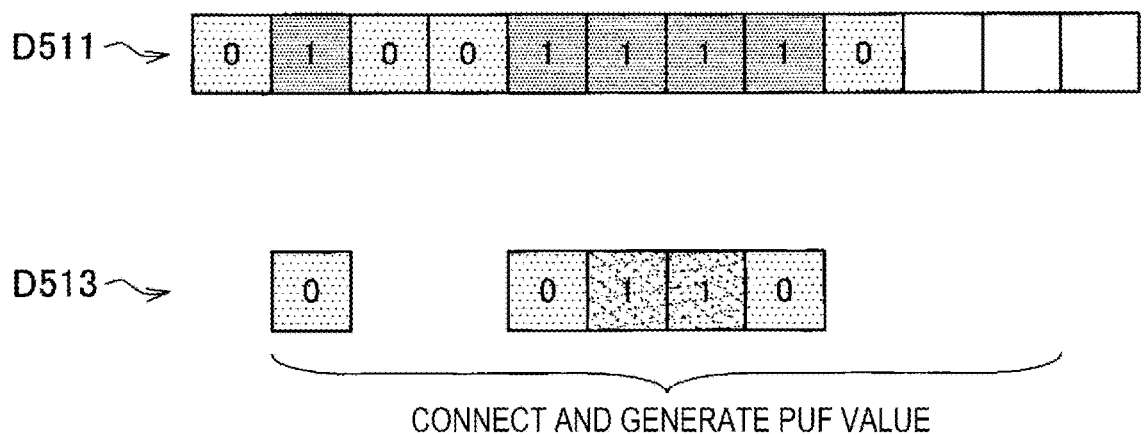

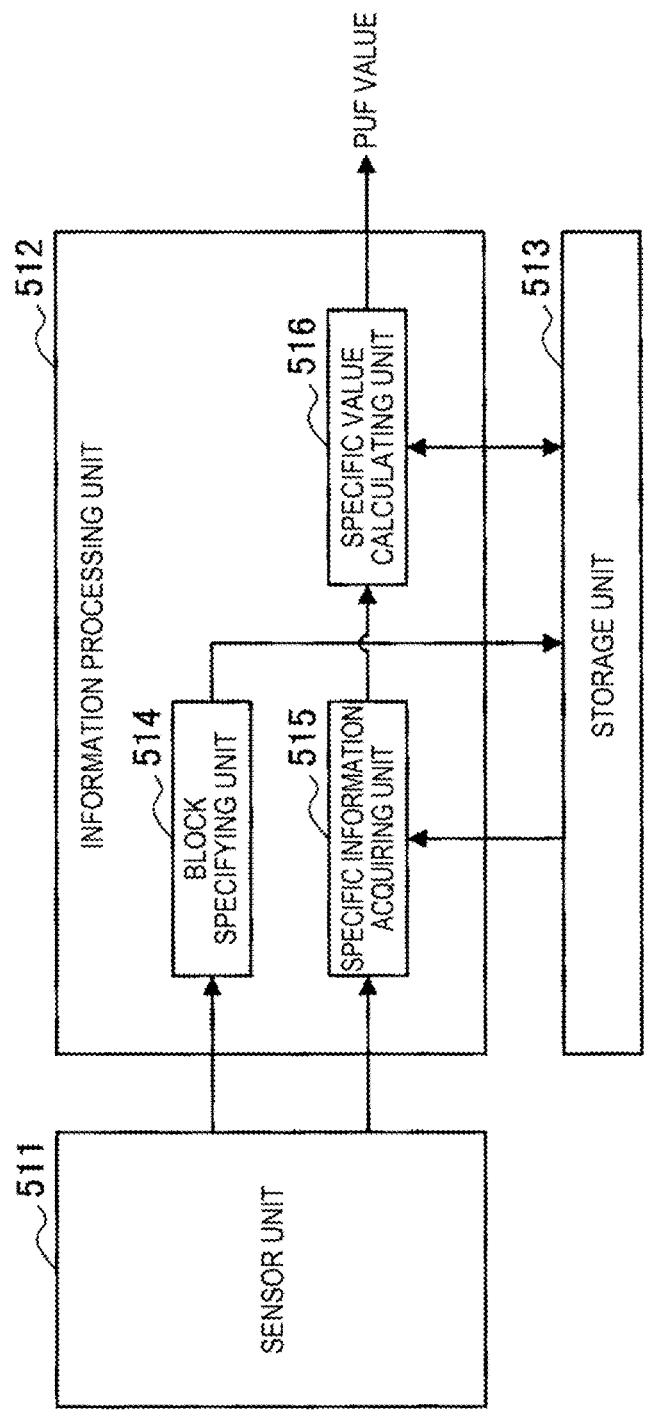
[FIG. 19]

[Fig. 20]
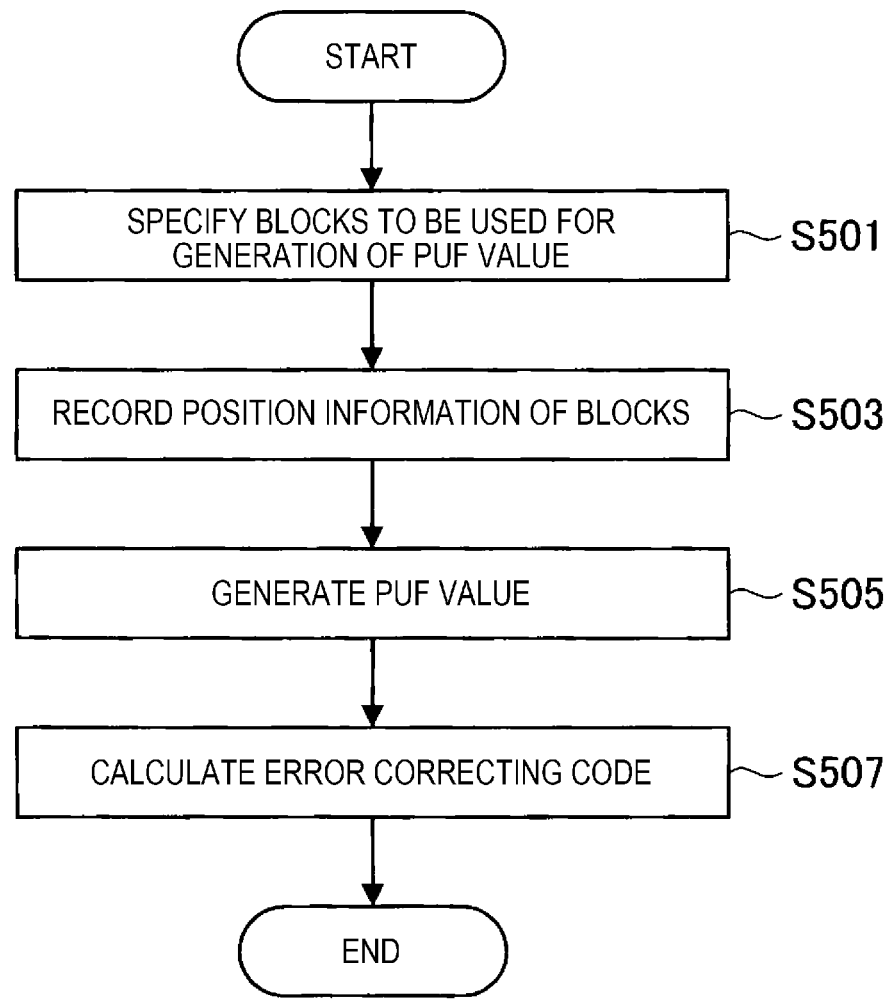

[Fig. 21]
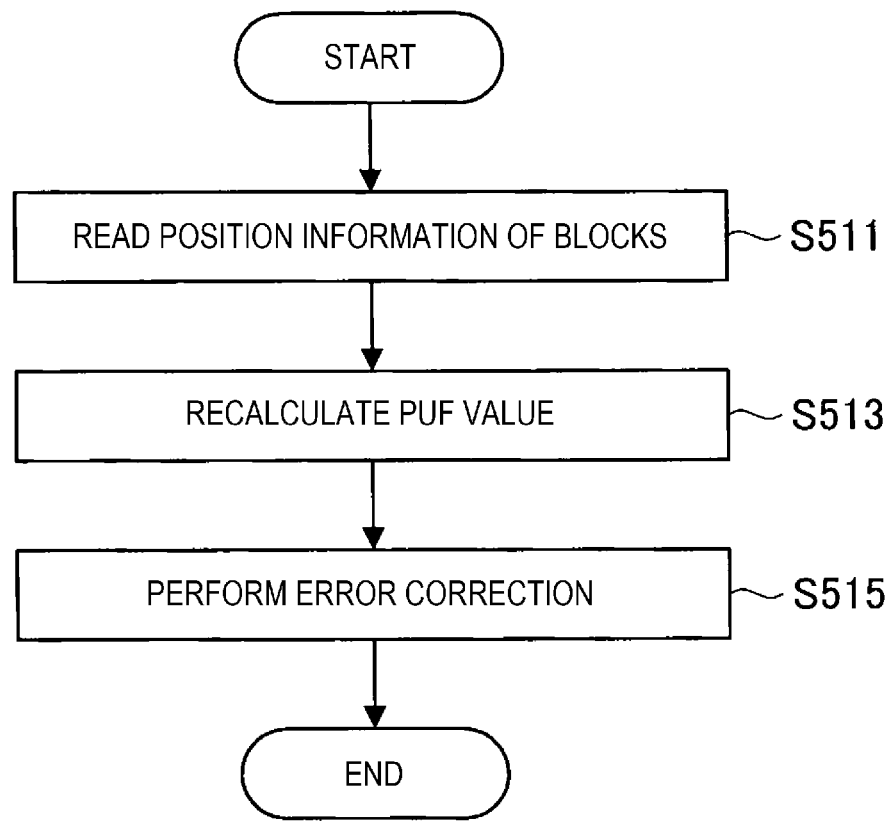

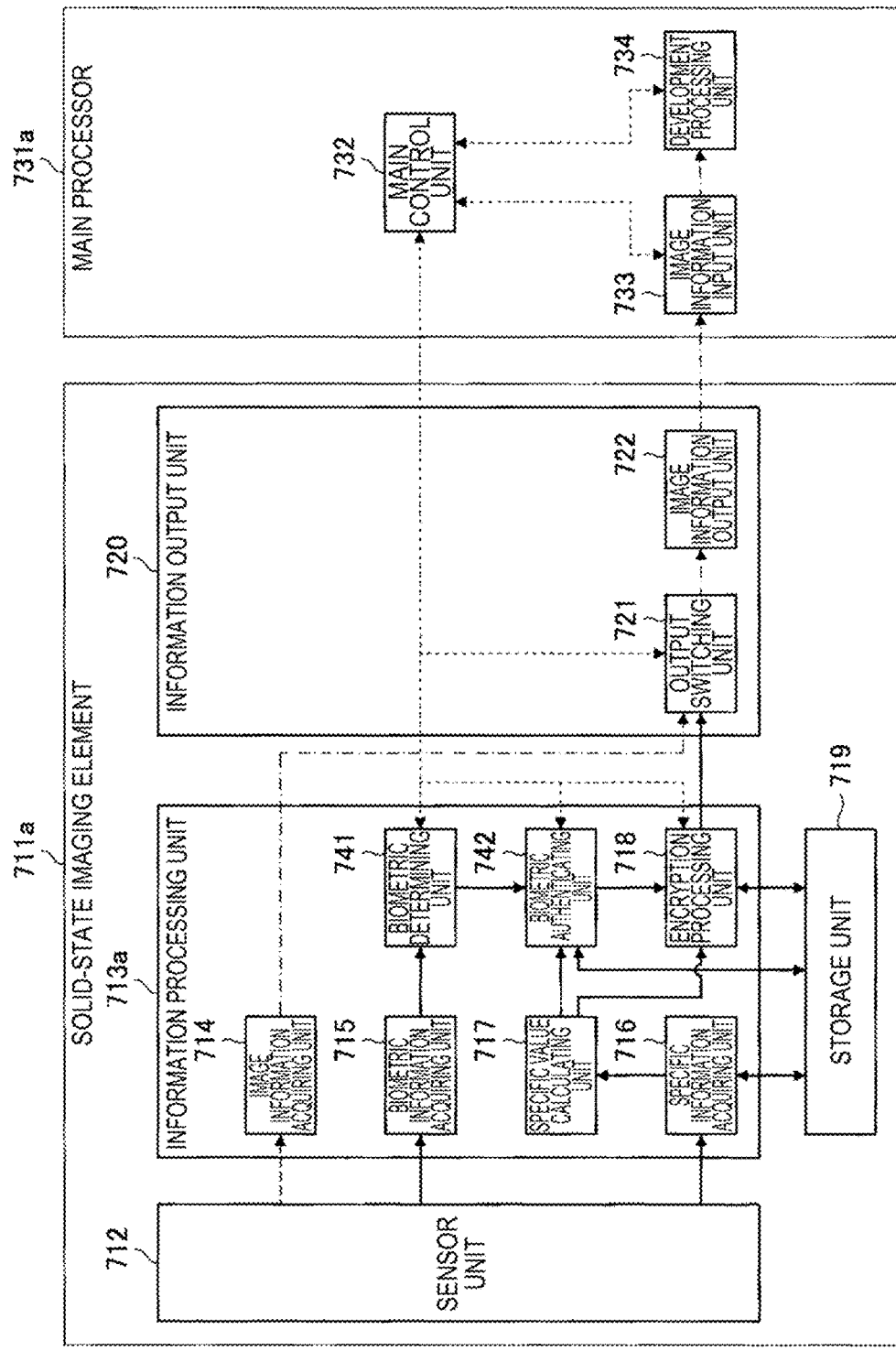

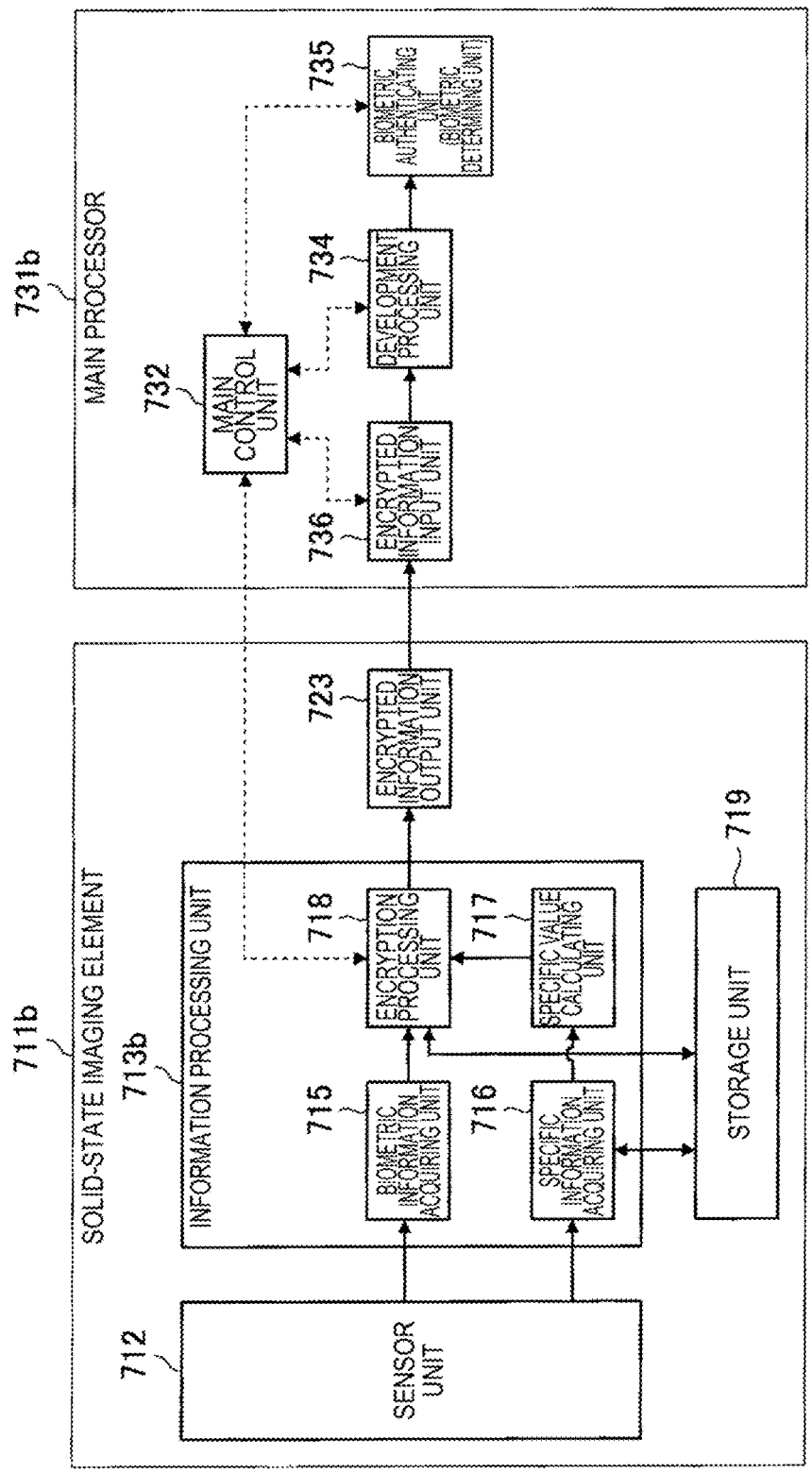
[FIG. 23]

[FIG. 24]
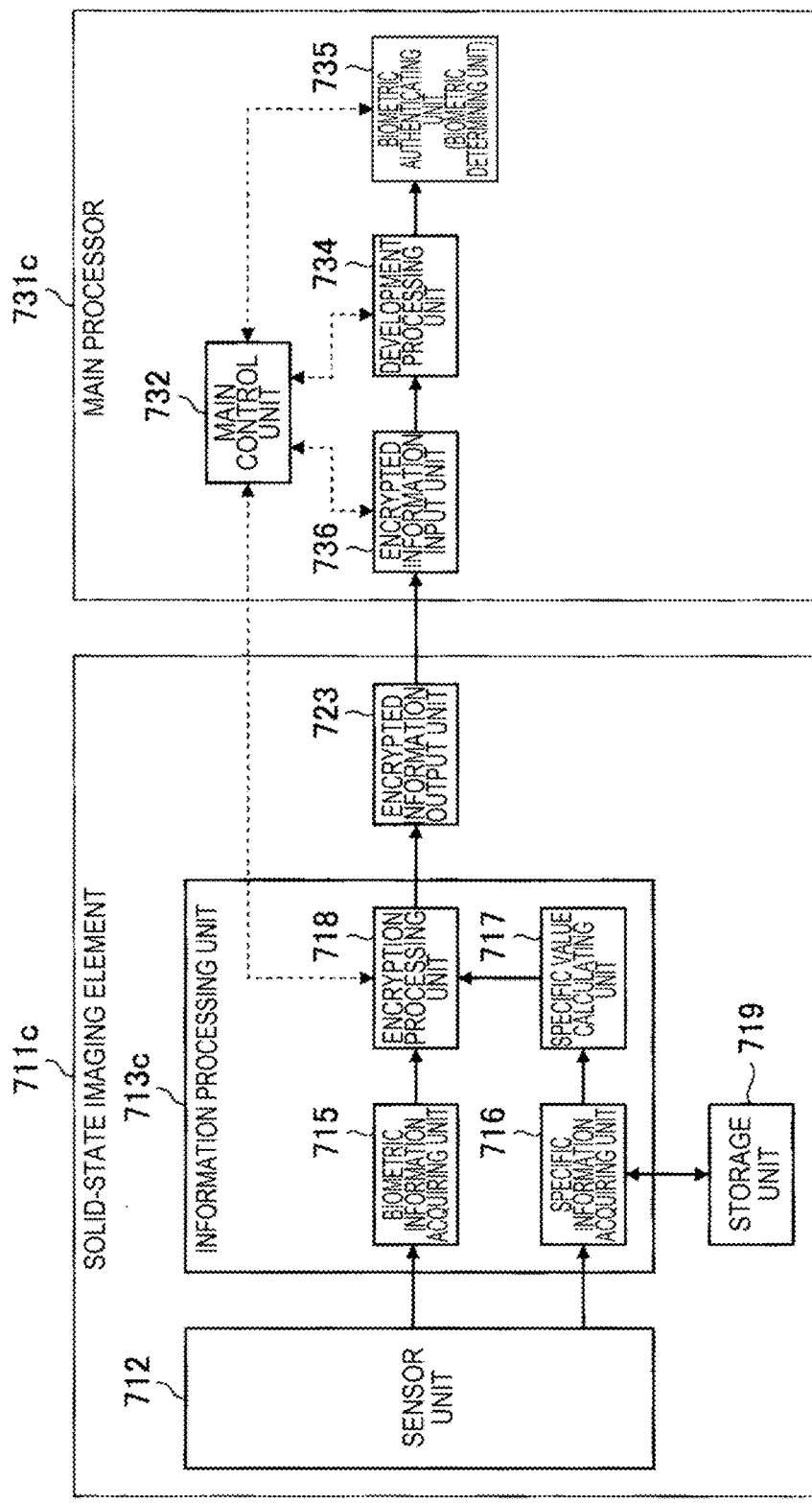

[Fig. 25]
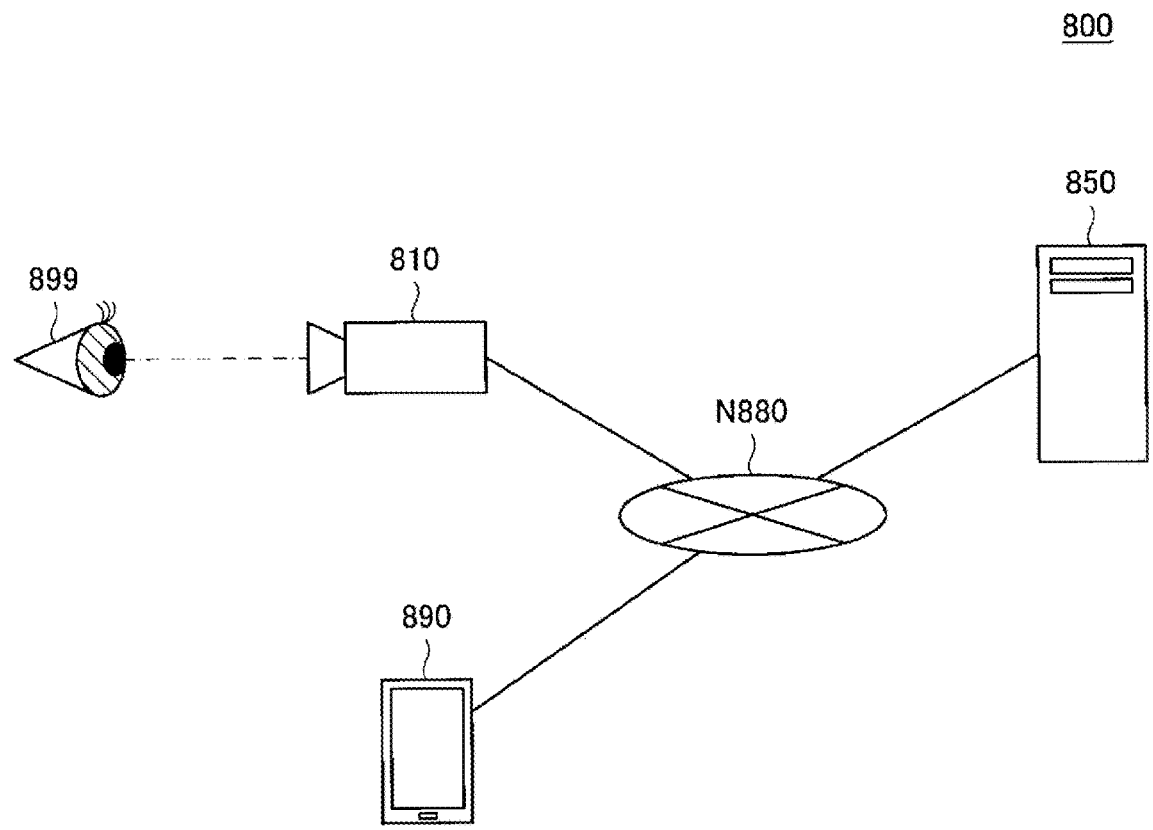

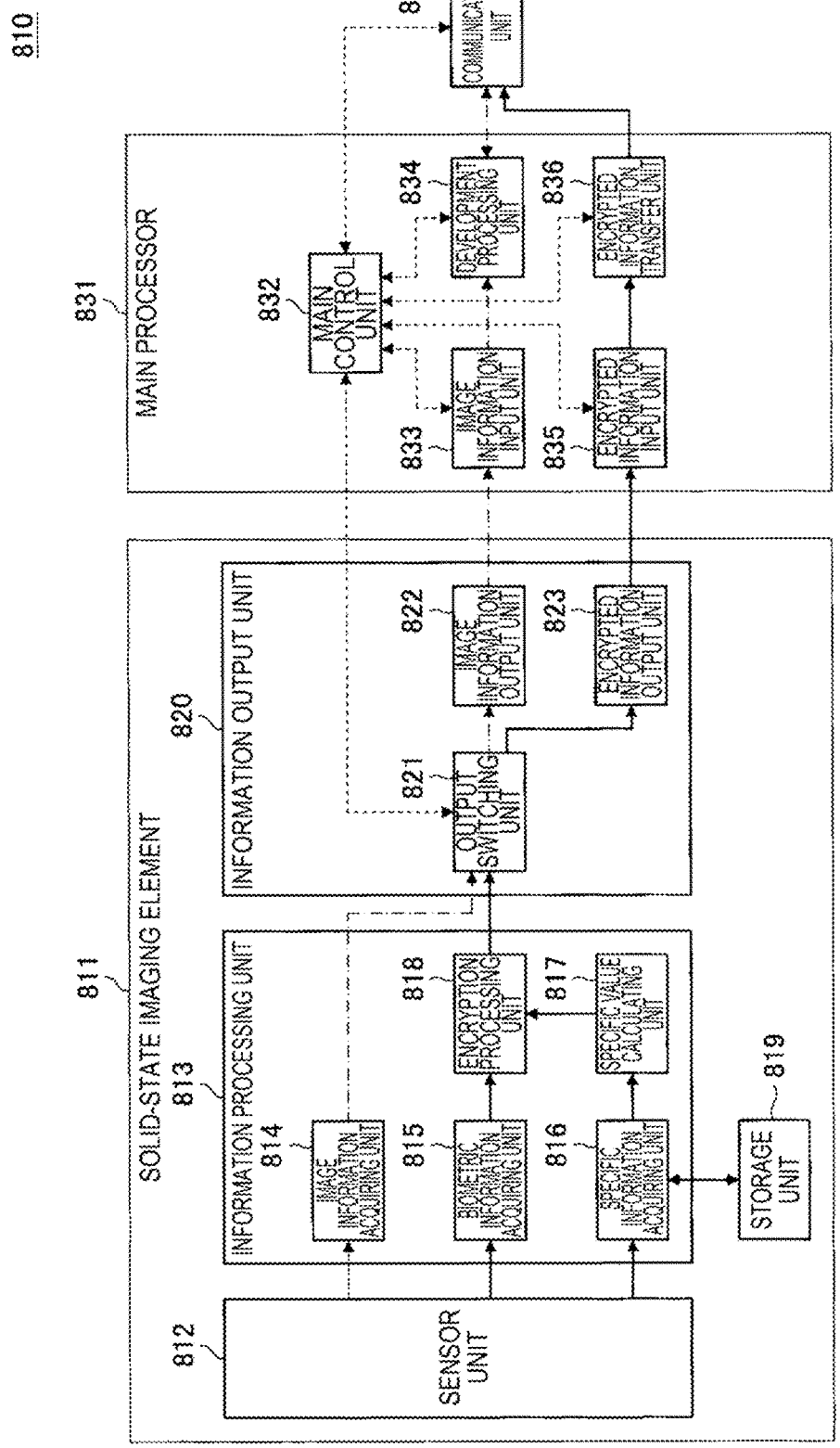
[FIG. 26]

[Fig. 27]
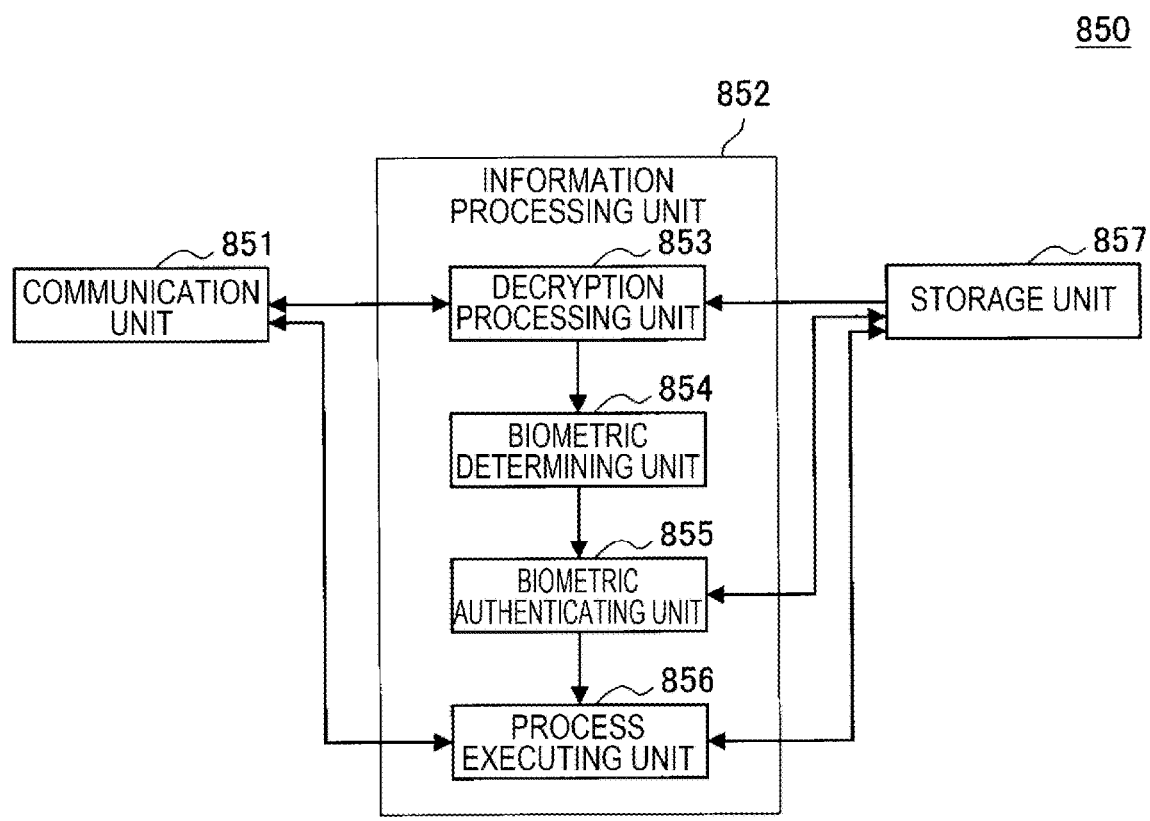

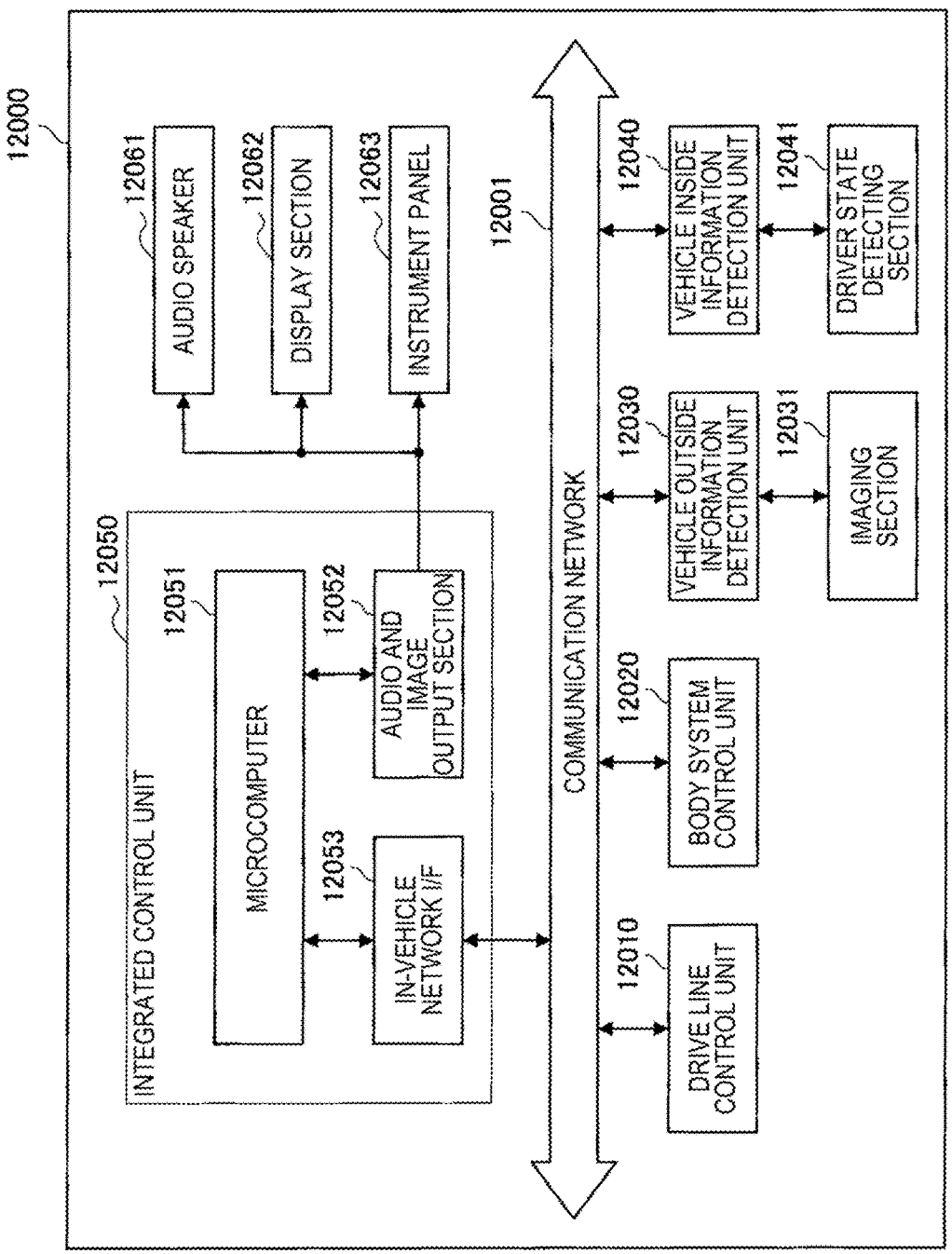
[FIG. 28]

[Fig. 29]
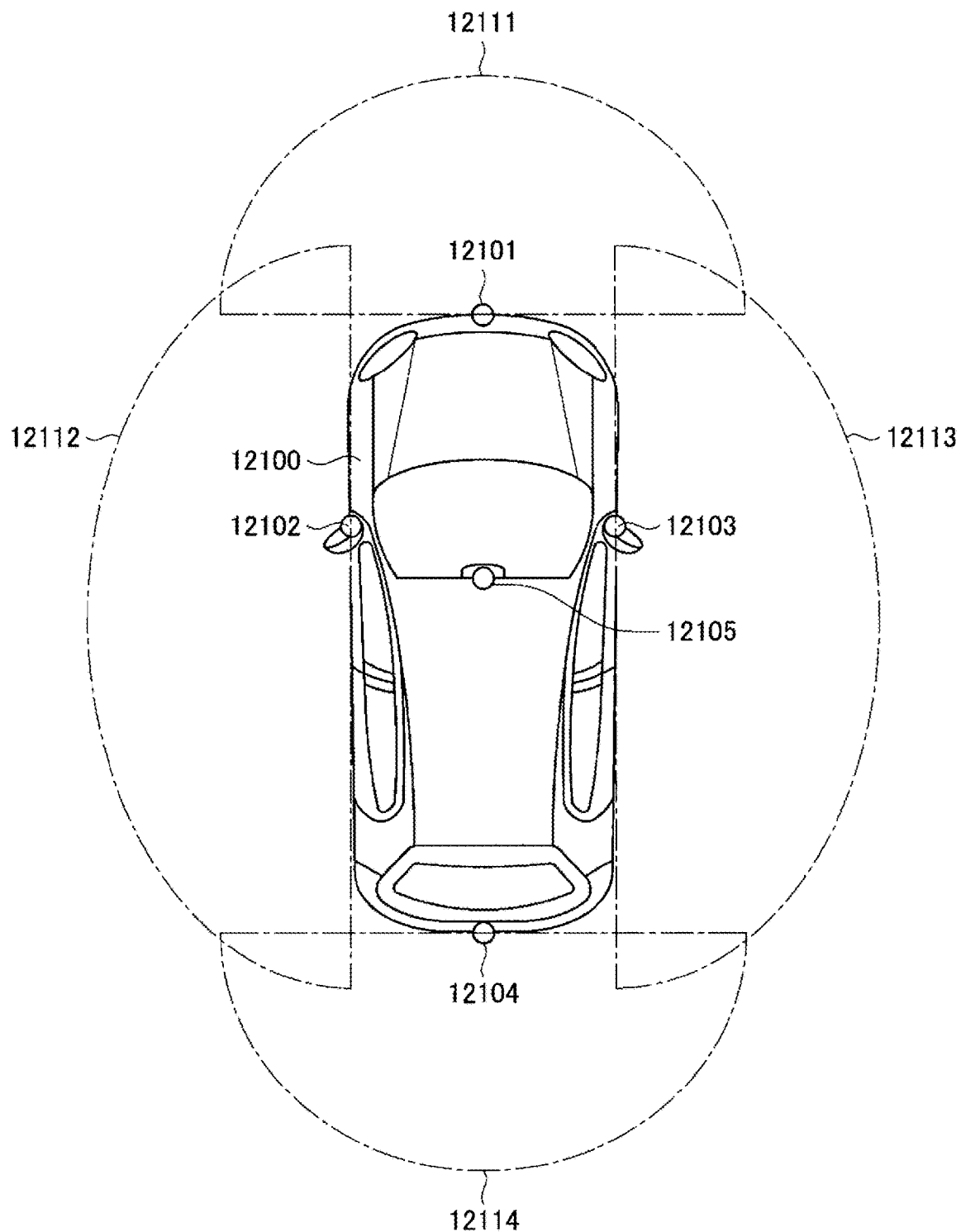

SOLID-STATE IMAGING DEVICE AND INFORMATION PROCESSING METHOD OF SOLID-STATE IMAGING DEVICE

CROSS-REFERENCE TO RELATED APPLICATIONS

This application claims the benefit under 35 U.S.C. § 371 as a U.S. National Stage Entry of International Application No. PCT/JP2017/042846, filed in the Japanese Patent Office as a Receiving Office on Nov. 29, 2017, which claims priority to Japanese Patent Application Number JP2017-009259, filed in the Japanese Patent Office on Jan. 23, 2017, each of which is hereby incorporated by reference in its entirety.

TECHNICAL FIELD

The present disclosure relates to a solid-state imaging device and an information processing method of a solid-state imaging device.

BACKGROUND ART

An amplification type solid-state imaging device represented by a MOS type image sensor such as a complementary metal oxide semiconductor (CMOS) or the like is known as a solid-state imaging device. Further, a charge transfer type solid-state imaging device represented by a charge coupled device (CCD) image sensor is known. The solid-state imaging devices are widely used for digital still cameras, digital video cameras, and the like. In recent years, MOS type image sensors have often been used as solid-state imaging devices mounted in mobile devices such as mobile phones or personal digital assistants (PDA) with a camera due to their low power voltage and low power consumption. For example, Patent Literature 1 discloses an example of a digital camera to which such a solid-state imaging device is applied.

The MOS type solid-state imaging device includes a pixel array (pixel region) in which a plurality of unit pixels each configured with a photodiode serving as a photoelectric conversion unit and a plurality of pixel transistors are arranged in a two-dimensional array form and a peripheral circuit region. The plurality of pixel transistors include three MOS transistors, that is, a transfer transistor, a reset transistor, and an amplifying transistor, or four MOS transistors, that is, a transfer transistor, a reset transistor, an amplifying transistor, and a selecting transistor.

CITATION LIST

Patent Literature

PTL 1: JP 2004-173154A

SUMMARY

Technical Problem

In Patent Literature 1, an encryption key is generated through a block different from an imaging element using specific information of the imaging element. However, in this technique, the specific information of the imaging element is likely to leak out when a signal output from the imaging element is monitored.

In this regard, the present disclosure proposes a solid-state imaging device and an information processing method of a solid-state imaging device, which are novel and improved and capable of performing an encryption process with high security by generating specific information very securely and performing an encryption process on the basis of the generated specific information.

Solution to Problem

According to a first aspect of the present technology, there is provided a solid-state imaging device adapted to encrypt data. The solid-state imaging device may comprise a sensor die comprising an array of imaging pixels formed on a first side of the sensor die and first wiring layers formed on a second side of the sensor die, wherein at least one of the imaging pixels is configured to generate specific signals; a logic die comprising second wiring layers formed on a first side of the logic die; and an encryption processor on the logic die configured to generate encrypted data using the specific signals, wherein the first side of the logic die is mounted adjacent to the second side of the sensor die and the first wiring layers electrically connect to the second wiring layers, wherein the at least one of the imaging pixels, the encryption processor, and a connecting conductor in which the specific signals pass through from the at least one of the imaging pixels to the encryption processor are located interior to the solid-state imaging device.

According to a second aspect of the present technology, there is provided a solid-state imaging device adapted to encrypt data. The solid-state imaging device may comprise a sensor die comprising an array of imaging pixels, wherein at least one of the imaging pixels is configured to generate specific signals; a logic die comprising an encryption processor, wherein the logic die is mounted adjacent to the sensor die and is configured to generate an encryption key using, at least in part, the specific signals received from the sensor die, wherein the at least one of the imaging pixels, the encryption processor, and a connecting conductor in which the specific signals pass through from the at least one of the imaging pixels to the encryption processor are located interior to the solid-state imaging device.

According to a third aspect of the present technology, there is provided a solid-state imaging device adapted to encrypt data. The solid-state imaging device may comprise an array of pixels, wherein at least one of imaging pixels is configured to generate specific signals; and an encryption processor configured to generate encrypted data using the specific signals, wherein the at least one of the imaging pixels, the encryption processor, and a path in which the specific signals pass through from the at least one of the imaging pixels to the encryption processor are located interior to the solid-state imaging device.

Advantageous Effects of Invention

As described above, according to the embodiments of the present disclosure, it is possible to provide a solid-state imaging device and an information processing method of a solid-state imaging device, which are novel and improved and capable of performing an encryption process with high security by generating specific information very securely and performing an encryption process on the basis of the generated specific information.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a schematic configuration diagram illustrating an example of a configuration of a solid-state imaging device according to an embodiment of the present disclosure.

FIG. 2 is a diagram illustrating an overview of a configuration example of a stack type solid-state imaging device to which the technology according to an embodiment of the present disclosure can be applied.

FIG. 3 is a cross-sectional view illustrating a second configuration example of a stack type solid-state imaging device 23020.

FIG. 4 is a cross-sectional view illustrating a third configuration example of a stack type solid-state imaging device 23020.

FIG. 5 is a cross-sectional view illustrating a first configuration example of a stack type solid-state imaging device 23020.

FIG. 6 is a diagram illustrating another configuration example of a stack type solid-state imaging device to which the technology according to an embodiment of the present disclosure can be applied.

FIG. 7 is a block diagram illustrating an example of a functional configuration of a part of a solid-state imaging device according to an embodiment of the present disclosure.

FIG. 8 is a diagram illustrating an example of a circuit configuration of a unit pixel according to an embodiment of the present disclosure.

FIG. 9 is an explanatory diagram illustrating a functional configuration example of a solid-state imaging element according to a first embodiment of the present disclosure.

FIG. 10A is an explanatory diagram illustrating a circuit configuration example of a clipping circuit according to the embodiment.

FIG. 10B is an explanatory diagram illustrating a circuit configuration example of a reference signal generating unit, a current source, and a comparator according to the embodiment.

FIG. 11A is an explanatory diagram illustrating an operation when specific information according to the embodiment is generated using a timing chart.

FIG. 11B is an explanatory diagram illustrating an operation when specific information according to the embodiment is generated using a timing chart.

FIG. 11C is an explanatory diagram illustrating an operation when specific information according to the embodiment is generated using a timing chart.

FIG. 11D is an explanatory diagram illustrating an operation when specific information according to the embodiment is generated using a timing chart.

FIG. 11E is an explanatory diagram illustrating an operation when specific information according to the embodiment is generated using a timing chart.

FIG. 11F is an explanatory diagram illustrating an operation when specific information according to the embodiment is generated using a timing chart.

FIG. 11G is an explanatory diagram illustrating an operation when specific information according to the embodiment is generated using a timing chart.

FIG. 11H is an explanatory diagram illustrating an operation when specific information according to the embodiment is generated using a timing chart.

FIG. 12 is an explanatory diagram illustrating a functional configuration example of a solid-state imaging element according to the embodiment.

FIG. 13 is a flowchart illustrating an operation example of a solid-state imaging element according to the embodiment.

FIG. 14 is an explanatory diagram for describing an example of a technique related to generation of a PUF value according to a second embodiment of the present disclosure.

FIG. 15 is an explanatory diagram for describing an example of a technique related to generation of a PUF value according to the embodiment.

FIG. 16 is an explanatory diagram for describing an example of a technique related to generation of a PUF value according to the embodiment.

FIG. 17 is an explanatory diagram for describing an example of a method of generating a PUF value according to the embodiment.

FIG. 18 is an explanatory diagram for describing an example of a method of generating a PUF value according to the embodiment.

FIG. 19 is a block diagram illustrating an example of a functional configuration of a solid-state imaging device according to the embodiment.

FIG. 20 is a flowchart illustrating an example of a flow of a series of processes of a solid-state imaging device according to the embodiment.

FIG. 21 is a flowchart illustrating an example of a flow of a series of processes of a solid-state imaging device 1 according to the embodiment.

FIG. 22 is a block diagram illustrating an example of a schematic functional configuration of an imaging device applied to biometric authentication.

FIG. 23 is a block diagram illustrating another example of a schematic functional configuration of an imaging device applied to biometric authentication.

FIG. 24 is a block diagram illustrating another example of a schematic functional configuration of an imaging device applied to biometric authentication.

FIG. 25 is a block diagram illustrating an example of a schematic system configuration of a biometric authentication system.

FIG. 26 is a block diagram illustrating an example of a schematic functional configuration of an imaging device constituting a biometric authentication system.

FIG. 27 is a block diagram illustrating an example of a schematic functional configuration of a server constituting a biometric authentication system.

FIG. 28 is a block diagram illustrating an example of a schematic configuration of a vehicle control system.

FIG. 29 is an explanatory diagram illustrating an example of installation positions of a vehicle outside information detecting section and the imaging section.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Configuration example of solid-state imaging device
1.1. Schematic configuration
1.2. Functional structure
1.3 Circuit configuration of unit pixel 2. Overview of PUF
3. First Embodiment
  3.1. Configuration example
  3.2. Operation example
4. Second Embodiment
  4.1. Basic concept
  4.2. Method of generating PUF value
  4.3. Functional configuration
  4.4. Process
  4.5. Evaluation
5. Application examples
  5.1. Application example to biometric authentication system
  5.2. Application example to mobile object
  5.3. Application example to mobile object
6. Conclusion

1. Configuration Example of Solid-State Imaging Device

A configuration example of a solid-state imaging device according to the present embodiment will be described below.

1.1. Schematic Configuration

FIG. 1 illustrates a schematic configuration of a complementary metal oxide semiconductor (CMOS) solid-state imaging device as an example of a configuration of a solid-state imaging device according to an embodiment of the present disclosure. A CMOS solid-state imaging device is applied to solid-state imaging devices of respective embodiments. As illustrated in FIG. 1, a solid-state imaging device 1 of the present embodiment includes a pixel array (a so-called pixel region) 3 in which pixels 2 including a plurality of photoelectric conversion units are regularly arranged on a semiconductor substrate 11 such as a silicon substrate in a two-dimensional array form and a peripheral circuit section. Each of the pixels 2 includes, for example, a photodiode serving as a photoelectric conversion unit and a plurality of pixel transistors (so-called MOS transistors). The plurality of pixel transistors may include three transistors, for example, a transfer transistor, a reset transistor, and an amplifying transistor. Further, the plurality of pixel transistors may include four transistors additionally including a selecting transistor. An example of an equivalent circuit of a unit pixel will be described later. The pixel 2 may be configured as one unit pixel. Further, the pixel 2 may have a shared pixel structure. The shared pixel structure is configured with a plurality of photodiodes, a plurality of transfer transistors, one floating diffusion which is shared, and another pixel transistor which is shared. In other words, in a shared pixel, photodiodes and transfer transistors constituting a plurality of unit pixels are configured to share another pixel transistor.

The peripheral circuit section includes a vertical driving circuit 4, a column signal processing circuit 5, a horizontal driving circuit 6, an output circuit 7, a control circuit 8, and the like.

The control circuit 8 receives an input clock and data instructing an operation mode or the like, and outputs data such as internal information of the solid-state imaging device. In other words, the control circuit 8 generates a clock signal or a control signal serving as the basis of operations of the vertical driving circuit 4, the column signal processing circuit 5, the horizontal driving circuit 6, and the like on the basis of a vertical synchronizing signal, a horizontal synchronizing signal, and a master clock. Then, the signals are input to the vertical driving circuit 4, the column signal processing circuit 5, the horizontal driving circuit 6, and the like.

The vertical driving circuit 4 is configured with, for example, a shift register, and selects a pixel drive wiring, supplies pulses for driving the pixels to the selected pixel drive wiring, and drives the pixels in units of rows. In other words, the vertical driving circuit 4 sequentially selects and scans the pixels 2 of the pixel array 3 in the vertical direction in units of rows, and supplies a pixel signal based on signal charges generated in accordance with a quantity of light received in, for example, a photodiode serving as the photoelectric conversion unit of each pixel 2 via a vertical signal line 9 to the column signal processing circuit 5.

The column signal processing circuit 5 is arranged, for example, for each column of the pixels 2, and performs signal processing such as noise removal on the signals output from the pixels 2 of one row for each column of the pixels. In other words, the column signal processing circuit 5 performs signal processing such as CDS for removing a fixed pattern noise inherent to the pixel 2, signal amplification, AD conversion, and the like. A horizontal selection switch (not illustrated) is disposed at an output end of the column signal processing circuit 5 to be connected with a horizontal signal line 10.

The horizontal driving circuit 6 is configured with, for example, a shift register, and sequentially outputs horizontal scanning pulses to sequentially select the column signal processing circuits 5 and causes pixel signals to be output from the column signal processing circuits 5 to the horizontal signal line 10.

The output circuit 7 performs signal processing on the signals sequentially supplied from the column signal processing circuits 5 via the horizontal signal line 10 and outputs a resulting signal. For example, only buffering may be performed, or black level adjustment, column variation correction, various kinds of digital signal processing, or the like may be performed. An input/output terminal 12 exchanges signals with the outside.

FIG. 2 is a diagram illustrating an overview of a configuration example of a stack type solid-state imaging device to which the technology according to an embodiment of the present disclosure can be applied.

A of FIG. 2 illustrates a schematic configuration example of a non-stack type solid-state imaging device. A solid-state imaging device 23010 includes one die (semiconductor substrate) 23011 as illustrated in FIG. A of FIG. 2. A pixel region 23012 in which pixels are arranged in an array form, a control circuit 23013 that performs driving of pixels and various kinds of other control, and a logic circuit 23014 for signal processing are disposed on the die 23011.

B and C of FIG. 2 illustrate schematic configuration examples of stack type solid-state imaging devices. As illustrated in B and C of FIG. 2, a solid-state imaging device 23020 includes two dies including a sensor die 23021 and a logic die 23024 which are stacked and electrically connected to each other and configured as a single semiconductor chip.

In B of FIG. 2, a pixel region 23012 and a control circuit 23013 are disposed on the sensor die 23021, and a logic circuit 23014 including a signal processing circuit that performs signal processing is disposed on the logic die 23024.

In C of FIG. 2, a pixel region 23012 is disposed on the sensor die 23021, and a control circuit 23013 and a logic circuit 23014 are disposed on the logic die 23024.

FIG. 3 is a cross-sectional view illustrating a first configuration example of the stack type solid-state imaging device 23020.

A photodiode (PD), a floating diffusion (FD), a Tr (MOS FET) constituting a pixel serving as the pixel region 23012, a Tr serving as the control circuit 23013, and the like are formed on the sensor die 23021. Further, a wiring layer 23101 including a plurality of layers, that is, three layers of wirings 23110 in this example, is formed on the sensor die 23021. The control circuit 23013 (the Tr serving thereas) may be configured on the logic die 23024 instead of the sensor die 23021.

The Tr constituting the logic circuit 23014 is formed on the logic die 23024. Further, a wiring layer 23161 including a plurality of layers, that is, three layers of wirings 23170 in in this example are formed on the logic die 23024. Further, in the logic die 23024, a contact hole 23171 in which an insulating film 23172 is formed on an inner wall surface thereof is formed, and the contact hole 23171 is filled with a connection conductor 23173 connected with a wiring 23170 or the like.

The sensor die 23021 and the logic die 23024 are attached to each other so that the wiring layers 23101 and 23161 face each other, and the stack type solid-state imaging device 23020 in which the sensor die 23021 and the logic die 23024 are stacked is constituted accordingly. A film 23191 such as a protection film is formed on the surface to which the sensor die 23021 and the logic die 23024 are attached.

A contact hole 23111 that extends from the back side of the sensor die 23021 (the side on which light is incident on the PD) (the upper side), penetrates the sensor die 23021, and reaches the wiring 23170 of the uppermost layer of the logic die 23024 is formed in the sensor die 23021. Further, in the sensor die 23021, a contact hole 23121 that extends from the back side of the sensor die 23021 and reaches the wiring 23110 of the first layer is formed at a position close to the contact hole 23111. An insulating film 23112 is formed on an inner wall surface of the contact hole 23111, and an insulating film 23122 is formed on an inner wall surface of the contact hole 23121. Further, the contact holes 23111 and 23121 are filled with connection conductors 23113 and 23123, respectively. The connection conductor 23113 and the connection conductor 23123 are electrically connected to each other on the back side of the sensor die 23021, and thus the sensor die 23021 and the logic die 23024 are electrically connected to each other via the wiring layer 23101, the contact hole 23121, the contact hole 23111, and the wiring layer 23161.

FIG. 4 is a cross-sectional view illustrating a second configuration example of the stack type solid-state imaging device 23020.

In the second configuration example of the solid-state imaging device 23020, ((the wiring 23110 of) the wiring layer 23101 of) the sensor die 23021 and ((the wiring 23170 of) the wiring layer 23161 of) the logic die 23024 are electrically connected to each other via one contact hole 23211 formed in the sensor die 23021.

In other words, in FIG. 4, the contact hole 23211 is formed to extend from the back side of the sensor die 23021, penetrate the sensor die 23021, reach the wiring 23170 of the uppermost layer of the logic die 23024, and reach the wiring 23110 of the uppermost layer of the sensor die 23021. An insulating film 23212 is formed on an inner wall surface of the contact hole 23211, and the contact hole 23211 is filled with a connection conductor 23213. In FIG. 3, the sensor die 23021 and the logic die 23024 are electrically connected to each other via the two contact holes 23111 and 23121, whereas in FIG. 4, the sensor die 23021 and the logic die 23024 are electrically connected to each other via one contact hole 23211.

FIG. 5 is a cross-sectional view illustrating a third configuration example of the stack type solid-state imaging device 23020.

The solid-state imaging device 23020 of FIG. 5 differs from that of FIG. 3 in which the film 23191 such as the protection film is formed on the surface to which the sensor die 23021 and the logic die 23024 are attached to each other in that the film 23191 such as the protection film is not formed on the surface to which the sensor die 23021 and the logic die 23024 are attached to each other.

The solid-state imaging device 23020 in FIG. 5 is configured such that the sensor die 23021 and the logic die 23024 overlap so that the wirings 23110 and 23170 are in direct contact with each other, and the wirings 23110 and 23170 are directly joined by heating while applying a necessary weight.

FIG. 6 is a cross-sectional view illustrating another configuration example of the stack type solid-state imaging device to which the technology according to an embodiment of the present disclosure can be applied.

In FIG. 6, a solid-state imaging device 23401 has a three-layer stacked structure in which three dies including a sensor die 23411, a logic die 23412, and a memory die 23413 are stacked.

The memory die 23413 includes, for example, a memory circuit that stores data which is temporarily necessary in signal processing performed by the logic die 23412.

In FIG. 6, the logic die 23412 and the memory die 23413 are stacked under the sensor die 23411 in the described order, but the logic die 23412 and the memory die 23413 may be stacked in reverse order, that is, the memory die 23413 and the logic die 23412 may be stacked under the sensor die 23411 in the described order.

In FIG. 6, a PD serving as a pixel photoelectric conversion units and a source/drain region of a pixel Tr are formed on the sensor die 23411.

A gate electrode is formed around the PD with a gate insulating film interposed therebetween, and a pixel Tr 23421 and a pixel Tr 23422 are formed by a source/drain region which forms a pair with the gate electrode.

The pixel Tr 23421 adjacent to the PD is a transfer Tr, and one of a pair of source/drain regions constituting the pixel Tr 23421 is an FD.

An inter-layer insulating film is formed on the sensor die 23411, and a contact hole is formed in the inter-layer insulating film. A connection conductor 23431 connected to the pixel Tr 23421 and the pixel Tr 23422 is formed in the contact hole.

Further, a wiring layer 23433 including a plurality of layers of wirings 23432 connected to the connection conductors 23431 is formed in the sensor die 23411.

An aluminum pad 2334 serving as an electrode for external connection is formed in the lowermost layer of the wiring layer 23433 of the sensor die 23411. In other words, in the sensor die 23411, the aluminum pad 23434 is formed at a position closer to a bonding surface 23440 with the logic die 23412 than the wiring 23432. The aluminum pad 23434 is used as one end of a wiring related to an input and output of a signal with the outside.

Further, a contact 23441 used for electrical connection with the logic die 23412 is formed on the sensor die 23411. The contact 23441 is connected to a contact 23451 of the logic die 23412 and also connected to the aluminum pad 23442 of the sensor die 23411.

In the sensor die 23411, a pad hole 23443 is formed to extend from the back side of the sensor die 23411 (the upper side) and reach the aluminum pad 23442.

The technology according to an embodiment of the present disclosure can be applied to the above-described solid-state imaging devices.

In the examples described with reference to FIGS. 3 to 6, for example, a copper (Cu) wiring is used for various kinds of wirings. In the following description, a structure in which wirings (for example, the wirings 23110 and 23170 illustrated in FIG. 5) are directly joined between the sensor dies stacked on each other as illustrated in FIG. 5 is also referred to as a "Cu—Cu junction."

1.2. Functional Configuration

Next, an example of a functional configuration of a solid-state imaging device according to an embodiment of the present disclosure will be described with reference to FIG. 7. FIG. 7 is a block diagram illustrating an example of a functional configuration of a part of a solid-state imaging device according to an embodiment of the present disclosure. A solid-state imaging device 1 illustrated in FIG. 7 is an imaging element that images a subject and obtains digital data of a captured image such as a CMOS image sensor or a CCD image sensor.

As illustrated in FIG. 7, the solid-state imaging device 1 includes a control unit 101, a pixel array unit 111, a selecting unit 112, an A/D converting unit (analog digital converter (ADC)) 113, and a constant current circuit unit 114.

The control unit 101 controls the respective units of the solid-state imaging device 1 such that a process related to reading of image data (pixel signals) or the like is performed.

The pixel array unit 111 is a pixel region in which pixels having the photoelectric conversion element such as the photodiode are arranged in a matrix (array) form. Under the control of the control unit 101, the pixel array unit 111 receives light of the subject through the pixels, performs photoelectric conversion on incident light, accumulates electric charges, and outputs the electric charges accumulated in the pixels as pixel signals at a predetermined timing.

A pixel 121 and a pixel 122 indicate two pixels vertically adjacent to each other in a group of pixels arranged in the pixel array unit 111. The pixel 121 and the pixel 122 are pixels in consecutive rows in the same column. In the case of the example of FIG. 7, a photoelectric conversion element and four transistors are used for each pixel circuit as indicated in the pixel 121 and the pixel 122. A circuit configuration of each pixel is arbitrary and may be different from the example illustrated in FIG. 7.

A common pixel array includes an output line of a pixel signal for each column. In the case of the pixel array unit 111, two (two system) output lines are installed for each column. The pixel circuits in one column are alternately connected to the two output lines every other row. For example, a circuit of a pixel in an odd-numbered row from the top is connected to one output line, and a circuit of a pixel in an even-numbered row is connected to the other output line. In the case of the example of FIG. 7, the circuit of the pixel 121 is connected to a first output line (VSL1), and the circuit of the pixel 122 is connected to a second output line (VSL2).

In FIG. 7, for the sake of convenience of description, only one column of output lines is illustrated, but practically, two output lines are similarly installed for each column. Circuits of pixels in that column are connected to each output line every other row.

The selecting unit 112 includes a switch that connects the output lines of the pixel array unit 111 to an input of the ADC 113 and is controlled by the control unit 101 such that the selecting unit 112 controls a connection between the pixel array unit 111 and the ADC 113. In other words, the pixel signal read from the pixel array unit 111 is supplied to the ADC 113 via the selecting unit 112.

The selecting unit 112 has a switch 131, a switch 132, and a switch 133. The switch 131 (selecting SW) controls a connection between the two output lines corresponding to the same column. For example, if the switch 131 enters an on state, the first output line (VSL1) and the second output line (VSL2) are connected, and if the switch 131 enters an OFF state, the first output line (VSL1) and the second output line (VSL2) are disconnected.

As will be described in detail later, in the solid-state imaging device 1, one ADC is disposed for each output line (a column ADC). Therefore, if both the switch 132 and the switch 133 are assumed to be in the on state, when the switch 131 enters the on state, the two output lines of the same column are connected, and thus the circuit of one pixel is connected to the two ADCs. Conversely, when the switch 131 enters the OFF state, the two output lines of the same column are disconnected, and the circuit of one pixel is connected to one ADC. In other words, the switch 131 selects the number of ADCs (column ADCs) to which a signal of one pixel is output.

As will be described in detail later, the switch 131 controls the number of ADCs to which the switch 131 outputs the pixel signal, and thus the solid-state imaging device 1 is able to output more various pixel signals in accordance with the number of the ADCs. In other words, the solid-state imaging device 1 is able to implement more diverse data output.

The switch 132 controls a connection between the first output line (VSL1) corresponding to the pixel 121 and the ADC corresponding to the output line thereof. If the switch 132 enters the ON state, the first output line is connected to one input of a comparator of the corresponding ADC. Further, if the switch 132 enters the OFF state, the first output line is disconnected therefrom.

The switch 133 controls a connection between the second output line (VSL2) corresponding to the pixel 122 and the ADC corresponding to the output line thereof. If the switch 133 enters the ON state, the second output line is connected to one input of a comparator of the corresponding ADC. Further, when the switch 133 enters the OFF state, the second output line is disconnected therefrom.

According to the control of the control unit 101, the selecting unit 112 is able to control the number of ADCs (column ADCs) to which a signal of one pixel is output by switching the states of the switches 131 to 133 as described above.

Further, (either or both of) the switch 132 and the switch 133 may be omitted, and each output line may be consistently connected with the ADC corresponding to the output line. However, since it is possible to control a connection or a disconnection through the switches, a range of selection of the number of ADCs (column ADCs) to which the signal of one pixel is output is increased. In other words, since the switches are disposed, the solid-state imaging device 1 is able to output more various pixel signals.

In FIG. 7, only the configuration for the output lines of one column is illustrated, but practically, the selecting unit 112 has a configuration (the switches 131 to 133) similar to that illustrated in FIG. 7 for each column. In other words, the selecting unit 112 performs connection control similar to that described above for each column under the control of the control unit 101.

The ADC 113 performs A/D conversion on the pixel signals supplied from the pixel array unit 111 via the respective output lines, and outputs the resulting signals as digital data. The ADC 113 includes an ADC (column ADC) for each output line from the pixel array unit 111. In other words, the ADC 113 includes a plurality of column ADCs. A column ADC corresponding to one output line is a single slope type ADC including a comparator, a D/A converter (DAC), and a counter.

The comparator compares the DAC output with a signal value of the pixel signal. The counter increments a count value (digital value) until the pixel signal is equal to the DAC output. The comparator stops the counter if the DAC output reaches the signal value. Thereafter, digital signals obtained by counters 1 and 2 are output to the outside of solid-state imaging device 1 as DATA1 and DATA2.

The counter resets the count value to an initial value (for example, 0) after outputting data for next A/D conversion.

The ADC 113 includes two systems of column ADCs for each column. For example, a comparator 141 (COMP1), a DAC 142 (DAC1), and a counter 143 (counter 1) are disposed for the first output line (VSL1), and a comparator 151 (COMP2), a DAC 152 (DAC2), and a counter 153 (counter 2) are disposed for the second output line (VSL2). Although not illustrated, the ADC 113 has a similar configuration for the output lines of other columns.

However, the DAC may be shared among the components. The DAC is shared for each system. In other words, the DAC of the same system of each column is shared. In the example of FIG. 7, the DAC corresponding to the first output line (VSL1) of each column is shared as the DAC 142, and the DAC corresponding to the second output line (VSL2) of each column is shared as the DAC 152. The comparator and the counter are disposed for each system of each output line.

The constant current circuit unit 114 is a constant current circuit connected to each output line and is driven in accordance with control of the control unit 101. The circuit of the constant current circuit unit 114 is configured with, for example, a metal oxide semiconductor (MOS) transistor or the like. The circuit configuration is arbitrary, but in FIG. 7, for the sake of convenience of description, a MOS transistor 161 (LOAD1) is disposed for the first output line (VSL1), and the MOS transistor 162 (LOAD2) is disposed for the second output line (VSL2).

The control unit 101 receives a request from an external source such as the user, selects a read mode, controls the selecting unit 112, and controls a connection with the output line. Further, the control unit 101 controls driving of the column ADC in accordance with the selected read mode. Further, in addition to the column ADC, the control unit 101 controls driving of the constant current circuit unit 114 as necessary or controls driving of the pixel array unit 111, for example, a read rate or timing or the like.

In other words, the control unit 101 is able to operate the components other than the selecting unit 112 in various modes in addition to control of the selecting unit 112. Therefore, the solid-state imaging device 1 is able to output more various pixel signals.

The number of each unit illustrated in FIG. 7 is arbitrary as long as it is not in-sufficient. For example, output lines of three or more system may be disposed for each column. Further, the number of pixel signals output in parallel to the outside may be increased by increasing the number of pixel signals output in parallel from the ADC 132 and the number of ADCs 132 in FIG. 7.

An example of the functional configuration of a solid-state imaging device according to an embodiment of the present disclosure has been described above with reference to FIG. 7.

1.3. Circuit Configuration of Unit Pixel

Next, an example of a circuit configuration of the unit pixel will be described with reference to FIG. 8. FIG. 8 is a diagram illustrating an example of a circuit configuration of the unit pixel according to an embodiment of the present disclosure. As illustrated in FIG. 8, the unit pixel 121 according to an embodiment of the present disclosure includes a photoelectric conversion unit, for example, a photodiode PD, and four pixel transistors. The four pixel transistors include, for example, a transfer transistor Tr 11, a reset transistor Tr 12, an amplifying transistor Tr 13, and a selecting transistor Tr 14. Each of the pixel transistors is able to be configured with, for example, an n-channel MOS transistor.

The transfer transistor Tr 11 is connected between a cathode of the photodiode PD and a floating diffusion section FD. The photoelectric conversion is performed in the photodiode PD, and signal charges (here, electrons) accumulated in the photodiode PD are transferred to the floating diffusion section FD when a transfer pulse pTRG is applied to a gate. Reference numeral Cfd schematically illustrates a parasitic capacitor of the floating diffusion section FD.

In the reset transistor Tr 12, a gate is connected to a power voltage VDD, and a source is connected to the floating diffusion section FD. Then, before the signal charges are transferred from the photodiode PD to the floating diffusion section FD, a reset pulse pRST is applied to the gate, and thus a potential of the floating diffusion section FD is reset.

In the amplifying transistor Tr 13, a drain is connected to the floating diffusion section FD, a drain is connected to the power voltage VDD, and a source is connected to a drain of the selecting transistor Tr 14. The amplifying transistor Tr 13 outputs the potential of the floating diffusion section FD reset by the reset transistor Tr 12 to the selecting transistor Tr 14 as a reset level. Further, the amplifying transistor Tr 13 outputs the potential of the floating diffusion section FD after the signal charges are transferred by the transfer transistor Tr 11 to the selecting transistor Tr 14 as a signal level.

In the selecting transistor Tr 14, for example, a drain is connected to the source of the amplifying transistor Tr 13, and a source is connected to the vertical signal line 9. Then, when a selection pulse φSEL is applied to the gate of the selecting transistor Tr 14, the selecting transistor Tr 14 enters the ON state, and the signal output from amplifying transistor Tr 13 is output to the vertical signal line 9. It is also possible to employ a configuration in which the selecting transistor Tr 14 is connected between the power voltage VDD and the drain of the amplifying transistor Tr 13.

In the case in which the solid-state imaging device 1 according to the present embodiment is configured as a stack type solid-state imaging device, for example, elements such as the photodiode and a plurality of MOS transistors are formed on the sensor die 23021 in B or C of FIG. 2. Further, the transfer pulse, the reset pulse, the selecting pulse, and the power voltage are supplied from the logic die 23024 in B or C of FIG. 2. Further, an element at a stage subsequent to the vertical signal line 9 connected to the drain of the selecting transistor is configured with the logic circuit 23014 and formed on the logic die 23024.

An example of the circuit configuration of the unit pixel has been described above with reference to FIG. 8.

2. Overview of PUF

Next, an overview of a physically unclonable function (PUF) will be described. The PUF is a function that outputs a value specific to a device using a physical characteristic that is difficult to copy. Examples of the PUFs include an Arbiter PUF, an SRAM PUB, and a Glitch PUF.

For example, the Arbiter PUF is a technique of outputting a value specific to the device using a delay difference between signals arriving at a circuit called an Arbiter via two paths. The SRAM PUF is a technique of outputting a value specific to the device using a difference in an initial value immediately after electric power is supplied to a static random access memory (SRAM). The Glitch PUF is a technique of outputting a value specific to the device using a phenomenon called a Glitch caused by a delay relation between input and output signals of gates constituting a logic circuit.

Since the value specific to the device generated using such a PUF is difficult to copy, for example, the value is expected to be used as an identifier (ID) identifying an individual device or so-called key information (for example, an encryption key).

The overview of the PUF has been described above. In the following description, the value specific to the device generated using the PUF is also referred to as a "PUF value."

3. First Embodiment

A solid-state imaging element that completes an encryption process internally will be described as a first embodiment. In the past, a technique of generating an encryption key inside an imaging device on the basis of specific information specific to a solid-state imaging element has been known. However, if the specific information is output from the solid-state imaging element and encrypted by a functional block different from the solid-state imaging element, the specific information used for the encryption is likely to leak out.

In this regard, in the first embodiment, a solid-state imaging element that internally completes the encryption process using the specific information without outputting the specific information to the outside will be described.

3.1. Configuration Example

FIG. 9 is an explanatory diagram illustrating a functional configuration example of a solid-state imaging element according to the first embodiment of the present disclosure. FIG. 9 illustrates a functional configuration example of the solid-state imaging device 1 which internally completes the encryption process using the specific information. The functional configuration example of the solid-state imaging element according to the first embodiment of the present disclosure will be described below with reference to FIG. 9.

As illustrated in FIG. 9, the solid-state imaging device 1 according to the first embodiment of the present disclosure includes a drive control unit 210, a pixel array unit 211 having a predetermined matrix configuration including an imaging unit 212 and a specific information generating unit 214, a clipping circuit 215, a reference signal generating unit 216, a current source 217, a detecting unit 218, a specific value calculating unit 220, an encrypting unit 222, and a communication control unit 224.

On the basis of a predetermined input clock and data, the drive control unit 210 generates signals for driving the imaging unit 212 and the specific information generating unit 214 to be described later and drives the imaging unit 212 and the specific information generating unit 214. The drive control unit 210 may include, for example, the control circuit 8, the vertical driving circuit 4, and the horizontal driving circuit 6 in the configuration of the solid-state imaging device 1 described above with reference to FIG. 1. Further, the drive control unit 210 may be disposed in the control circuit 23013 illustrated in FIG. 2.

The drive control unit 210 may have a function of switching the driving of the imaging unit 212 and the driving of the specific information generating unit 214 when the pixel array unit 211 is driven. Since the drive control unit 210 has the function of switching the driving of the imaging unit 212 and the driving of the specific information generating unit 214, it is possible to share the circuits of the imaging unit 212 and the specific information generating unit 214. Further, since the drive control unit 210 has the function of switching the driving of the imaging unit 212 and the driving of the specific information generating unit 214, a special element for generating the specific information is not necessary, and it is difficult to analyze the specific value.

Further, the drive control unit 210 may have a function of separating an element driven for outputting an image in the pixel array unit 211 and an element driven for detecting element-specific information. Since the drive control unit 210 may have the function of separating the element driven for outputting an image and the element driven for detecting element-specific information, the element-specific information does not leak out.

Further, the drive control unit 210 may perform control such that driving for detecting the element-specific information is performed in accordance with a bias current different from that when driving for outputting an image is performed. When the drive control unit 210 performs control such that driving for detecting the element-specific information is performed in accordance with a bias current different from that when driving for outputting an image is performed, driving suitable for stably obtaining the specific value can be performed. Specifically, for example, when the driving for detecting the element-specific information is performed, driving of the MOS transistor 161 (LOAD1) and the MOS transistor 162 (LOAD2) in the circuit illustrated in FIG. 7 is different from that when the driving for driving an image is performed. It is possible to change a characteristic shown in the amplifying transistor AMP by changing the driving of the MOS transistor 161 (LOAD1) and the MOS transistor 162 (LOAD2). When the drive control unit 210 performs control such that the driving for detecting the element-specific information is performed in accordance with a bias current corresponding to a temperature, it is possible to perform driving suitable for obtaining the specific value more stably.

When the driving for detecting the element-specific information is performed in accordance with a bias current different from that when the driving for outputting the image is driven, the drive control unit 210 may perform control such that the driving is performed in accordance with a bias current corresponding to a chip temperature of the solid-state imaging device 1.

The pixel array unit 211 is configured such that the unit pixels having a predetermined matrix configuration are arranged, and data is output through a source follower circuit.

The imaging unit 212 includes a pixel array in which pixels including a plurality of photoelectric conversion units are arranged in a two-dimensional array form and is driven by the drive control unit 210 and outputs an analog signal. Each pixel in the imaging unit 212 has, for example, a circuit configuration illustrated in FIG. 8.

In the specific information generating unit 214, for example, circuits having the same configuration as the pixels provided in the imaging unit 212 are arranged one-dimensionally, and driven by the drive control unit 210 to output an analog signal. The circuit formed as the specific information generating unit 214 may be manufactured through substantially the same manufacturing process as the pixel disposed in the imaging unit 212. Further, the drive control unit 210 may perform switching between the driving of the imaging unit 212 and the driving of the specific information generating unit 214.

The specific information generating unit 214 may be a pixel disposed in an optical black (OPB) region in the pixel array. Each element in the circuit configured as the specific information generating unit 214 has a physical variation at the time of manufacturing. The solid-state imaging device 1 according to the first embodiment of the present disclosure uses the analog signal output from the specific information generating unit 214 as the basis of non-copiable specific information (element-specific information).

An example of a generation source of the analog signal output from the specific information generating unit 214 will be described. In the following description, the specific information generating unit 214 is assumed to have a configuration similar to the pixel 121 illustrated in FIGS. 7 and 8.

Photodiode PD

The photodiode PD has a noise component which is caused by a crystal defect at the time of manufacturing. The crystal defect causes a variation in a dark current. The crystal defect appears as a fixed pattern noise.

Selecting Transistor SEL

The selecting transistor SEL has a noise component which is caused by a variation in a threshold voltage Vth. The variation in the threshold voltage Vth is caused by structural factors such as an oxide film, a channel width, a channel length, impurities, or the like. The variation in the threshold voltage Vth appears as a fixed pattern noise.

Reset Transistor RST

The reset transistor RST also has a noise component which is caused by a variation in a threshold voltage Vth. The variation in the threshold voltage Vth is caused by structural factors such as an oxide film, a channel width, a channel length, impurities, or the like. The variation in the threshold voltage Vth appears as a fixed pattern noise.

Floating Diffusion Section FD

The floating diffusion section FD has a noise component which is caused by a crystal defect at the time of manufacturing. The crystal defect causes a variation in a dark current. The crystal defect appears as a fixed pattern noise. A kTC noise (reset noise) appears in the floating diffusion section FD when the reset transistor RST is switched from the ON state to the OFF state. The kTC noise occurs temporarily. When the reset transistor RST is switched from the ON state to the OFF state, a feedthrough appears in the floating diffusion section FD. The feedthrough is caused by a variation in a parasitic capacitance or a threshold value and appears as a fixed pattern noise.

Amplifying Transistor AMP

The amplifying transistor AMP also has a noise component which is caused by a variation in a threshold voltage Vth. The variation in the threshold voltage Vth is caused by structural factors such as an oxide film, a channel width, a channel length, impurities, or the like. The variation in the threshold voltage Vth appears as a fixed pattern noise. The amplifying transistor AMP also has a noise component which is caused by an overdrive voltage, a noise component which is caused by a thermal noise, a noise component which is caused by a 1/f noise, and a noise component which is caused by a random telegraph noise (RTN). The RTN is considered to be caused by trapping/detrapping of electric charges caused by a defect in an oxide film. The presence or absence of a defect in an oxide film is an intrinsic variation, but a fluctuation in a temporal binary or multivalued signal level is observed.

The noise components are transmitted to the detecting unit 218 at a subsequent stage via the signal line (VSL). At the time of normal driving, a noise component that does not change before and after the signal transfer among the noise components is removed through a CDS process. In the present embodiment, when the specific value is generated, the solid-state imaging device 1 does not remove the noise components but uses them as the element-specific information serving as the basis of the specific value. Since the noise component included in the analog signal output from the specific information generating unit 214 is used as the basis of the specific value, the solid-state imaging device 1 is able to generate the specific value that is hard to be analyzed.

The specific information generating unit 214 may be disposed, for example, at a position which external light does not reach (a light-shielded position). Since the specific information generating unit 214 is disposed at the light-shielded position, the solid-state imaging device 1 is able to stably generate the specific information without being affected by external light. Further, the specific information generating unit 214 may include one or more circuits which are equal in number to the columns of the pixel array of the imaging unit 212. Further, the specific information generating unit 214 may be provided with a row selection switch that operates in accordance with a control signal given from the drive control unit 210.

The clipping circuit 215 is a circuit arranged in n columns which are equal in number to the columns of the pixel array unit 211, and is a source follower circuit connected in parallel to the source follower circuit of the pixel array unit 211. The clipping circuit 215 has a function of clipping so that a voltage (a VSL voltage) of the output line of each column is a predetermined range.

FIG. 10A is an explanatory diagram illustrating a circuit configuration example of the clipping circuit 215. The clipping circuit 215 is a row selectable source follower circuit connected to the output lines VSL in parallel with the pixels. The clipping circuit 215 includes transistors CLPSEL and CLPAMP corresponding to each output line VSL. The transistor CLPSEL is a transistor that performs a linear operation and performs control such that a source of the transistor CLPAMP is connected with the output line VSL. The control is performed in accordance with a clip selecting pulse. The transistor CLPAMP is a transistor that performs a saturation operation, and outputs a signal corresponding to an input if a bias current flows through it by a current source, similarly to the amplifying transistor AMP of the pixel. The input is applied in accordance with a clip voltage and usually an intermediate potential of about 1 V to 2 V.

In the selected state, if an output voltage of the source follower (the pixel in the selected row) connected to the output line VSL becomes lower than a voltage output in accordance with the clip voltage, the bias current preferentially flows to the clipping circuit 215. As a result, the source follower output of the pixel in the selected row no longer functions, and the voltage of the output line VSL is clipped to an output level corresponding to the clip voltage. A common DC voltage is supplied to a unit clipping circuit of each column as the clip voltage, but at this time, a threshold variation or an overdrive voltage vary individually occurs, similarly to the pixel source follower.

The reference signal generating unit 216 averages the VSL voltage output from the clipping circuit 215 for each column and outputs a resulting voltage. A current source 217 is a circuit that supplies a constant current and outputs a VSL voltage and is driven by a current control voltage generating unit 219. The current source 217 is arranged in n columns and forms a source follower circuit with the amplifying transistor in the unit pixel. The current control voltage generating unit 219 generates a current control voltage through a band gap reference circuit so that a current value of the current source 217 does not depend on the temperature.

The detecting unit 218 performs signal processing for converting an analog signal output from the specific information generating unit 214 into a digital signal. The detecting unit 218 includes a comparator 231, a DA converter 232, and a counter 233. The comparator 231 compares the VSL voltage output from the current source 217 with a reference waveform output from the DA converter 232 and converts a voltage into a time. The comparator 231 includes an input capacitor disposed on an input side and a switch that causes the input and the output of the comparator 231 to be short-circuited. The DA converter 232 generates the reference waveform to be supplied to the comparator 231. The counter 233 has a function of counting until the output of the comparator 231 is reversed and converting a time into a count number.

The detecting unit 218 outputs the converted digital signal to the specific value calculating unit 220. In addition to the function of converting an analog signal into a digital signal, the detecting unit 218 may have a function of performing differential processing on two input signals and a function of removing a variation occurring in the detecting unit 218. Since the function of removing the variation occurring in the detecting unit 218 is provided, an unnecessary variation is not added to the signal output from the specific information generating unit 214, and thus it is possible to enhance the quality of the signal serving as the base of the specific value. Further, the detecting unit 218 may perform a column parallel process or a pixel parallel process on the analog signal output from the specific information generating unit 214.

The detecting unit 218 may be provided with a capacitor for clamping a potential of a signal line and a switch for setting one end of the capacitance to the reference potential. Specifically, the ADC 113 illustrated in FIG. 7 may include a switch that connects one end of a capacitive element disposed on an input side of each of the comparators 141 and 151 with an output side of each of the comparators 141 and 151. Since one end of the capacitive element is connected with the output side of the comparators 141 and 151 by the switch, a diode-connected transistor occurs in the transistors included in the comparators 141 and 151. Accordingly, since one end of the capacitor that clamps the potential of the signal line is set to a predetermined reference potential, it is possible to remove a variation in an analog region. Further, the detecting unit 218 may perform a differential process on the digital value obtained by the AD conversion. The detecting unit 218 is able to remove the variation in the digital region by performing the differential process on the digital value obtained by the AD conversion.

Further, the detecting unit 218 may have a function of shifting the clamp level as will be described later. Since the clamp level is shifted, the detecting unit 218 is able to optimize the distribution of analog values centering on a predetermined criterion when the analog value is converted into the digital value. Since the distribution of the analog values is optimized, it is possible to obtain the specific information output from the specific information generating unit 214 with no loss.

In a case in which a plurality of detecting units 218 are arranged, each of the detecting units 218 may have a function of obtaining a difference between a signal input to each of the detecting units 218 and a reference signal common to the plurality of detecting units 218. In this case, the reference signal common to a plurality of detecting units 218 may be substantially the same as an average of the signals input to the detecting units 218.

A memory that temporarily holds the specific information output from the specific information generating unit 214, in particular, an analog memory may be disposed between the specific information generating unit 214 and the detecting unit 218. A parasitic capacitor of the signal line may be used as the analog memory as will described below. Further, in a case in which the analog memory is disposed between the specific information generating unit 214 and each of a plurality of detecting units 218, a switch that causes the analog memories to be short-circuited may be disposed. It is easy to generate the specific information, and since the analog memories are short-circuited, and averaging is performed, the specific information held in each of the analog memories is erased.

FIG. 10B is an explanatory diagram illustrating a circuit configuration example of the reference signal generating unit 216, the current source 217, and the comparator 231. In FIG. 10B, an (n−1)-th output line VSL(n−1), an n-th output line VSL(n), and an (n+1)-th output line VSL(n+1) are illustrated.

Switches 251a and 252a are disposed in the output line VSL(n−1) as the reference signal generating unit 216, and a parasitic capacitor 253a is present in the output line VSL(n−1). Switches 251b and 252b are disposed in the output line VSL(n) as the reference signal generating unit 216, and a parasitic capacitor 253b is present in the output line VSL(n). Switches 251c and 252c are disposed in the output line VSL(n+1) as the reference signal generating unit 216, and a parasitic capacitor 253c is present in an output line VSL(n+1).

As the current source 217, a transistor 261a is connected to one end of the switch 252a, a transistor 261b is connected to one end of the switch 252b, and a transistor 261c is connected to one end of the switch 252c.

In the output line VSL(n−1), input capacitors 271a and 272a, switches 273a and 274a, and a comparator 275a are present as comparator 231. In the output line VSL(n), input capacitors 271b and 272b, switches 273b and 274b, and a comparator 275b are present as the comparator 231. In the output line VSL(n+1), input capacitors 271c and 272c, switches 273c and 274c, and a comparator 275c are present as the comparator 231.

FIG. 11A is an explanatory diagram illustrating operations of the reference signal generating unit 216, the current source 217, and the comparator 231 when the specific information is generated using a timing chart. Operations of the elements disposed on the output line VSL(n−1) or along the output line VSL(n−1) will be described below.

One horizontal read period starts at a time t1. At this point, the row selection signal φSEL transitions to a high level, and the row selection starts. Since the reset transistor RST is in the ON state at this point in time, a voltage of the floating diffusion section FD is fixed to VDD. Accordingly, the variation of the floating diffusion section FD is removed. Further, when the specific information is generated, the transfer pulse pTRG is fixed to a low level. Since the transfer pulse pTRG is fixed to the low level, the transfer transistor TRG is turned off, and it is possible to remove the variation of the photodiode PD.

Further, at the time t1, a current source disconnecting pulse for disconnecting the current source 217 has the high level, and the switch 252a is turned on. Further, at the time t1, a VSL averaging pulse for averaging the VSL voltage has the low level, and the switch 251a is turned off. Accordingly, although the source follower is operating, variation information of each source follower is output to the output line VSL.

At a time t2, the row selection signal (selecting pulse) φSEL and the current source disconnecting pulse transition to the low level simultaneously, and the VSL voltage of each column is held in the parasitic capacitor 253a of VSL. Further, at the time t2, the VSL averaging pulse transitions to the high level, and the VSL voltages of the respective columns are averaged. The averaged VSL voltage is the reference signal.

At a time t3, an internal offset of the comparator 275a and a difference between the VSL voltage and the reference waveform are charged in the input capacitor 272a, and an operating point of the comparator 275a is initialized.

At a time t4, a short circuit pulse transitions to the low level, and the switches 273a and 274a are turned off. Accordingly, the kTC noise and the feedthrough variation occur in the switches 273a and 274a.

A period from a time t5 to a time t6 is a first AD conversion period (a first ADC period). In this period, the DA converter 232 linearly changes the reference waveform with a predetermined inclination. The comparator 275a performs AD conversion on the reference signal using the reference waveform. The DA converter 232 may have a function of shifting the reference waveform. In other words, the DA converter 232 may have a function of shifting the clamp level. The DA converter 232 is able to add an offset to the output of the counter 233 by shifting the reference waveform. In the first ADC period, an inverted delay of the comparator 275a, a delay of the reference waveform, and a clock delay of the counter occur. In FIG. 11A, a triangle indicates an inversion timing of the comparator 275a.

if the first ADC period ends at the time t6, the row selection signal φSEL transitions to the high level, the current source disconnecting pulse transitions to the high level, and the VSL averaging pulse transitions to the low level. In other words, the switch 251a is turned off, and the switch 252a is turned on. Accordingly, although the source follower is operating, the variation information of each source follower (the variation in the output of the amplifying transistor) is output to the output line VSL.

A period from a time t7 to a time t8 is a second AD conversion period (a second ADC period). Further, in this period, the DA converter 232 linearly changes the reference waveform with a predetermined inclination. The comparator 275a performs AD conversion on the reference signal using the reference waveform. Here, the converted digital value includes the inverted delay of the comparator 275a, the delay of the reference waveform similarly, and the clock delay of the counter which occur in the first ADC period in addition to the kTC noise and the feedthrough variation in the switches 273a and 274a which occur at the time t4. In FIG. 11A, a triangle indicates an inversion timing of the comparator 275a.

Therefore, when the second ADC period ends, a differential process of the count value of the counter 233 in the first ADC period and the count value of the counter 233 in the second ADC period is performed. Through this differential process, it is possible to remove the variation occurring in the detecting unit 218. Therefore, it is possible to prevent the variation occurring in the detecting unit 218 from being included in the element-specific information.

Further, in the first ADC period, an offset is added to the output of the counter 233, and thus although the differential process is performed, the variation caused by the specific information generating unit 214 is not removed. The variation caused by the specific information generating unit 214 is normally distributed centering on the reference signal. Therefore, if there is no offset, a negative value occurs as the variation caused by the specific information generating unit 214, and all values of 0 or less become 0.

It is preferable that the inclination of the reference waveform at the time of AD conversion is adjusted (analog gain adjustment) so that a desired digital value is obtained. Further, when the element-specific information is read, an electric current of the current source (a drain current Id) may be decreased to be smaller than that at the time of normal reading. The overdrive voltage can be obtained by 2×Id/gm, but since the variation is also proportional to the overdrive voltage, if the drain current Id is decreased, a variation component of the overdrive voltage included in the source follower is relatively decreased. In other words, it is possible to mainly detect information of the variation in the threshold value of the amplifying transistor AMP. Further, when the element-specific information is read, the electric current of the current source (the drain current Id) may be increased to be larger than that at the time of normal reading. By increasing the electric current of the current source, it is possible to relatively increase the variation component of the overdrive voltage in the variation information included in the source follower.

A thermal noise of the amplifying transistor AMP, a 1/f noise, an RTN, or a thermal noise of a peripheral circuit is included as the temporal noise, but it is possible to suppress them by performing reading twice or more and adding (averaging) them.

In order to suppress temporal degradation, it is preferable to drive and control the solid-state imaging device 1 under the following conditions. It is preferable that the electric current during the operation is small in view of hot carrier injection. In other words, it is preferable to perform control so that the bias current is small. Similarly, it is preferable that the operation time be short in view of the hot carrier injection. For example, it is preferable to perform control so that it is driven only at the time of activation or request. Similarly, it is preferable not to supply the electric current when it is not in use in view of the hot carrier injection. In other words, it is preferable to turn off the selecting transistor SEL when it is not in use. Further, it is preferable that a voltage difference between a gate and a source or a drain of a target device be small in view of breakage of an oxide film when it is not in use. In other words, it is preferable to turn on the reset transistor RST when it is not in use. Further, it is preferable that the specific information generating unit 214 be light-shielded in view of substrate hot carrier injection.

A high level potential of the selected pulse p SEL is preferably about VDD (2.7 V) but may be an intermediate potential (about 1 V to 1.5 V). If the potential difference (VDS) between the drain and the source of the selecting transistor SEL is subject to the saturation operation, it becomes the source follower. For example, the drain voltage of the selecting transistor SEL is 2.7 V, and the drain side of the selecting transistor SEL (the source side of the amplifying transistor AMP) is normally about 2.2 V. On the other hand, it is possible to perform the saturation operation if VDS of the selecting transistor SEL is sufficient (if there is a difference of at least about several hundreds to 700 mV). Accordingly, an output corresponding to a gate voltage of the selecting transistor SEL is transferred to the output line VSL. If the selecting transistor SEL is subject to the saturation operation as in the amplifying transistor AMP, the threshold value and the overdrive voltage vary for each element, and thus it is possible to detect the variations in the threshold value and the overdrive voltage of the selecting transistor SEL. At this time, the pixels in the non-selected row and the clipping circuit 215 are not involved in reading since the selection switch is turned off.

The current control voltage generating unit 219 is able to change the overdrive voltage by driving the current control voltage with different voltages in the first ADC period and the second ADC period. At this time, since an amount of change in the overdrive voltage varies, it is possible to detect the amount of change in the overdrive voltage as the element-specific information.

FIG. 11B is an explanatory diagram illustrating operations of the reference signal generating unit 216, the current source 217, and the comparator 231 when the specific information is generated using a timing chart. Operations of the elements disposed on the output line VSL(n−1) or along the output line VSL(n−1) will be described below. The timing chart of FIG. 11A differs in that the current source disconnecting pulse and the VSL averaging pulse consistently have the low level.

One horizontal read period starts at a time t1. At this point, the row selection signal φSEL transitions to a high level, and the row selection starts. Since the reset transistor RST is in the ON state at this point in time, a voltage of the floating diffusion section FD is fixed to VDD. Accordingly, the variation of the floating diffusion section FD is removed. Further, when the specific information is generated, the transfer pulse pTRG is fixed to a low level. Since the transfer pulse pTRG is fixed to the low level, the transfer transistor TRG is turned off, and it is possible to remove the variation of the photodiode PD.

At a time t2, an internal offset of the comparator 275a and a difference between the VSL voltage and the reference waveform are charged in the input capacitor 272a, and an operating point of the comparator 275a is initialized.

At a time t3, a short circuit pulse transitions to the low level, and the switches 273a and 274a are turned off. Accordingly, the kTC noise and the feedthrough variation occur in the switches 273a and 274a.

A period from a time t4 to a time t5 is a first AD conversion period (a first ADC period). In this period, the DA converter 232 linearly changes the reference waveform with a predetermined inclination. The comparator 275a performs AD conversion on the reference signal using the reference waveform. In the first ADC period, an inverted delay of the comparator 275a, a delay of the reference waveform, and a clock delay of the counter occur. In FIG. 11B, a triangle indicates an inversion timing of the comparator 275a.

Subsequently, at the time t6, the current control voltage generating unit 219 controls the current control voltage so that the bias current is increased.

A period from a time t7 to a time t8 is a second AD conversion period (a second ADC period). Further, in this period, the DA converter 232 linearly changes the reference waveform with a predetermined inclination. The comparator 275a performs AD conversion on the reference signal using the reference waveform. Here, the converted digital value includes the inverted delay of the comparator 275a, the delay of the reference waveform similarly, and the clock delay of the counter which occur in the first ADC period in addition to the kTC noise and the feedthrough variation in the switches 273a and 274a which occur at the time t4. In FIG. 11B, a triangle indicates an inversion timing of the comparator 275a.

Therefore, when the second ADC period ends, a differential process of the count value of the counter 233 in the first ADC period and the count value of the counter 233 in the second ADC period is performed. Through this differential process, it is possible to remove the variation occurring in the detecting unit 218. Since the bias current value differs between the first ADC period and the second ADC period, the threshold value information is canceled, and the component of the overdrive voltage can be extracted. Here, a gain coefficient β of the transistor is $(W/L) \times \mu \times C_{ox}$. W indicates a gate width, L indicates a gate length, $\mu$, indicates an electron mobility, and $C_{ox}$ indicates an oxide film capacitance per unit area. A mutual inductance gm is substantially $2^{1/2} \times \beta \times Id$. Therefore, the overdrive voltage is $2 \times Id/gm = (2 \times Id/\beta)^{1/2}$. Since β has a variation inherent to an element, an output corresponding to the bias current and the device variation is obtained. The mobility $\mu$ is included in β, and a temperature characteristic is included in the mobility $\mu$. Therefore, it is possible to mitigate a characteristic change caused by the temperature and perform the AD conversion in an appropriate range by adjusting an inclination and a shift amount of the bias current or the reference waveform in accordance with the temperature as will be described later. Since lattice scattering is dominant at the operating temperature of solid-state imaging device 1, the temperature characteristic of the mobility depends on an absolute temperature $T^{3/2}$.

In a case in which an operation according to the timing chart illustrated in FIG. 11B is performed, the high level potential of the selecting pulse φSEL is preferably about VDD (2.7 V) but may be an intermediate potential (approximately 1 V to 1.5 V). If the potential difference (VDS) between the drain and the source of the selecting transistor SEL is subject to the saturation operation, it becomes the source follower.

The RTN is also a component that varies over time, but elements in which the RTN occurs are known (an FPN component). Therefore, it is possible to detect the RTN.

Generally, the RTN occurs in a process of trapping or releasing electrons to a defect level, and it causes a binary or multivalued output to be generated since it has a large amplitude. The detection of the RTN is performed by continuously observing or a plurality of samplings since it has a temporal change usually. Here, the temporal change has a time constant that is generated by a difference between an energy level of a defect and a Fermi level of channel electrons of the amplifying transistor AMP of the pixel, and indicates that a binary state or a plurality of states occur at an arbitrary timing.

FIG. 11C is an explanatory diagram illustrating operations of the reference signal generating unit 216, the current source 217, and the comparator 231 when the specific information is generated using a timing chart. Operations of the elements disposed on the output line VSL(n-1) or along the output line VSL(n-1) will be described below.

One horizontal read period starts at a time t1. At this point, the row selection signal φSEL transitions to a high level, and the row selection starts. Since the reset transistor RST is in the ON state at this point in time, a voltage of the floating diffusion section FD is fixed to VDD. Accordingly, the variation of the floating diffusion section FD is removed. Further, when the specific information is generated, the transfer pulse pTRG is fixed to a low level. Since the transfer pulse pTRG is fixed to the low level, the transfer transistor TRG is turned off, and it is possible to remove the variation of the photodiode PD.

At a time t2, an internal offset of the comparator 275a and a difference between the VSL voltage and the reference waveform are charged in the input capacitor 272a, and an operating point of the comparator 275a is initialized.

At a time t3, a short circuit pulse transitions to the low level, and the switches 273a and 274a are turned off. Accordingly, the kTC noise and the feedthrough variation occur in the switches 273a and 274a.

A period from a time t4 to a time t5 is a first AD conversion period (a first ADC period). In this period, the DA converter 232 linearly changes the reference waveform with a predetermined inclination. The comparator 275a performs AD conversion on the reference signal using the reference waveform. In the first ADC period, an inverted delay of the comparator 275a, a delay of the reference waveform, and a clock delay of the counter occur. In FIG. 11C, a triangle indicates an inversion timing of the comparator 275a.

Subsequently, at the time t6, the current control voltage generating unit 219 controls the current control voltage so that the bias current is increased.

A period from a time t7 to a time t8 is a second AD conversion period (a second ADC period). Further, in this period, the DA converter 232 linearly changes the reference waveform with a predetermined inclination. The comparator 275a performs AD conversion on the reference signal using the reference waveform. Here, the converted digital value includes the inverted delay of the comparator 275a, the delay of the reference waveform similarly, and the clock delay of the counter which occur in the first ADC period in addition to the kTC noise and the feedthrough variation in the switches 273a and 274a which occur at the time t4. In FIG. 11C, a triangle indicates an inversion timing of the comparator 275a.

Therefore, when the second ADC period ends, a differential process of the count value of the counter 233 in the first ADC period and the count value of the counter 233 in the second ADC period is performed. Through this differential process, it is possible to remove the variation occurring in the detecting unit 218. Further, it is possible to acquire data indicating whether or not the RTN has occurred through the differential process. By performing the data acquisition twice or more, it is possible to evaluate the occurrence frequency of the RTN of each amplifying transistor AMP of the pixel. Therefore, in a case in which a voltage amplitude is larger than a thermal noise of an amplifying circuit or a voltage amplitude generated at 1/f, it is possible to have an address of an element which is able to detect it as the element-specific information. In this case, since the time constant of the RTN varies on the basis of the energy difference, that is, since a detection probability changes as described above, it is preferable to have an address table for each temperature.

In a case in which an operation according to the timing chart illustrated in FIG. 11C is performed, the high level potential of the selecting pulse φSEL is preferably about VDD (2.7 V) but may be an intermediate potential (approximately 1 V to 1.5 V). If the potential difference (VDS) between the drain and the source of the selecting transistor SEL is subject to the saturation operation, it becomes the source follower.

As described above, the clipping circuit 215 also functions as a source follower circuit and is able to obtain the element-specific information through a similar operation to the operation illustrated in FIG. 11A.

FIG. 11D is an explanatory diagram illustrating operations of the clipping circuit 215, the reference signal generating unit 216, the current source 217, and the comparator 231 when the specific information is generated using a timing chart. Operations of the elements disposed on the output line VSL(n-1) or along the output line VSL(n-1) will be described below.

In the timing chart of FIG. 11D, the pixels in all the rows are not selected. In other words, the row selection signal φSEL is fixed to the low level. A state of a pulse for driving other pixels is arbitrary. One horizontal read period starts at a time t1. At this point in time, the clip selecting pulse φCLPSEL transitions to the high level, and the clipping circuit 215 is selected. Further, the short-circuit pulse transitions to the high level, and the switches 273a and 274a are connected. Since the switch 252a for disconnecting the current source 217 is in the ON state, and the switch 251a for averaging the VSL voltage is in the OFF state, the source follower operation is being performed, and the variation information of each source follower of the clipping circuit 215 (the variation in the output of the transistor CLPAMP) is output to the output line VSL.

At a time t2, the clip selecting pulse φCLPSEL and the current source disconnecting pulse transition to the low level at the same time. Accordingly, the VSL voltage is held in the parasitic capacitor 253a. Here, since the averaging of the VSL voltages is performed, the VSL voltages of the respective columns is averaged. The averaged VSL voltage is the reference signal.

At a time t3, an internal offset of the comparator 275a and a difference between the VSL voltage and the reference waveform are charged in the input capacitor 272a, and an operating point of the comparator 275a is initialized.

At a time t4, the short circuit pulse transitions to the low level, and the switches 273a and 274a are turned off. Accordingly, the initialization of the operating point of the comparator 275a ends. Further, the switches 273a and 274a are turned off, and the kTC noise and the feedthrough variation in the switches 273a and 274a occur.

A period from a time t5 to a time t6 is a first AD conversion period (a first ADC period). In this period, the DA converter 232 linearly changes the reference waveform with a predetermined inclination. The comparator 275a performs AD conversion on the reference signal using the reference waveform. The DA converter 232 may have a function of shifting the reference waveform. In other words, the DA converter 232 may have a function of shifting the clamp level. The DA converter 232 is able to add an offset to the output of the counter 233 by shifting the reference waveform. In the first ADC period, an inverted delay of the comparator 275a, a delay of the reference waveform, and a clock delay of the counter occur. In FIG. 11D, a triangle indicates an inversion timing of the comparator 275a.

One horizontal read period starts at a time t6. At this point in time, the clip selecting pulse φCLPSEL transitions to the high level, and the clipping circuit 215 is selected. Since the switch 252a for disconnecting the current source 217 is in the ON state at this time, and the switch 251a for averaging the VSL voltage is in the OFF state, the source follower operation is being performed, and the variation information of each source follower of the clipping circuit 215 (the variation in the output of the transistor CLPAMP) is output to the output line VSL.

A period from a time t7 to a time t8 is a second AD conversion period (a second ADC period). Further, in this period, the DA converter 232 linearly changes the reference waveform with a predetermined inclination. The comparator 275a performs AD conversion on the reference signal using the reference waveform. Here, the converted digital value includes the inverted delay of the comparator 275a, the delay of the reference waveform similarly, and the clock delay of the counter which occur in the first ADC period in addition to the kTC noise and the feedthrough variation in the switches 273a and 274a which occur at the time t4. In FIG. 11D, a triangle indicates an inversion timing of the comparator 275a.

Therefore, when the second ADC period ends, a differential process of the count value of the counter 233 in the first ADC period and the count value of the counter 233 in the second ADC period is performed. Through this differential process, it is possible to remove the variation occurring in the detecting unit 218. Therefore, it is possible to prevent the variation occurring in the detecting unit 218 from being included in the element-specific information.

Further, in the first ADC period, an offset is added to the output of the counter 233, and thus although the differential process is performed, the variation caused by the specific information generating unit 214 is not removed. The variation caused by the specific information generating unit 214 is normally distributed centering on the reference signal. Therefore, if there is no offset, a negative value occurs as the variation caused by the specific information generating unit 214, and all values of 0 or less become 0.

In a case in which an operation according to the timing chart illustrated in FIG. 11D is performed, if the transistor CLPSEL is saturated instead of the transistor CLPAMP, it becomes the source follower circuit. A high level potential of the pulse to select the transistor CLPSEL is preferably about VDD (2.7 V) but may be an intermediate potential (about 1 V to 1.5 V). If the potential difference (VDS) between the drain and the source of the transistor CLPSEL is subject to the saturation operation, it becomes the source follower. For example, the drain voltage of the transistor CLPSEL is 2.7 V, and the drain side of the transistor CLPSEL (the source side of the transistor CLPAMP) is normally about 2.2 V. On the other hand, it is possible to perform the saturation operation if VDS of the transistor CLPSEL is sufficient (if there is a difference of at least about several hundreds to 700 mV). Accordingly, an output corresponding to a gate voltage of the transistor CLPSEL is transferred to the output line VSL. If the transistor CLPSEL is subject to the saturation operation as in the transistor CLPAMP, the threshold value and the overdrive voltage vary for each element, and thus it is possible to detect the variations in the threshold value and the overdrive voltage of the transistor CLPSEL.

The current control voltage generating unit 219 is able to change the overdrive voltage of the transistor CLPAMP by driving the current control voltage with different voltages in the first ADC period and the second ADC period. At this time, since an amount of change in the overdrive voltage varies, it is possible to detect the amount of change in the overdrive voltage as the element-specific information.

FIG. 11E is an explanatory diagram illustrating operations of the clipping circuit 215, the reference signal generating unit 216, the current source 217, and the comparator 231 when the specific information is generated using a timing chart. Operations of the elements disposed on the output line VSL(n−1) or along the output line VSL(n−1) will be described below. The timing chart of FIG. 11D differs in that the current source disconnecting pulse and the VSL averaging pulse consistently have the low level.

In the timing chart of FIG. 11E, the pixels in all the rows are not selected. In other words, the row selection signal φSEL is fixed to the low level. A state of a pulse for driving other pixels is arbitrary. One horizontal read period starts at a time t1. At this point in time, the clip selecting pulse φCLPSEL transitions to the high level, and the clipping circuit 215 is selected. Further, the short-circuit pulse transitions to the high level, and the switches 273a and 274a are connected.

At a time t2, an internal offset of the comparator 275a and a difference between the VSL voltage and the reference waveform are charged in the input capacitor 272a, and an operating point of the comparator 275a is initialized.

At a time t3, the short circuit pulse transitions to the low level, and the switches 273a and 274a are turned off. Accordingly, the initialization of the operating point of the comparator 275a ends. Further, the switches 273a and 274a are turned off, and the kTC noise and the feedthrough variation in the switches 273a and 274a occur.

A period from a time t4 to a time t5 is a first AD conversion period (a first ADC period). In this period, the DA converter 232 linearly changes the reference waveform with a predetermined inclination. The comparator 275a performs AD conversion on the reference signal using the reference waveform. In the first ADC period, an inverted delay of the comparator 275a, a delay of the reference waveform, and a clock delay of the counter occur. In FIG. 11E, a triangle indicates an inversion timing of the comparator 275a.

Subsequently, at the time t6, the current control voltage generating unit 219 controls the current control voltage so that the bias current is increased.

A period from a time t7 to a time t8 is a second AD conversion period (a second ADC period). Further, in this period, the DA converter 232 linearly changes the reference waveform with a predetermined inclination. The comparator 275a performs AD conversion on the reference signal using the reference waveform. Here, the converted digital value includes the inverted delay of the comparator 275a, the delay of the reference waveform similarly, and the clock delay of the counter which occur in the first ADC period in addition to the kTC noise and the feedthrough variation in the switches 273a and 274a which occur at the time t4. In FIG. 11E, a triangle indicates an inversion timing of the comparator 275a.

Therefore, when the second ADC period ends, a differential process of the count value of the counter 233 in the first ADC period and the count value of the counter 233 in the second ADC period is performed. Through this differential process, it is possible to remove the variation occurring in the detecting unit 218. Since the bias current value differs between the first ADC period and the second ADC period, the threshold value information is canceled, and the component of the overdrive voltage can be extracted. Here, a gain coefficient β of the transistor is $(W/L) \times \mu \times C_{ox}$. W indicates a gate width, L indicates a gate length, μ, indicates an electron mobility, and $C_{ox}$ indicates an oxide film capacitance per unit area. A mutual inductance gm is substantially $2^{1/2} \times \beta \times Id$. Therefore, the overdrive voltage is $2 \times Id/gm=(2 \times Id/\beta)^{1/2}$. Since β has a variation inherent to an element, an output corresponding to the bias current and the device variation is obtained. The mobility μ is included in β, and a temperature characteristic is included in the mobility μ. Therefore, it is possible to mitigate a characteristic change caused by the temperature and perform the AD conversion in an appropriate range by adjusting an inclination and a shift amount of the bias current or the reference waveform in accordance with the temperature as will be described later. Since lattice scattering is dominant at the operating temperature of solid-state imaging device 1, the temperature characteristic of the mobility depends on an absolute temperature $T^{-3/2}$.

In a case in which an operation according to the timing chart illustrated in FIG. 11E is performed, if the transistor CLPSEL is saturated instead of the transistor CLPAMP, it becomes the source follower circuit. A high level potential of the pulse to select the transistor CLPSEL is preferably about VDD (2.7 V) but may be an intermediate potential (about 1 V to 1.5 V).

It is also possible to detect the RTN in the transistor CLPAMP. When the RTN is detected in the transistor CLPAMP, the clip voltage is maintained to have the intermediate potential (for example, about 1.5 V to VDD).

FIG. 11F is an explanatory diagram illustrating operations of the clipping circuit 215, the reference signal generating unit 216, the current source 217, and the comparator 231 when the specific information is generated using a timing chart. Operations of the elements disposed on the output line VSL(n−1) or along the output line VSL(n−1) will be described below.

In the timing chart of FIG. 11F, the pixels in all the rows are not selected. In other words, the row selection signal φSEL is fixed to the low level. A state of a pulse for driving other pixels is arbitrary. One horizontal read period starts at a time t1. At this point in time, the clip selecting pulse φCLPSEL transitions to the high level, and the clipping circuit 215 is selected. Further, the short-circuit pulse transitions to the high level, and the switches 273a and 274a are connected.

At a time t2, an internal offset of the comparator 275a and a difference between the VSL voltage and the reference waveform are charged in the input capacitor 272a, and an operating point of the comparator 275a is initialized.

At a time t3, the short circuit pulse transitions to the low level, and the switches 273a and 274a are turned off. Accordingly, the initialization of the operating point of the comparator 275a ends. Further, the switches 273a and 274a are turned off, and the kTC noise and the feedthrough variation in the switches 273a and 274a occur.

A period from a time t4 to a time t5 is a first AD conversion period (a first ADC period). In this period, the DA converter 232 linearly changes the reference waveform with a predetermined inclination. The comparator 275a performs AD conversion on the reference signal using the reference waveform. In the first ADC period, an inverted delay of the comparator 275a, a delay of the reference waveform, and a clock delay of the counter occur. In FIG. 11F, a triangle indicates an inversion timing of the comparator 275a.

A period from a time t6 to a time t7 is a second AD conversion period (a second ADC period). Further, in this period, the DA converter 232 linearly changes the reference waveform with a predetermined inclination. The comparator 275a performs AD conversion on the reference signal using the reference waveform. Here, the converted digital value includes the inverted delay of the comparator 275a, the delay of the reference waveform similarly, and the clock delay of the counter which occur in the first ADC period in addition to the kTC noise and the feedthrough variation in the switches 273a and 274a which occur at the time t4. In FIG. 11F, a triangle indicates an inversion timing of the comparator 275a.

Therefore, when the second ADC period ends, a differential process of the count value of the counter 233 in the first ADC period and the count value of the counter 233 in the second ADC period is performed. Through this differential process, it is possible to remove the variation occurring in the detecting unit 218. Further, it is possible to acquire data indicating whether or not the RTN has occurred through the differential process. By performing the data acquisition twice or more, it is possible to evaluate the occurrence frequency of the RTN of each transistor CLPAMP. Therefore, in a case in which a voltage amplitude is larger than a thermal noise of an amplifying circuit or a voltage amplitude generated at 1/f, it is possible to have an address of an element which is able to detect it as the element-specific information. In this case, since the time constant of the RTN varies on the basis of the energy difference, that is, since a detection probability changes as described above, it is preferable to have an address table for each temperature.

In a case in which an operation according to the timing chart illustrated in FIG. 11F is performed, if the transistor CLPSEL is saturated instead of the transistor CLPAMP, it becomes the source follower circuit. A high level potential of the pulse to select the transistor CLPSEL is preferably about VDD (2.7 V) but may be an intermediate potential (about 1 V to 1.5 V).

The solid-state imaging device 1 is also able to use the feedthrough variation of the comparator 275a as the element-specific information.

FIG. 11G is an explanatory diagram illustrating operations of the clipping circuit 215, the reference signal generating unit 216, the current source 217, and the comparator 231 when the specific information is generated using a timing chart. Operations of the elements disposed on the output line VSL(n−1) or along the output line VSL(n−1) will be described below.

In the timing chart of FIG. 11G, the pixels in all the rows are not selected. In other words, the row selection signal φSEL is fixed to the low level. A state of a pulse for driving other pixels is arbitrary. One horizontal read period starts at a time t1. At this point in time, the clip selecting pulse φCLPSEL transitions to the high level, and the clipping circuit 215 is selected. Further, the short-circuit pulse transitions to the high level, and the switches 273a and 274a are connected.

At a time t2, an internal offset of the comparator 275a and a difference between the VSL voltage and the reference waveform are charged in the input capacitor 272a, and an operating point of the comparator 275a is initialized.

A period from a time t3 to a time t4 is a first AD conversion period (a first ADC period). In this period, the DA converter 232 linearly changes the reference waveform with a predetermined inclination. The comparator 275a performs AD conversion on the reference signal using the reference waveform. In the first ADC period, an inverted delay of the comparator 275a, a delay of the reference waveform, and a clock delay of the counter occur. In FIG. 11G, a triangle indicates an inversion timing of the comparator 275a.

At a time t5, the short circuit pulse transitions to the low level, and the switches 273a and 274a are turned off. Accordingly, the initialization of the operating point of the comparator 275a ends. Further, the switches 273a and 274a are turned off, and the kTC noise and the feedthrough variation in the switches 273a and 274a occur.

A period from a time t6 to a time t7 is a second AD conversion period (a second ADC period). Further, in this period, the DA converter 232 linearly changes the reference waveform with a predetermined inclination. The comparator 275a performs AD conversion on the reference signal using the reference waveform. Here, the converted digital value includes the inverted delay of the comparator 275a, the delay of the reference waveform similarly, and the clock delay of the counter which occur in the first ADC period in addition to the kTC noise and the feedthrough variation in the switches 273a and 274a which occur at the time t4. In FIG. 11G, a triangle indicates an inversion timing of the comparator 275a.

Therefore, when the second ADC period ends, a differential process of the count value of the counter 233 in the first ADC period and the count value of the counter 233 in the second ADC period is performed. Through this differential process, the kTC noise and the feedthrough variation in the switches 273a and 274a are detected.

The kTC noise is suppressed by performing the detection of the kTC noise and the feedthrough variation in the switches 273a and 274a twice or more and performing averaging, and thus it is possible to extract the feedthrough variation (the FPN component).

The solid-state imaging device 1 is also able to use the feedthrough variation of the column ADC as the element-specific information.

FIG. 11H is an explanatory diagram illustrating operations of the clipping circuit 215, the reference signal generating unit 216, the current source 217, and the comparator 231 when the specific information is generated using a timing chart. Operations of the elements disposed on the output line VSL(n−1) or along the output line VSL(n−1) will be described below.

One horizontal read period starts at a time t1. At this point, the row selection signal φSEL transitions to a high level, and the row selection starts. Since the reset transistor RST is in the ON state at this point in time, a voltage of the floating diffusion section FD is fixed to VDD. Accordingly, the variation of the floating diffusion section FD is removed. Further, when the specific information is generated, the transfer pulse pTRG is fixed to a low level. Since the transfer pulse pTRG is fixed to the low level, the transfer transistor TRG is turned off, and it is possible to remove the variation of the photodiode PD. Further, the short-circuit pulse transitions to the high level, and the switches 273a and 274a are connected.

At a time t2, an internal offset of the comparator 275a and a difference between the VSL voltage and the reference waveform are charged in the input capacitor 272a, and an operating point of the comparator 275a is initialized.

At a time t3, the short circuit pulse transitions to the low level, and the switches 273a and 274a are turned off. Further, the switches 273a and 274a are turned off, and the kTC noise and the feedthrough variation in the switches 273a and 274a occur.

A period from a time t4 to a time t5 is a first AD conversion period (a first ADC period). In this period, the DA converter 232 linearly changes the reference waveform with a predetermined inclination. The comparator 275a performs AD conversion on the reference signal using the reference waveform. In the first ADC period, an inverted delay of the comparator 275a, a delay of the reference waveform, and a clock delay of the counter occur. In FIG. 11H, a triangle indicates an inversion timing of the comparator 275a.

At a time t6, since the reset transistor RST is in the ON state, the kTC noise (temporal component) and the reset feedthrough noise (the FPN component) are held as the voltage of the floating diffusion section FD.

A period from a time t7 to a time t8 is a second AD conversion period (a second ADC period). Further, in this period, the DA converter 232 linearly changes the reference waveform with a predetermined inclination. The comparator 275a performs AD conversion on the reference signal using the reference waveform. Here, the converted digital value includes the inverted delay of the comparator 275a, the delay of the reference waveform similarly, and the clock delay of the counter which occur in the first ADC period in addition to the kTC noise and the feedthrough variation in the switches 273a and 274a which occur at the time t4. In FIG. 11H, a triangle indicates an inversion timing of the comparator 275a.

Therefore, when the second ADC period ends, a differential process of the count value of the counter 233 in the first ADC period and the count value of the counter 233 in the second ADC period is performed. Through this differential process, the variation occurring in the detecting unit 218 is removed, and the kTC noise and the reset feedthrough noise held in the floating diffusion section FD are detected. The kTC noise is suppressed by detecting the kTC noise and the reset feedthrough noise twice or more and performing averaging, and thus it is possible to extract the reset feedthrough variation (the FPN component).

It is also possible to use the defect of the photodiode PD as the element-specific information. It is possible to read the defect of the photodiode PD through normal driving. When the defect of the photodiode PD is read through normal driving, an optical signal and defect information of the floating diffusion section FD are also read at the same time. In addition, the FPTC component and the kTC noise occurring when the floating diffusion section FD is reset are removed through the CDS process. The defect information of the floating diffusion section FD is removed since driving is performed so that the detection period is reduced as short as possible, and the defect correction is performed. Since it is difficult to extract the defect information of the photodiode PD if there is an optical signal, in a case in which the defect of the photodiode PD is used as the element-specific information, it is preferable that the signal of the photodiode PD be accumulated in a light-shielded state. In a case in which the defect of the photodiode PD is used as the element-specific information, the photodiode PD of the light-shielded pixel (the optical black pixel) may be used.

Since a dark signal caused by defect of the photodiode PD has time dependence, it is preferable to set a shutter time as long as possible and accumulate the signal. Further, the photodiode PD generally has a hole accumulated diode (HAD) structure and is formed to be surrounded by holes and driven. In the driving, a negative bias is applied so that the channel of the transfer transistor enters an accumulation state (a pinning state). Accordingly, it is possible to suppress the dark signal caused by the defect near the transfer transistor to be small.

In a case in which the signal is very small or the number of defects is very small, transition from the pinning state to the depletion state may be performed by setting the potential of the transfer transistor in the OFF state to the intermediate potential in the positive direction when the signal accumulation is performed. A dark output due caused by the defect near the transfer transistor occurs. Accordingly, it is possible to detect the defect information near the photodiode PD and the transfer transistor, and for example, it is possible to deal a pixel address which is equal to or higher than a desired threshold level dealt as a defect as the element-specific information.

Since the defect information have a temperature characteristic (activation energy is about 0.55 eV to 1.1 eV), in order to stabilize the output, it is preferable to set an accumulation time and an analog gain appropriately on the basis of the temperature information and perform correction using a temperature correction table for each detect.

The specific value calculating unit 220 calculates a value specific to the solid-state imaging device 1 on the basis of the digital signal transferred from the detecting unit 218. The specific value calculating unit 220 generates a value having a predetermined bit length as the specific value. An example of a method of calculating the specific value of the solid-state imaging device 1 through the specific value calculating unit 220 will be described later. If the specific value of the solid-state imaging device 1 is calculated, the specific value calculating unit 220 transfers the specific value to the encrypting unit 222. The specific value generated by the specific value calculating unit 220 may be a seed or a key used in the encryption process in the encrypting unit 222.

The specific value calculating unit 220 may select the element-specific information to be employed among a plurality of pieces of element-specific information. When the element-specific information is selected, the specific value calculating unit 220 may select the element-specific information to be employed through an operation based on the element-specific information or may select the element-specific information to be employed using a random number. Further, a selection condition for selecting the element-specific information may be stored in a non-volatile memory. The selection condition may be written in the non-volatile memory only once. It may be written in the nonvolatile memory at a timing such as at the time of inspection, at the time of shipping, at the time of first use, or the like. The specific value calculating unit 220 is able to repeatedly calculate the specific value using the element-specific information based on any manufacturing variation occurring in a chip of the solid-state imaging device 1 including the element-specific information having a relatively small information amount. In other words, it is possible to increase the information amount of the element-specific information.

Further, the specific value calculating unit 220 may calculate the specific value by combining a plurality of pieces of element-specific information among the element-specific information generated by the specific information generating unit 214. Since the specific value is calculated by combining a plurality of pieces of element-specific information, it is difficult to analyze how to calculate the specific value.

Further, the specific value generated by the specific value calculating unit 220 may be temporarily stored in the memory. Since the specific value generated by the specific value calculating unit 220 is stored in the memory, it is difficult to analyze the calculation timing of the specific value. In other words, the solid-state imaging device 1 may use a previously generated specific value in response to an encryption request without generating the specific value when there is the encryption request. For example, the solid-state imaging device 1 may calculate the specific value after a predetermined time elapses after driving at the time of normal imaging is performed. Further, the solid-state imaging device 1 may generate the specific value when there is a request for generating the specific value instead of the timing of the encryption request.

The specific value calculating unit 220 may average the specific values obtained under the same driving condition. It is possible to suppress a noise in the time direction by averaging the specific values obtained under the same driving condition.

The encrypting unit 222 executes a data encryption process using the specific value generated by the specific value calculating unit 220. The encrypting unit 222 is able to be disposed, for example, in the logic circuit 23014 illustrated in FIG. 2. Specifically, the encrypting unit 222 performs an encryption process on the data using the specific value generated by the specific value calculating unit 220 as a seed or a key. The specific value, image information, a feature quantity based on image information, or the like may be an encryption target. Since the encryption process is performed using the specific value generated by the specific value calculating unit 220, the solid-state imaging device 1 is able to encrypt data with a high degree of security.

The communication control unit 224 transmits the data to the outside of the solid-state imaging device 1. In a case in which imaging data is output, the communication control unit 224 may perform a different process from that in a case in which data encrypted by the encrypting unit 222 is output.

In the configuration of the solid-state imaging device 1 illustrated in FIG. 9, at least the path in which the specific information is processed is formed not to appear on the surface of the solid-state imaging device 1. For example, the path in which the specific information is processed is arranged to be covered with metal of an upper layer including the outermost layer. The path in which the specific information is processed may be covered with a predetermined shield layer or may be covered with a wiring of VDD or VSS. For example, the specific information generating unit 214, the detecting unit 218, the specific value calculating unit 220, and the encrypting unit 222 may be included as the path in which the specific information is processed. Further, the solid-state imaging device 1 is formed on the path in which the specific information is processed so that a pad for monitoring the specific information is not disposed. When the solid-state imaging device 1 is formed as described above, it is possible to prevent the specific information of the solid-state imaging device 1 used in the encryption process from leaking out to the outside, and in addition, when an attempt to analyze the specific information is performed, the solid-state imaging device 1 is inevitably broken, and thus the specific information is unable to be analyzed. Further, the solid-state imaging device 1 according to the present embodiment does not hold the specific information internally but generates the specific information each time and performs the encryption process using the specific value based on the generated specific information. Therefore, the solid-state imaging device 1 according to the present embodiment is able to implement a highly secure encryption process.

Since the solid-state imaging device 1 according to the present embodiment does not internally hold the specific information, the specific value generated on the basis of the specific information changes each time it is generated, and thus the encrypted data is unable to be decrypted. Therefore, it is necessary for the specific value to be the same value regardless of a calculation timing. Therefore, the solid-state imaging device 1 according to the present embodiment may have a function of correcting the specific value calculated by the specific value calculating unit 220 on the basis of the signal output from the specific information generating unit 214 in accordance with the temperature of the chip including the specific information generating unit 214. Further, the solid-state imaging device 1 according to the present embodiment may have a function of detecting the temperature of the chip including the specific information generating unit 214.

FIG. 12 is an explanatory diagram illustrating another functional configuration example of the solid-state imaging device 1 according to the present embodiment. FIG. 12 illustrates a configuration in which a chip temperature detecting unit 226 and a signal correcting unit 228 are disposed in addition to the configuration of the solid-state imaging device 1 illustrated in FIG. 9.

The chip temperature detecting unit 226 detects the temperature of the chip including the specific information generating unit 214. The chip temperature detecting unit 226 transfers information of the detected chip temperature to the signal correcting unit 228. The signal correcting unit 228 corrects the specific value calculated by the specific value calculating unit 220 on the basis of the temperature of the chip including the specific information generating unit 214 detected by the chip temperature detecting unit 226. The signal correcting unit 228 may hold a table in which correction values according to the temperatures are stored and decide the correction value on the basis of the temperature detected by the chip temperature detecting unit 226.

3.2. Operation Example

Next, an operation example of the solid-state imaging device according to the present embodiment will be described. FIG. 13 is a flowchart illustrating an operation example of the solid-state imaging device according to the present embodiment. FIG. 13 illustrates an example of an operation when the solid-state imaging device 1 calculates the specific value and performs the encryption process using the specific value.

The solid-state imaging device 1 first generates analog specific information serving as the base of the specific value (step S201). The analog specific information is generated by the drive control unit 210 driving the specific information generating unit 214.

If the analog specific information is generated, the solid-state imaging device 1 subsequently converts the analog specific information to digital value (step S202). The conversion from the analog specific information into the digital value is performed by the detecting unit 218. The process of converting the analog specific information into the digital value by the detecting unit 218 is similar to that described above.

If the analog specific information is converted into the digital value, the solid-state imaging device 1 calculates the specific value of the solid-state imaging device 1 using the converted digital value (step S203). The calculation of the specific value of the solid-state imaging device 1 is performed by the specific value calculating unit 220.

If the specific value of the solid-state imaging device 1 is calculated, the solid-state imaging device 1 performs the data encryption process using the specific value (step S204). The data encryption process using the specific value is performed by the encrypting unit 222.

The solid-state imaging device 1 according to the present embodiment is able to internally complete the encryption process using the specific information without outputting the specific information to the outside by executing a series of operations described above. The solid-state imaging device 1 according to the present embodiment is able to encrypt important information with a high degree of security and output the encrypted information by performing the encryption process using the specific information that does not leak out to the outside.

4. Second Embodiment

Subsequently, a technique related to generation of a specific value (that is, a PUF value) which is specific to the solid-state imaging device 1 and hard to copy using a physical feature (that is, a hardware feature) of the solid-state imaging device 1 will be described as a second embodiment of the present disclosure.

4.1. Basic Concept

First, a characteristic necessary for the PUF will be described, and then an overview of a basic concept of a technique related to generation of a PUF value according to the present embodiment will be described.

As described above, the PUF is a function that outputs a value specific to a device using a physical characteristic that is hard to copy. In a case in which a value specific to a device generated using the PUF (that is, the PUF value) is assumed to be used as an identifier identifying an individual device or key information of an encryption process or the like, reproducibility and an individual difference are necessary as the characteristics of the PUF value.

Here, the reproducibility indicates that although conditions such as changes in various kinds of states such as a temperature or a voltage or temporal degradation of a device change when the PUF value is generated and recalculated, the same output is obtained with respect to a predetermined input each time. In other words, ideally, it is preferable that the same output can be perfectly reproduced with respect to a predetermined input each time although such conditions are changed. On the other hand, when the PUF value is generated and recalculated, it is also possible to apply a technique such as an error correcting code (ECC). In this case, the reproducibility of the output may not necessarily be perfect if the variations in the outputs obtained each time are within a correctable range by the error correcting code or the like.

As the individual difference, it is preferable that a sufficient difference in the PUF value occurs among a plurality of devices so that the individual device can be identified by the PUF value generated for each device. In the present embodiment, it is preferable to be able to secure, for example, a 128-bit entropy as the individual difference.

Under the above assumption, in the present embodiment, for the amplifying transistor Tr 13 among the transistors constituting each pixel 2 of the solid-state imaging device 1, the variance in the threshold voltage Vth of the amplifying transistor Tr 13 is used for the generation of the PUF value. More specifically, for the threshold voltage of the transistor, there are many factors that give a variation of each device in a manufacturing process such as a thickness of a gate oxide film, a size of a transistor, ad an ion implantation. Therefore, it is possible to satisfy the necessary characteristic of the individual difference described above. Further, since the amplifying transistor Tr 13 is positioned at a relatively later stage among the transistors constituting the pixel 2, it tends to be less influenced by multiple factors. Due to such characteristics, it is also possible to satisfy the necessary characteristics of the reproducibility. Further, it is possible to acquire the variation in the threshold voltage Vth, for example, as the output result of the pixel signal of the pixel 2 (that is, the pixel value) in the process of compensating for the threshold voltage Vth.

In the present embodiment, it is preferable to generate the PUF value using the characteristics of the pixel 2 that operates more stably among the pixels 2 of the solid-state imaging device 1. As a specific example, the characteristic of the pixel 2 included in at least a part of the OPB region of the pixel region 3 (that is, the imaging plane) may be used for the generation of the PUF value.

For example, FIG. 14 is an explanatory diagram for describing an example of the technique related to the generation of the PUF value according to the present embodiment and illustrates an example of a configuration of the pixel region 3 of the solid-state imaging device 1. As illustrated in FIG. 14, the pixel region 3 of the solid-state imaging device 1 according to the present embodiment includes, for example, an effective pixel region R501 and an OPB region R503.

The effective pixel region R501 corresponds to a region in which a subject image is formed through an optical system such as a lens in the pixel region 3 of the solid-state imaging device 1. In other words, an image signal based on the pixel signals (that is, the pixel values) read out from the pixels 2 included in the effective pixel region R501 in the pixel region 3 of the solid-state imaging device 1 is output as an imaging result of an image.

The OPB region R503 is a region which is formed near the effective pixel region R501 and light-shielded by metal or the like. For example, the pixel 2 included in the OPB region R503 is used for measuring a level of the pixel signal serving as the reference for correcting a black level. Specifically, it is possible to recognize the level (the offset amount) of a dark current in a state in which light is not incident or a signal including influence of a read noise by measuring the level of the pixel signal output from the pixel 2 included in the OPB region R503. Therefore, it is ideally possible to correct the black level to 0 by subtracting a measured value (that is, the offset amount) of the level of the pixel signal output from the pixel 2 in the OBP region R503 from the image signal read from the pixel 2 in the effective pixel region R501.

As described above, the pixel 2 included in the OPB region R503 is less influenced by light incident through an optical system such as a lens due to a characteristic in which light is shielded by metal or the like. Due to such characteristic, it is possible to obtain a relatively stable output as a light reception result from the pixel 2 included in the OPB region R503 as compared with the pixel 2 included in the effective pixel region R501. In other words, in a case in which the characteristic of the pixel 2 included in the OPB region R503 is used, it is more effective than a case in which the characteristic of the pixel 2 included in the effective pixel region R501 is used because the requirements of the reproducibility of the PUF value are satisfied.

Further, the pixel signal output from the pixel 2 included in the OPB region R503 is not output as the imaging result of the image. Therefore, it is difficult to estimate the characteristic of the pixel 2 included in OPB region R503 from the result of analyzing the image obtained as the imaging result. In other words, although the characteristic of pixel 2 included in the OPB region R503 is used for the generation of the PUF value, it is difficult to estimate the PUF value from the result of analyzing the image obtained as the imaging result.

Further, since the pixel 2 included in the OPB region R503 is not necessarily operated consistently, it deteriorates less than the pixel 2 included in the effective pixel region R501. Therefore, it is more effective as the characteristic of the device used for the generation of the PUF value in terms of reliability.

Further, the OPB region R503 is a region which is already formed in the existing solid-state imaging device 1. Therefore, when the characteristic of the pixel 2 included in the OPB region R503 is used for the generation of the PUF value, there is unnecessary to provide a dedicated region or a dedicated device for the generation of the PUF value.

For example, in the example illustrated in FIG. 14, the characteristic of the pixel 2 included in a region indicated by reference numeral R505 among the pixels 2 included in the OPB region R503 is used for the generation of the PUF value.

The characteristic necessary for the PUF has been described, and then the overview of the basic concept of the technique related to generation of the PUF value according to the present embodiment has been described above.

4.2. Method of Generating PUF Value

Next, an overview of a method of generating the PUF values in the solid-state imaging device 1 according to the present embodiment will be described.

In the solid-state imaging device 1 according to the present embodiment, pixels included in a predetermined region (for example, the OPB region) are divided into a plurality of blocks each including one or more pixels. On the basis of this configuration, in the solid-state imaging device 1 according to the present embodiment, one or more blocks specified in accordance with a predetermined condition among a plurality of blocks are used for the generation of the PUF value. For example, FIG. 15 is an explanatory diagram for describing an example of a technique related to the generation of the PUF value according to the present embodiment and illustrates an example of the blocks described above. Specifically, in the example illustrated in FIG. 15, 2,000×8 pixels are divided into blocks each including 2×4 pixels, and in this case, the number of blocks is 2,000.

In the case in which the pixels included in the predetermined region are divided into a plurality of blocks, each block is preferably specified such that a plurality of pixels sharing a predetermined circuit such as a so-called AMP circuit or the like are included in a common block. With this configuration, the pixels included in each block show a tendency in which a variation caused by a circuit shared by the pixels among variations of output signals (that is, the pixel values) output from the pixels is the same.

Further, in the solid-state imaging device 1 according to the present embodiment, a pixel value corresponding to the block is calculated on the basis of a pixel value of each of one or more pixels included in each block. As a specific example, a sum of the pixel values of one or more pixels included in each block may be set as a pixel value corresponding to the block. For example, in the example illustrated in FIG. 15, in a case in which the pixel value of each pixel is indicated by 10 bits, since one block includes 2×4 pixels, the pixel value corresponding to the block calculated for each block can be indicated as a 13-bit value. In the following description, the pixel value corresponding to the block calculated for each block is also referred to simply as a "pixel value for each block." Further, the pixel value of each pixel corresponds to a "first pixel value", and the pixel value of each block corresponds to a "second pixel value." In the case in which each block is specified to include one pixel, the pixel value of each block corresponds to the pixel value of each pixel.

On the basis of the above configuration, in the solid-state imaging device 1 according to the present embodiment, among a plurality of blocks specified as described above, a block in which the pixel value of each block is not included within a predetermined range including an average of the pixel values of the plurality of blocks is used for the generation of the PUF value. For example, FIG. 16 is an explanatory diagram for describing an example of a technique related to the generation of the PUF value according to the present embodiment, and illustrates an example of a distribution of pixel values of a plurality of blocks. Further, in FIG. 16, reference numeral D510 indicates an average value of the pixel values of the plurality of blocks.

As illustrated in FIG. 16, the distribution of the pixel values of the blocks tends to show a so-called normal distribution based on the average D510 of the pixel values of a plurality of blocks. On the basis of such a configuration, in the solid-state imaging device 1 according to the present embodiment, "1" is set as a value for generating the PUF value for a block indicating a pixel value larger than the average D510, and "0" is set for a block indicating a pixel value smaller than the average D510.

On the other hand, the pixel value of each block may change each time (for example, for each frame) due to influence of a random noise or the like. Therefore, for example, for a block in which the pixel value indicates a value near the average value D510, for each frame, it may indicate a value larger than the average D510 (that is, "1" may set as a value for the generation of the PUF value) or it may indicate a value smaller than the average D510 (that is, "0" may be set as the value for the generation of the PUF value). In view of such characteristics, in the solid-state imaging device 1 according to the present embodiment, a block in which the pixel value of each block is included in a predetermined range R511 including the average value D510 is not used for the generation of the PUF value. In other words, a block in which the pixel value for each block is not included in the range R511, that is, a block in which the pixel value is included in one of ranges R513 and R515 is specified to be used for the generation of the PUF value. In other words, as the value used for the generation of the PUF value, "0" is set for the block in which the pixel value is included in the range R513, and "1" is set for the block in which the pixel value is included in the range R515.

The range R511 illustrated in FIG. 16 may be set, for example, according to a standard deviation σ of the pixel values of a plurality of blocks. In this case, a block in which an absolute value of a difference between the pixel value of each block and the average D510 of the pixel values of the blocks (that is, the distance between the pixel value of each block and the average D510) is equal to or larger than a predetermined threshold value is specified to be used for the generation of the PUF value.

Here, in a case in which a standard deviation of the pixel values of the pixels in the block is indicated by σ', the standard deviation σ' may be, for example, about 1/20 of the standard deviation σ of the pixel values of the blocks. At this time, it is preferable to set a threshold value of the distance between the pixel value of each block and the average D510 to, for example, around 0.3 σ. In this case, in a block in which the distance between the pixel value of each block and the average D510 exceeds the threshold value, it is necessary for the variation of the pixel value to exceed 6 σ' in order to cause the value set in accordance with the pixel value to change between "0" and "1."

Due to such characteristics, in the solid-state imaging device 1 according to the present embodiment, the block in which the pixel value indicates a value near the average value D510 is not used for the generation of the PUF value, and the block in which the distance between the pixel value and the average value D510 is a threshold value or more is set to be used for the generation of PUF value.

As the range R511 illustrated in FIG. 16 is set to be narrower, the number of blocks that can be candidates to be used for the generation of the PUF value is increased, and a probability of the occurrence of an error in the PUF value to be generated is increased. On the other hand, as the range R511 is set to be wider, the number of blocks that can be candidates to be used for the generation of the PUF value is decreased, and it is possible to further reduce a probability of the occurrence of an error in the PUF value to be generated. Therefore, for example, the range R511 which is not used for the generation of the PUF value may be set in accordance with an error rate allowed for the PUF value to be generated.

Since information of the block specified to be used for the generation of the PUF value is not information which has to be protected such as so-called confidential information (information having confidentiality), the information is preferably stored in, for example, a predetermined storage region (for example, a non-volatile storage region) in the solid-state imaging device 1.

Next, an example of a method of calculating the value specific to the solid-state imaging device 1 (that is, the PUF value) in accordance with the pixel value of each block will be described with reference to FIGS. 16 to 18. For example, FIGS. 17 and 18 are explanatory diagrams for describing an example of the method of generating the PUF value according to the present embodiment.

In FIG. 17, reference numeral D511 schematically indicates a plurality of blocks into which the pixels included in a predetermined region are divided as described above with reference to FIG. 15. Further, a numerical value written in each block indicated by reference numeral D511 indicates whether or not the pixel value corresponding to the block is included in the predetermined range (that is, the range R511 illustrated in FIG. 16) including the average of the pixel values.

In other words, the solid-state imaging device 1 according to the present embodiment sequentially determines whether or not the pixel value of each block is included in the predetermined range R511 including the average of the pixel values for each block starting from a predetermined start position, and associates a value of "0" or "1" with the corresponding block in accordance with a determination result. For example, in the example indicated by reference numeral D511 in FIG. 17, "0" is associated with the block in which the pixel value is included in the range R511, and "1" is associated with the block in which the pixel value is not included in the range R511 (that is, included in the range R513 or R515). As described above, the solid-state imaging device 1 sequentially performs the determination until the number of blocks in which the pixel value of each block is not included in the range R511 (that is, the number of blocks with which "1" is associated) is specified to be equal to or greater than a predetermined bit length. Then, the solid-state imaging device 1 stores a position of the block associated with "1" in a predetermined storage region. The block associated with "1" is used for the generation of the PUF value.

Then, as illustrated in FIG. 17, the solid-state imaging device 1 compares the pixel value of the block in which the pixel value of each block is not included in the range R511 with the average D510 of the pixel values of the blocks and specifies the value for generating the PUF value corresponding to the block (Hereinafter also referred to as a "bit value"). Specifically, the solid-state imaging device 1 sets "0" as the bit value for the block in which the pixel value of each block is smaller than the average D510 among the target blocks and sets "1" as the bit value for the block in which the pixel value of each block is larger than the average D510. For example, in FIG. 17, reference numeral D513 schematically indicates the bit values set for the blocks to be used for the generation of the PUF value.

As described above, the solid-state imaging device 1 secures the bit values equal to or longer than a predetermined bit length, connects the bit values, and generates the PUF value. Further, when the PUF value is generated, the solid-state imaging device 1 may calculate an error correcting code for correcting the error in the PUF value separately recalculated using some bit value among a series of secured bit values and store the ECC in a predetermined storage region. In this case, it is preferable to specify more blocks to be used for the generation of the PUF value so that the bit value used for the calculation of the error correcting code is secured.

Further, in a case in which the PUF value is used, the solid-state imaging device 1 recalculates the PUF value on the basis of the information stored in the predetermined storage region. In other words, the solid-state imaging device 1 specifies the block to be used for the generation of the PUF value on the basis of the information stored in the storage region and reads out the pixel value corresponding to the block (that is, the pixel value of each block). Then, the solid-state imaging device 1 may specify the bit values corresponding to the blocks by comparing the pixel values corresponding to the specified blocks with the average D510 of the pixel values of the blocks, and regenerate the PUF value by connecting the specified bit values. At this time, in a case in which the error correcting code for correcting the error in the PUF value is stored in the predetermined storage region, it is preferable for the solid-state imaging device 1 to performs the error correction on the PUF value re-generated on the basis of the error correcting code.

For example, the PUF value generated (calculated) as described above can be used as an identifier identifying the solid-state imaging device 1 or key information for encrypting predetermined information generated in the solid-state imaging device 1.

The average of the pixel values of the blocks during a plurality of imaging operations may be used as the pixel value of each block used for the generation of the PUF value. With such a configuration, it is possible to reduce the influence of the variation in the pixel value of each block caused by the random noise or the like (that is, it is possible to reduce the error rate of the pixel value of each block).

The overview of the method of generating the PUF value in the solid-state imaging device 1 according to the present embodiment has been described above with reference to FIGS. 15 to 18.

4.3. Functional Configuration

Next, an example of a functional configuration of the solid-state imaging device 1 according to the present embodiment will be described focusing on, particularly, parts related to the generation and the recalculation of the PUF value specific to the solid-state imaging device 1. For example, FIG. 19 is a block diagram illustrating an example of a functional configuration of the solid-state imaging device 1 according to the present embodiment. In FIG. 19, in order to facilitate understanding of features of the solid-state imaging device 1 according to the present embodiment, components related to the generation of the PUF value specific to the solid-state imaging device 1 are illustrated, and the other components are omitted.

As illustrated in FIG. 19, the solid-state imaging device 1 according to the present embodiment includes a sensor unit 511, an information processing unit 512, and a storage unit 513.

The sensor unit 511 corresponds to the pixel array 3 described above with reference to FIG. 1 and performs photoelectric conversion of converting light from the subject into an electric signal.

The information processing unit 512 executes various kinds of processes related to the generation of the PUF value specific to the solid-state imaging device 1. As illustrated in FIG. 19, the information processing unit 512 includes, for example, a block specifying unit 514, a specific information acquiring unit 515, and a specific value calculating unit 516. The operations of the respective components of the information processing unit 512 will be described in connection with a case in which the PUF value is generated and a case in which the PUF value is recalculated. First, operations of associated components will be described in connection with the case in which the PUF value is generated.

The block specifying unit 514 specifies one or more blocks to be used for the generation of the PUF value among a plurality of blocks in which pixels included in at least some regions (for example, the OPB region) among a plurality of pixels constituting the sensor unit 511 are divided in accordance with a predetermined condition. As a specific example, the block specifying unit 514 may specify a block to be used for the generation of the PUF value in accordance with whether or not the pixel value of each block is included in a predetermined range including the average of the pixel values of a plurality of blocks. Then, the block specifying unit 514 stores information related to the specified block in the storage unit 513 to be described later. The block specifying unit 514 corresponds to an example of a "specifying unit."

The specific information acquiring unit 515 acquires the pixel value of each block from a predetermined number or more of blocks to be used for the generation of the PUF value among a plurality of blocks in which the pixels included in the predetermined region (for example, the OPB region) are divided as the specific information. At this time, the specific information acquiring unit 515 may specify the block to be used for the generation of the PUF value on the basis of the information stored in the storage unit 513. Then, the specific information acquiring unit 515 outputs the specific information (that is, the pixel value of each block) acquired from each of the predetermined number or more of blocks to be used for the generation of the PUF value to the specific value calculating unit 516.

The specific value calculating unit 516 acquires the specific information acquired from each of a predetermined number or more of blocks to be used for the generation of the PUF value from the specific information acquiring unit 515, and generates the PUF value on the basis of the acquired specific information. As a specific example, the specific value calculating unit 516 may specify the bit value corresponding to the block in accordance with whether or not the specific information acquired for each block is larger than a predetermined threshold value (for example, an average of the pixel values of the blocks) and generate the PUF value by connecting the bit values specified for each block. The specific value calculating unit 516 corresponds to an example of a "generating unit" that generates (calculates) the value specific to the device.

Further, when the PUF value is generated, the specific value calculating unit 516 may calculate the error correcting code for correcting the error of the PUF value which is separately recalculated using some bit values among the bit values specified for each block and store the error correcting code in the storage unit 513.

As described above, the specific value calculating unit 516 generates the PUF value and outputs the generated PUF value to a predetermined output destination.

The storage unit 513 temporarily or permanently holds various kinds of information used when the components in the solid-state imaging element 1 execute various kinds of processes. For example, the storage unit 513 may be constituted by a non-volatile recording medium (for example, a memory or the like) capable of holding storage content even when no electric power is supplied. For example, the information related to the block to be used for the generation of the PUF value may be stored in the storage unit 513. The storage unit 513 may also store the error correcting code for correcting the error in the PUF value.

Next, operations of associated components will be described in connection with the case in which the PUF value is recalculated.

Similarly to the case in which the PUF value is generated, the specific information acquiring unit 515 acquires the pixel value of each block from a predetermined number or more of blocks to be used for the generation of the PUF value as the specific information. Then, the specific information acquiring unit 515 outputs the specific information acquired from each of a predetermined number or more of blocks to be used for the generation of the PUF value to the specific value calculating unit 516.

The specific value calculating unit 516 recalculates the PUF value on the basis of the specific information of each block acquired from the specific information acquiring unit 515, similarly to the case in which the PUF value is generated. At this time, in a case in which the error correcting code for correcting the error in the PUF value is stored in the storage unit 513, the specific value calculating unit 516 performs the error correction of the recalculated PUF value on the basis of the error correcting code. Then, the specific value calculating unit 516 outputs the recalculated PUF value to the predetermined output destination.

The example of the functional configuration of the solid-state imaging device 1 according to the present embodiment has been described with reference to FIG. 19 focusing on, particularly, the parts related to the generation and the recalculation of the PUF value specific to the solid-state imaging device 1.

4.4. Process

Next, a process related to the generation and the recalculation of the PUF value specific to the solid-state imaging device 1 will be described as an example of a flow of a series of processes of the solid-state imaging device 1 according to the present embodiment.

First, an example of a process related to the generation of the PUF value will be described with reference to FIG. 20. FIG. 20 is a flowchart illustrating an example of a flow of a series of processes of the solid-state imaging device 1 according to the present embodiment, and illustrates a flow of the process related to the generation of the PUF value.

As illustrated in FIG. 20, the solid-state imaging device 1 (the block specifying unit 514) specifies a predetermined number or more (at least one or more) of blocks to be used for the generation of the PUF value among a plurality of blocks into which pixels included in a predetermined region among a plurality of pixels constituting the sensor unit 511 are divided (S501). Then, the solid-state imaging device 1 stores the information related to the specified blocks (for example, information indicating the position of the block) in a predetermined storage region (S503).

Then, the solid-state imaging device 1 (the specific information acquiring unit 515) acquires the pixel value of each block from the blocks specified to be used for generation of the PUF value on the basis of the information stored in the predetermined storage region as the specific information. Then, the solid-state imaging device 1 (specific value calculating unit 516) generates the PUF value on the basis of the specific information acquired from each of the predetermined number or more of blocks to be used. As a specific example, the solid-state imaging device 1 specifies the bit value corresponding to the block in accordance with whether or not the specific information acquired for each block is larger than a predetermined threshold value and generates the PUF value by connecting the bit values specified for each block (S507).

Further, the solid-state imaging device 1 (the specific value calculating unit 516) may calculates the error correcting code for correcting the error of the PUF value which is separately recalculated using some bit values among the bit values specified for each block. In this case, the solid-state imaging device 1 may store the calculated error correcting code in a predetermined storage region (S507).

As described above, the PUF value is generated, and the generated PUF value is output to a predetermined output destination.

The example of the process related to the generation of the PUF value has been described above with reference to FIG. 20.

Next, an example of a process related to the recalculation of PUF value will be described with reference to FIG. 21. FIG. 21 is a flowchart illustrating an example of a flow of a series of processes of the solid-state imaging device 1 according to the present embodiment, and illustrates a flow of a process related to the recalculation of PUF value.

As illustrated in FIG. 21, first, the solid-state imaging device 1 (the specific information acquiring unit 515) specifies the position of the block to be used for the generation of the PUF value on the basis of the information stored in the predetermined storage region (S511).

Then, the solid-state imaging device 1 (the specific information acquiring unit 515) acquires the pixel value of each block from the block specified to be used for the generation of the PUF value as the specific information. Then, the solid-state imaging device 1 (specific value calculating unit 516) recalculates the PUF value on the basis of the specific information acquired from each of the predetermined number or more of blocks to be used, similarly to the case in which the PUF value is generated (S513).

Further, in a case in which the error correcting code for correcting the error in the PUF value is stored in the predetermined storage region, the solid-state imaging device 1 (the specific information acquiring unit 515) may correct the error in the PUF value recalculated on the basis of the error correcting code (S515).

As described above, the PUF value is recalculated, and the recalculated PUF value is output to a predetermined output destination.

The example of the process related to the recalculation of PUF value has been described above with reference to FIG. 21.

4.5. Evaluation

As described above, the solid-state imaging device 1 according to the present embodiment specifies at least one or more blocks among a plurality of blocks set by dividing pixels included in at least some region (for example, the OPB region) in the imaging plane in which a plurality of pixels are arranged as a block used for the generation of the PUF value. Each block includes at least one or more pixels. Then, the solid-state imaging device 1 generates the value specific to the solid-state imaging device 1 (that is, the PUF value) on the basis of the pixel value of the pixel included in the specified block and the variations in the pixel values of the pixels of a plurality of blocks.

With the above-described configuration, the value specific to the solid-state imaging device 1 is generated using the physical feature (that is, the hardware feature) of the solid-state imaging device 1 that is difficult to copy. Therefore, it is possible to use the specific value as, for example, the identifier identifying each device or the key information of the encryption process or the like. Further, in a case in which the value specific to the solid-state imaging device 1 is generated through the above-described configuration, and the specific value is used as the identifier or the key information, it is possible to satisfy the conditions of the reproducibility or the individual difference sufficiently necessary for the identifier or the key information.

The above example is merely an example, and if it is a physical feature that is able to be detected for each pixel 2, and it is possible to satisfy the conditions of the reproducibility or the individual difference necessary for the PUF value, the physical characteristic is not necessarily limited to only the variation in the threshold voltage Vth of the amplifying transistor Tr 13. For example, a physical characteristic of transistors other than the amplifying transistor Tr 13 among the transistors constituting the pixel 2 may be used, and the physical feature is not necessarily limited to only the variation in the threshold voltage Vth. As a specific example, a result of detecting a noise occurring due to a device such as a so-called random telegraph signal (RTS) may be used for the generation of the PUF value.

5. Application Examples

Next, application examples of the solid-state imaging device according to an embodiment of the present disclosure will be described.

5.1. Application Example to Biometric Authentication

An example in which the solid-state imaging device 1 according to an embodiment of the present disclosure is applied to biometric authentication using so-called biometric information will be described as an application example of the disclosure according to the technology. In the present setting, "biometric information" refers to information indicating characteristics of a human body such as an iris, a fingerprint, a vein, a face, a handprint, a voiceprint, a pulse wave, and a retina.

Configuration Example 1: Example of Configuration of Performing Biometric Authentication in Solid-State Imaging Device First, an example of a functional configuration of an imaging device to which a solid-state imaging device according to the present application example is applied will be described with reference to FIG. 20 in connection with, particularly, an example of performing biometric authentication in the solid-state imaging device. FIG. 20 is an explanatory diagram for describing an application example of the technology according to an embodiment of the present disclosure, that is, a block diagram illustrating an example of a schematic functional configuration of an imaging device according to the present application example.

As illustrated in FIG. 20, an imaging device 710a according to the present application example includes a solid-state imaging element 711a and a main processor 731a.

The solid-state imaging element 711a corresponds to the solid-state imaging device 1 according to the embodiment of the present disclosure described above. As illustrated in FIG. 20, the solid-state imaging element 711a includes a sensor unit 712, an information processing unit 713, a storage unit 719, and an information output unit 720. Although not illustrated in FIG. 20, the solid-state imaging element 711a may have a register interface that performs transmission and reception of a setting value with the outside. Here, examples of the "outside" include a recording medium that stores image information generated by an image sensor, a network for transmitting the image information, an imaging device body such as a main processor or a digital camera that processes the image information, a personal computer (PC), a mobile terminal, a game machine, a non-contact type IC card such as FeliCa (a registered trademark), and a USB memory.

The sensor unit 712 corresponds to the pixel array 3 described above with reference to FIG. 1 and performs photoelectric conversion of converting light from the subject into an electric signal.

The information processing unit 713a performs processing on the acquired information as necessary. As illustrated in FIG. 20, the information processing unit 713a includes, for example, an image information acquiring unit 714, a biometric information acquiring unit 715, a biometric determining unit 741, a biometric authenticating unit 742, a specific information acquiring unit 716, a specific value calculating unit 717, and an encryption processing unit 718.

On the basis of the light of the subject imaged by the user, the image information acquiring unit 714 performs analog-to-digital conversion (A/D conversion) of converting an electric signal obtained by performing photoelectric conversion through the sensor unit 712 from an analog signal to a digital signal, and acquires the image information.

The biometric information acquiring unit 715 acquires biometric information by performing A/D conversion on the electrical signal obtained by performing the photoelectric conversion through sensor unit 712 on the basis of the light of the subject imaged to perform biometric authentication of the user.

The specific information acquiring unit 716 acquires information specific to the device constituting the solid-state imaging element 711 (hereinafter also referred to as "specific information"). For example, the specific information acquiring unit 716 may acquire the pixel values of one or more pixels included in at least some regions (for example, the OPB region) among a plurality of pixels constituting the sensor unit 712 as the specific information as described above in the second embodiment. Further, at this time, the specific information acquiring unit 716 may specify a pixel serving as a specific information acquisition target or a block including one or more pixels on the basis of, for example, the information previously held in the storage unit 719 to be described later.

The specific value calculating unit 717 generates (or calculates) the value specific to the solid-state imaging element 711 on the basis of a predetermined function (for example, the PUF) using the specific information acquired by the specific information acquiring unit 716 as an input. As a specific example, the specific value calculating unit 717 generates the PUF value specific to the solid-state imaging element 711 using a pixel value of a predetermined pixel acquired as the specific information as described above in the second embodiment as an input.

The biometric determining unit 751 determines whether or not the biometric information acquired by the biometric information acquiring unit 715 is able to authenticate the user.

The biometric authenticating unit 752 compares the biometric information determined to be able to authenticate the user with reference information stored in a predetermined storage region (for example, the storage unit 719 to be described later), and authenticates whether or not the user is eligible to use. For example, the reference information may be encrypted on the basis of the value specific to the solid-state imaging element 711 (for example, PUF value) generated by the specific value calculating unit 717. In this case, the biometric authenticating unit 752 may acquire the value specific to the solid-state imaging element 711 from the specific value calculating unit 717 and decrypt the reference information on the basis of the obtained value.

The encryption processing unit 718 encrypts the biometric authentication information authenticated as a person who is eligible to use, generates encrypted information, and transmits the encrypted information to the information output unit 720. For example, the key information for the encryption may be encrypted on the basis of the value specific to the solid-state imaging element 711 (for example, PUF value) generated by the specific value calculating unit 717. In this case, the encryption processing unit 718 may acquire the value specific to the solid-state imaging element 711 from the specific value calculating unit 717 and decrypt the key information on the basis of the acquired value.

The information output unit 720 outputs various kinds of information output from the information processing unit 713a to the outside of the solid-state imaging element 711a, and includes, for example, an output switching unit 721 and an image information output unit 722.

The output switching unit 721 switches information which is output to the outside of the solid-state imaging element 711a in accordance with a type of information input from the information processing unit 713a. In other words, the output switching unit 721 has a role of a switch switching an output destination. Since the solid-state imaging element 711a is equipped with the output switching unit 721, it is possible for the user to select whether image information to be described below or encrypted information is output.

For example, in a case in which the output switching unit 721 selects to output the encrypted information, the output switching unit 721 performs control such that the encrypted information (for example, encrypted biometric authentication information) generated by the encryption processing unit 718 is transmitted to the main processor 731a via a register interface (not illustrated) or the like.

In a case in which the image information is selected to be output by the output switching unit 721, the image information output unit 722 receives the image information acquired by the image information acquiring unit 714, and outputs the image information to the outside of the solid-state imaging element 711a.

The main processor 731a receives the image information or the encrypted information from the solid-state imaging element 711a, and executes various kinds of processes in accordance with a type of received information. As illustrated in FIG. 20, the main processor 731a includes a main control unit 732, an image information input unit 733, and a development processing unit 734.

The main control unit 732 controls the operations of the components of the imaging device 710a. For example, in order to cause the solid-state imaging element 711a to execute respective functions, the main control unit 732 transmits control signals corresponding to the functions to the solid-state imaging element 711a. Further, in order to implement respective functions of the main processor 731a, the main control unit 732 transmits control signals corresponding to the function to the respective units in the main processor 731a.

The image information input unit 733 acquires the image information output from the solid-state imaging element 711a in accordance with the control signal given from the main control unit 732.

The development processing unit 734 performs the development process on the output image on the basis of the image information acquired from the solid-state imaging element 711a by the image information input unit 733 in accordance with the control signal from the main control unit 732.

The example of the functional configuration of the imaging device to which the solid-state imaging device according to the present application example is applied has been described above with reference to FIG. 20 in connection with, particularly, the example of performing the biometric authentication in the solid-state imaging device.

Configuration Example 2: Example of Configuration of Encrypting and Outputting Biometric Information Next, an example of a functional configuration of an imaging device to which the solid-state imaging device according to the present application example is applied will be described with reference to FIG. 21 in connection with, particularly, an example in which the encryption process is performed on the biometric information acquired by the solid-state imaging device and output to the outside. FIG. 21 is an explanatory diagram for describing an application example of the technology according to the present disclosure, that is, a block diagram illustrating another example of a schematic functional configuration of the imaging device according to the present application example. In the present description, a functional configuration of an imaging device 710b illustrated in FIG. 21 will be described focusing on, particularly, a difference from the imaging device 710a described above with reference to FIG. 20, and detailed description of substantially similar parts to those of the imaging device 710a will be omitted.

As illustrated in FIG. 21, the imaging device 710b according to the present application example includes a solid-state imaging element 711b and a main processor 731b. The solid-state imaging element 711b and the main processor 731b correspond to the solid-state imaging element 711a and the main processor 731a in the imaging device 710a illustrated in FIG. 20. In the example illustrated in FIG. 21, in order to facilitate understanding of features, components related to a process on the biometric information are mainly illustrated, and components related to a process on the image information described above are not illustrated. Therefore, for example, similarly to the example illustrated in FIG. 20, in the example illustrated in FIG. 21, components such as an image information acquiring unit 714, an output switching unit 721, an image information output unit 722, and an image information input unit 733 are provided.

As illustrated in FIG. 21, the solid-state imaging element 711b includes a sensor unit 712, an information processing unit 713b, an encrypted information output unit 723, and a storage unit 719. Further, the information processing unit 713b includes, for example, a biometric information acquiring unit 715, a specific information acquiring unit 716, a specific value calculating unit 717, and an encryption processing unit 718. The sensor unit 712, the storage unit 719, the biometric information acquiring unit 715, the specific information acquiring unit 716, and the specific value calculating unit 717 are substantially similar to the sensor unit 712, the storage unit 719, the biometric information acquiring unit 715, the specific information acquiring unit 716, and the specific value calculating unit 717 in the imaging device 710a illustrated in FIG. 20.

The encryption processing unit 718 encrypts the biometric information (image information of, for example, an iris, a fingerprint, a vein, a face, a handprint, a voiceprint, a pulse wave, a retina, or the like) acquired by the biometric information acquiring unit 715 to generate the encrypted information and transmits the encrypted information to the encrypted information output unit 723. For example, the key information for the encryption may be encrypted on the basis of the value specific to the solid-state imaging element 711 (for example, PUF value) generated by the specific value calculating unit 717. In this case, the encryption processing unit 718 may acquire the value specific to the solid-state imaging element 711 from the specific value calculating unit 717 and decrypt the key information on the basis of the acquired value.

The encrypted information output unit 723 receives the encrypted information generated by performing the encryption process on the biometric information through the encryption processing unit 718, and outputs the encrypted information to the outside of the solid-state imaging element 711b.

The main processor 731b includes a main control unit 732, an encrypted information input unit 736, a development processing unit 734, and a biometric authenticating unit 735.

The main control unit 732 controls the operations of the components of the imaging device 710b. For example, in order to cause the solid-state imaging element 711b to execute respective functions, the main control unit 732 transmits control signals corresponding to the functions to the solid-state imaging element 711b. Further, in order to implement respective functions of the main processor 731b, the main control unit 732 transmits control signals corresponding to the function to the respective units in the main processor 731b.

The encrypted information input unit 736 acquires the encrypted information output from the solid-state imaging element 711b in accordance with the control signal from the main control unit 732.

The development processing unit 734 decrypts the encrypted information acquired from the solid-state imaging element 711b by the encrypted information input unit 736 in accordance with the control signal given from the main control unit 732, and performs the development process on the output image used for the biometric authentication on the basis of the biometric information (image information) obtained as a result of decryption. Preferably, as the key information for decrypting the encrypted information, the same information as the key information used for the generation of the encrypted information is acquired in advance and stored in a predetermined storage region. Then, the development processing unit 734 outputs the output image obtained as a result of the current process to the biometric authenticating unit 735.

The biometric authenticating unit 735 determines whether or not the output image output from the development processing unit 734 is able to authenticate the user. The biometric authenticating unit 735 compares the output image (that is, the biometric information) determined to be able to authenticate the user with the reference information stored in the predetermined storage region, and authenticates whether or not the user is eligible to use.

The example of the functional configuration of the imaging device to which the solid-state imaging device according to the present application example is applied has been described above with reference to FIG. 21 in connection with, particularly, the example in which the encryption process is performed on the biometric information acquired by the solid-state imaging device and output to the outside.

Configuration Example 3: Another Example of Configuration of Encrypting and Outputting Biometric Information Next, another example of a functional configuration of an imaging device to which the solid-state imaging device according to the present application example is applied will be described with reference to FIG. 22 in connection with, particularly, an example in which the encryption process is performed on the biometric information acquired by the solid-state imaging device and output to the outside. FIG. 22 is an explanatory diagram for describing an application example of the technology according to the present disclosure, that is, a block diagram illustrating another example of a schematic functional configuration of the imaging device according to the present application example. In the present description, a functional configuration of an imaging device 710c illustrated in FIG. 22 will be described focusing on, particularly, a difference from the imaging device 710b described above with reference to FIG. 20, and detailed description of substantially similar parts to those of the imaging device 710b will be omitted.

As illustrated in FIG. 22, the imaging device 710c according to the present application example includes a solid-state imaging element 711c and a main processor 731c. The solid-state imaging element 711c and the main processor 731c correspond to the solid-state imaging element 711b and the main processor 731b in the imaging device 710b illustrated in FIG. 21. In the example illustrated in FIG. 22, in order to facilitate understanding of features, components related to a process on the biometric information are mainly illustrated, and components related to a process on the image information described above are not illustrated. Therefore, for example, similarly to the example illustrated in FIG. 20, in the example illustrated in FIG. 22, components such as an image information acquiring unit 714, an output switching unit 721, an image information output unit 722, and an image information input unit 733 are provided.

As illustrated in FIG. 22, the solid-state imaging element 711c includes a sensor unit 712, an information processing unit 713c, an encrypted information output unit 723, and a storage unit 719. Further, the information processing unit 713c includes, for example, a biometric information acquiring unit 715, a specific information acquiring unit 716, a specific value calculating unit 717, and an encryption processing unit 718.

An example illustrated in FIG. 22 differs from the example illustrated in FIG. 22 in that a value specific to a solid-state imaging element 711c (for example, a PUF value) generated by the specific value calculating unit 717 is used as the key information for performing the encryption process on the biometric information acquired by the biometric information acquiring unit 715. In other words, in the solid-state imaging element 711c illustrated in FIG. 22, an operation of the encryption processing unit 718 is different from that in the solid-state imaging element 711b illustrated in FIG. 21, and the other components are substantially similar to those in the solid-state imaging element 711b.

In other words, the encryption processing unit 718 generates the encrypted information by encrypting the biometric information acquired by the biometric information acquiring unit 715 using the value specific to the solid-state imaging element 711c generated by the specific value calculating unit 717 as the key information, and transmits the encrypted information to the encrypted information output unit 723.

In addition, the encrypted information output unit 723 receives the encrypted information generated by performing the encryption process on the biometric information through the encryption processing unit 718, and outputs the encrypted information to the outside of the solid-state imaging element 711c.

The encrypted information input unit 736 acquires the encrypted information output from the solid-state imaging element 711c in accordance with the control signal from the main control unit 732.

The development processing unit 734 decrypts the encrypted information acquired from the solid-state imaging element 711c by the encrypted information input unit 736 in accordance with the control signal given from the main control unit 732, and performs the development process on the output image used for the biometric authentication on the basis of the biometric information (image information) obtained as a result of decryption. Preferably, the key information for decrypting the encrypted information, that is, the value specific to the solid-state imaging element 711c (for example, the PUF value) is acquired in advance and stored in a predetermined storage region. Then, the development processing unit 734 outputs the output image obtained as a result of the current process to the biometric authenticating unit 735.

A subsequent process is similar to that of the imaging device 710b described with reference to FIG. 21.

As described above, in the solid-state imaging element 711c illustrated in FIG. 22, it is not necessary to store the key information used for encrypting the biometric information in the storage region of the solid-state imaging element 711c. Therefore, according to the solid-state imaging element 711c illustrated in FIG. 22, it is possible to further improve the security related to the protection of the biometric information as compared with the solid-state imaging element 711b described with reference to FIG. 21.

The example of the functional configuration of the imaging device to which the solid-state imaging device according to the present application example is applied has been described with reference to FIG. 22 in connection with, particularly, another example in which the encryption process is performed on the biometric information acquired by the solid-state imaging device and output to the outside.

5.2. Application Example to Biometric Authentication System

Next, an application example to a so-called biometric authentication system in which the biometric information obtained by the solid-state imaging device 1 according to an embodiment of the present disclosure is transferred to a server via a network, and the biometric authentication is performed in the server will be described as an application example of the technology according to the present disclosure.

System Configuration

First, an example of a schematic system configuration of a biometric authentication system according to the present application example will be described with reference to FIG. 23. FIG. 23 is an explanatory diagram for describing one application example of the technology according to the present disclosure, that is, a block diagram illustrating an example of a schematic system configuration of a biometric authentication system.

As illustrated in FIG. 23, a biometric authentication system 800 according to the present application example includes an imaging device 810 and a server 850. Further, the biometric authentication system 800 may include a terminal device 890. The imaging device 810, the server 850, and the terminal device 890 are configured to be able to perform transmission and reception of information with one another via a predetermined network N880. A type of network N880 connecting the imaging device 810, the server 850, and the terminal device 890 is not particularly limited. For example, the network N880 may be configured with the Internet, a dedicated line, a local area network (LAN), a wide area network (WAN), or the like. Further, the network N880 may be configured with a wireless network or may be constituted by a wired network. Further, the network N880 may include a plurality of networks, and at least a part thereof may be configured as a wired network. Further, a network connecting the respective device may be set individually. As a specific example, a network connecting the imaging device 810 with the server 850 and a network connecting the server 850 with the terminal device 890 may be configured as different networks.

On the basis of this configuration, in the biometric authentication system 800 according to the present application example, for example, the biometric information obtained by imaging the subject through the imaging device 810 is transmitted from the imaging device 810 to the server 850, and the biometric authentication based on the biometric information is performed by the server 850. Then, for example, the server 850 executes various kinds of processes in accordance with a result of the biometric authentication, and transmits a result of performing the process to the terminal device 890 (for example, a smartphone or the like) of the user who is specified on the basis of the result of the biometric authentication. With this configuration, the user is able to confirm results of various kinds of processes performed in accordance with the result of the biometric authentication based on the imaging result obtained by the imaging device 810 through the terminal device 890 held by the user.

Next, examples of functional configurations of the imaging device 810 and the server 850 among the devices included in the biometric authentication system 800 according to the present application example will be described below.

Functional Configuration of Imaging Device 810

First, an example of a functional configuration of the imaging device 810 according to the present application example will be described with reference to FIG. 24. FIG. 24 is an explanatory diagram for describing an application example of the technology according to the present disclosure, that is, a block diagram illustrating an example of a schematic functional configuration of the imaging device 810 constituting the biometric authentication system.

As illustrated in FIG. 24, the imaging device 810 according to the present application example includes a solid-state imaging element 811, a main processor 831, and a communication unit 841.

The communication unit 841 is a component for enabling the imaging device 810 to perform transmission and reception of various kinds of information with other devices via a predetermined network. The communication unit 841 may include, for example, a communication antenna, a radio frequency (RF) circuit, a baseband processor, and the like in a case in which transmission and reception of various kinds of information are performed with an external device via a wireless network. In the following description, in the case in which each component of the imaging device 810 performs transmission and reception of information with other devices, the transmission and reception of the information are assumed to be performed though the communication unit 841 unless otherwise set forth herein.

The solid-state imaging element 811 corresponds to the solid-state imaging device 1 according to the embodiment of the present disclosure described above. As illustrated in FIG. 24, the solid-state imaging element 811 includes a sensor unit 812, an information processing unit 813, a storage unit 819, and an information output unit 820. Although not illustrated in FIG. 24, the solid-state imaging element 811 may have a register interface that performs transmission and reception of a setting value with the outside. Here, examples of the "outside" include a recording medium that stores image information generated by an image sensor, a network for transmitting the image information, an imaging device body such as a main processor or a digital camera that processes the image information, a personal computer (PC), a mobile terminal, a game machine, a non-contact type IC card such as FeliCa (a registered trademark), and a USB memory.

The sensor unit 812 corresponds to the pixel array 3 described above with reference to FIG. 1 and performs photoelectric conversion of converting light from the subject into an electric signal.

The information processing unit 813 processes the acquired information as necessary. As illustrated in FIG. 24, the information processing unit 813 includes, for example, an image information acquiring unit 814, a biometric information acquiring unit 815, a specific information acquiring unit 816, a specific value calculating unit 817, and an encryption processing unit 818. The image information acquiring unit 814, the biometric information acquiring unit 815, the specific information acquiring unit 816, and the specific value calculating unit 817 are similar to the image information acquiring unit 714, the biometric information acquiring unit 715, the specific information acquiring unit 716, and the specific value calculating unit 717 which have been described above with reference to FIG. 20, and thus detailed description thereof is omitted.

The encryption processing unit 818 generates the encrypted information by performing an encryption process based on a predetermined condition on the biometric information of the user acquired by the biometric information acquiring unit 815, and transmits the encrypted information to the information output unit 820. At this time, for example, the encryption processing unit 818 may use the value specific to the solid-state imaging element 811 (for example, the PUF value) generated by the specific value calculating unit 817 as the encryption key. Further, the encryption processing unit 818 may use key information (for example, a common key or the like) used in an existing encryption scheme as the encryption key. Further, in the case in which the key information used in the existing encryption scheme is used, the components for generating the value specific to the solid-state imaging element 811 (for example, the specific information acquiring unit 816 and the specific value calculating unit 817) do not have to be disposed.

The storage unit 819 is configured with a non-volatile recording medium (for example, a memory or the like) capable of holding storage content even when electric power is not supplied, and temporarily or permanently hold various kinds of information used when the components in the solid-state imaging element 811 perform various kinds of processes. For example, the specific information acquiring unit 816 holds information identifying a pixel (or a block including one or more pixels) serving as the specific information acquisition target in the storage unit 819 in advance.

The information output unit 820 outputs various kinds of information output from the information processing unit 813 to the outside of the solid-state imaging element 811, and includes, for example, an output switching unit 821, an image information output unit 822, an encrypted information output unit 823.

The output switching unit 821 switches information which is output to the outside of the solid-state imaging element 811 in accordance with a type of information input from the information processing unit 813. In other words, the output switching unit 721 has a role of switching an output destination. Since the solid-state imaging element 811 is equipped with the output switching unit 821, it is possible to selectively switch an output of any one of the image information acquired by the image information acquiring unit 814 and the encrypted information obtained by encrypting the biometric information acquired by the biometric information acquiring unit 815.

In a case in which the image information is selected to be output by the output switching unit 821, the image information output unit 822 receives the image information acquired by the image information acquiring unit 814, and outputs the image information to the outside of the solid-state imaging element 811.

Further, in a case in which the encrypted information is selected to be output by the output switching unit 821, the encrypted information output unit 823 receives the encrypted information generated by performing the encryption process on the biometric information through the encryption processing unit 818, and outputs the encrypted information to the outside of the solid-state imaging element 811.

The main processor 831 receives the image information or the encrypted information from the solid-state imaging element 811, and executes various kinds of processes in accordance with a type of received information. As illustrated in FIG. 24, the main processor 831 includes a main control unit 832, an image information input unit 833, a development processing unit 834, an encrypted information input unit 835, and an encrypted information transfer unit 836.

The main control unit 832 controls the operations of the components of the imaging device 810. For example, in order to cause the solid-state imaging element 811 to execute respective functions, the main control unit 832 transmits control signals corresponding to the functions to the solid-state imaging element 811. Further, in order to implement respective functions of the main processor 831, the main control unit 832 transmits control signals corresponding to the function to the respective units in the main processor 831.

The image information input unit 833 acquires the image information output from the solid-state imaging element 811 in accordance with the control signal given from the main control unit 832.

The development processing unit 834 performs the development process on the output image on the basis of the image information acquired from the solid-state imaging element 811 by the image information input unit 833 in accordance with the control signal given from the main control unit 832. Further, the development processing unit 834 may transmit the output image acquired by the development process to other devices (for example, the server 850 or the terminal device 890 illustrated in FIG. 23) connected via a predetermined network.

The encrypted information input unit 835 acquires the encrypted information output from the solid-state imaging element 811 in accordance with the control signal from the main control unit 832.

The encrypted information transfer unit 836 transmits the encrypted information acquired from the solid-state imaging element 811 by the encrypted information input unit 835 to a predetermined device (for example, the server 850, or the like) connected via a predetermined network in accordance with the control signal given from the main control unit 832.

The configuration illustrated in FIG. 24 is merely an example, and the configuration of the imaging device 810 is not necessarily limited to the example illustrated in FIG. 24 as long as the functions of the imaging device 810 can be implemented.

For example, in the example illustrated in FIG. 24, the image information output unit 822 and the encrypted information output unit 823 are separately disposed, but the image information output unit 822 and the encrypted information output unit 823 may be integrally configured. In other words, if the main processor 831 is able to determine a type of information output from the solid-state imaging element 811 and selectively switch the process in accordance with the type of information to be output, an output unit that output the image information and the encrypted information may be shared. In this case, the image information input unit 833 and the encrypted information input unit 835 may be integrally configured.

Further, some of the components of the imaging device 810 illustrated in FIG. 24 may be externally attached to the outside of the imaging device 810.

An example of the functional configuration of the imaging device 810 according to the present application example has been described above with reference to FIG. 24.

Functional Configuration of Server 850

Next, an example of a functional configuration of the server 850 according to the present application example will be described with reference to FIG. 25. FIG. 25 is an explanatory diagram for describing an application example of the technology according to the present disclosure, that is, a block diagram illustrating an example of a schematic functional configuration of the server 850 constituting the biometric authentication system.

As illustrated in FIG. 25, the server 850 according to the present application example includes a communication unit 851, an information processing unit 852, and a storage unit 857.

The communication unit 851 is a component for enabling the server 850 to perform transmission and reception of various kinds of information with other devices via a predetermined network. The communication unit 851 may include, for example, a communication antenna, an RF circuit, a baseband processor, and the like in a case in which transmission and reception of various kinds of information are performed with an external device via a wireless network. In the following description, in the case in which each component of the server 850 performs transmission and reception of information with other devices, the transmission and reception of the information are assumed to be performed though the communication unit 851 unless otherwise set forth herein.

The information processing unit 852 decrypts the encrypted information transmitted from another device and executes the biometric authentication on the basis of the biometric information obtained as a result of decryption. Further, the information processing unit 852 may execute various kinds of processes in accordance with a result of the biometric authentication. As illustrated in FIG. 25, the information processing unit 852 includes, for example, a decryption processing unit 853, a biometric determining unit 854, a biometric authenticating unit 855, and a process executing unit 856.

The decryption processing unit 853 decrypts encrypted original information (for example, the biometric information) by performing the decryption process on the encrypted information transmitted from another device (for example, the imaging device 810) on the basis of key information corresponding to a transmission source of the encrypted information.

A value specific to each device serving as a transmission source (for example, the solid-state imaging element 811) such as the PUF value may be used as the key information to be used for decrypting the encrypted information, for example. The value specific to each device is generated in advance when the device is manufactured or the like but may be stored in a region (for example, a storage unit 857 described later) that is readable by the decryption processing unit 853.

As another example, key information (for example, a common key or the like) used in an existing encryption scheme may be used as the key information used for decrypting the encrypted information.

The biometric determining unit 854 determines whether or not the acquired biometric information is able to authenticate the user.

The biometric authenticating unit 855 compares the biometric information determined to be able to authenticate the user with the reference information stored in a predetermined storage region (for example, the storage unit 857 to be described later), and authenticates whether or not the user is eligible to use.

The process executing unit 856 executes various kinds of functions (for example, an application) provided by the server 850. For example, the process executing unit 856 may extract a predetermined application from a predetermined storage unit (for example, the storage unit 857 to be described later) in accordance with a result of performing the biometric authentication by the biometric authenticating unit 855 and execute the extracted application. Further, the process executing unit 856 may specify the user in accordance with the result of performing the biometric authentication and transmit information according to a result of executing the application to the terminal device 890 corresponding to the specified user.

The storage unit 857 temporarily or permanently holds various kinds of information used when the components of the server 850 execute various kinds of processes. The storage unit 857 may be configured with a non-volatile recording medium (for example, memory or the like) capable of holding storage content even when electric power is not supplied. Further, at least a part of the storage unit 857 may be configured with a volatile recording medium.

As a specific example, the storage unit 857 may hold information serving as a key for decrypting the encrypted information transmitted from the imaging device 810. As the information, for example, information indicating the specific value (for example, the PUF value) generated in advance for each imaging device 810 (more specifically, the solid-state imaging element 811) may be used.

As another example, the storage unit 857 may hold the reference information to be compared with the biometric information at the time of biometric authentication. Further, the storage unit 857 may hold data (for example, a library) for executing various types of applications and management data for managing various kind of settings or the like.

The configuration illustrated in FIG. 25 is merely an example, and the configuration of the server 850 is not necessarily limited to the example illustrated in FIG. 25 as long as the above-described functions of the server 850 can be implemented. As a specific example, some of the components of the server 850 illustrated in FIG. 25 may be externally attached to the outside of the server 850. Further, as another example, the functions of the server 850 described above may be implemented by a distribution process performed by a plurality of devices.

An example of the functional configuration of the server 850 according to the present application example has been described above with reference to FIG. 25.

Evaluation

As described above, in the biometric authentication system 800 according to the present application example, the biometric information acquired by the solid-state imaging element 811 of the imaging device 810 is output to the outside of the solid-state imaging element 811 as the encrypted information which has undergone the encryption process. Therefore, in a case in which a component outside the solid-state imaging element 811 is a device in the imaging device 810 and does not held the key information for decryption, it is difficult to decrypt the encrypted information output from the solid-state imaging element 811. In other words, in the biometric authentication system 800, the biometric information acquired by the solid-state imaging element 811 is propagated as the encrypted information in a path in which it is output from the solid-state imaging element 811 and then received by the server 850.

It is possible to use the value specific to each individual solid-state imaging element 811 which is generated (or calculated) using a physical characteristic that is difficult to copy such as the PUF value as the key information for encrypting the biometric information.

With the above configuration, according to the biometric authentication system 800 of the present application example, it is possible to further improve the security related to the protection of the biometric information of the user acquired as a result of performing imaging through the imaging device 810.

<5.3. Application Example to Mobile Object>

The technology (present technology) according to an embodiment of the present disclosure is applicable to a variety of products. For example, the technology according to an embodiment of the present disclosure is implemented as devices mounted on any type of mobile objects such as automobiles, electric vehicles, hybrid electric vehicles, motorcycles, bicycles, personal mobilities, airplanes, drones, ships, and robots.

FIG. 26 is a block diagram illustrating a schematic configuration example of a vehicle control system which is an example of a mobile object control system to which a technology according to an embodiment of the present technology is applicable.

A vehicle control system 12000 includes a plurality of electronic control units connected via a communication network 12001. In the example illustrated in FIG. 26, the vehicle control system 12000 includes a drive line control unit 12010, a body system control unit 12020, a vehicle outside information detection unit 12030, a vehicle inside information detection unit 12040, and an integrated control unit 12050. In addition, as functional configurations of the integrated control unit 12050, a microcomputer 12051, an audio and image output section 12052, an in-vehicle network interface (I/F) 12053.

The drive line control unit 12010 controls the operation of devices related to the drive line of the vehicle in accordance with a variety of programs. For example, the drive line control unit 12010 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like.

The body system control unit 12020 controls the operations of a variety of devices attached to the vehicle body in accordance with a variety of programs. For example, the body system control unit 12020 functions as a control device for a keyless entry system, a smart key system, a power window device, or a variety of lights such as a headlight, a backup light, a brake light, a blinker, or a fog lamp. In this case, the body system control unit 12020 can receive radio waves transmitted from a portable device that serves instead of the key or signals of a variety of switches. The body system control unit 12020 receives these radio waves or signals, and controls the vehicle door lock device, the power window device, the lights, or the like.

The vehicle outside information detection unit 12030 detects information regarding the outside of a vehicle on which the vehicle control system 12000 is mounted. For example, an imaging section 12031 is connected to the vehicle outside information detection unit 12030. The vehicle outside information detection unit 12030 causes the imaging section 12031 to capture an image outside of the vehicle and receives the captured image. The vehicle outside information detection unit 12030 may perform an object detection process or a distance detection process for a person, a vehicle, an obstacle, a sign, letters on a road, or the like on the basis of the received image.

The imaging section 12031 is a light sensor that receives light and outputs an electric signal in accordance with the amount of received light. The imaging section 12031 can output the electric signal as an image or distance measurement information. In addition, the light received by the imaging section 12031 may be the visible light or may be non-visible light such as infrared light.

The vehicle inside information detecting unit 12040 detects information on the inside of the vehicle. The vehicle inside information detecting unit 12040 is connected, for example, to a driver state detecting section 12041 that detects the state of the driver. The driver state detecting section 12041 may include, for example, a camera that images the driver. The vehicle inside information detecting unit 12040 may compute the degree of the driver's tiredness or the degree of the driver's concentration or determine whether the driver have a doze, on the basis of detection information input from the driver state detecting section 12041.

For example, the microcomputer 12051 can calculate a control target value of the driving force generating device, the steering mechanism, or the braking device on the basis of information acquired by the vehicle outside information detecting unit 12030 or the vehicle inside information detecting unit 12040 on the inside and outside of the vehicle, and output a control instruction to the drive line control unit 12010. For example, the microcomputer 12051 may perform cooperative control for the purpose of executing the functions of an advanced driver assistance system (ADAS) including vehicle collision avoidance or impact reduction, follow-up driving based on the inter-vehicle distance, constant vehicle speed driving, vehicle collision warning, vehicle lane departure warning, or the like.

Further, the microcomputer 12051 can control the driving force generating device, the steering mechanism, the braking device, or the like on the basis of information acquired by the vehicle outside information detecting unit 12030 or the vehicle inside information detecting unit 12040 on the areas around the vehicle, thereby performing cooperative control for the purpose of automatic driving or the like that allows the vehicle to autonomously travel irrespective of any operation of a driver.

In addition, the microcomputer 12051 can output a control instruction to the body system control unit 12020 on the basis of the information regarding the outside of the vehicle acquired by the vehicle outside information detection unit 12030. For example, the microcomputer 12051 can control a head lamp in accordance with the position of a preceding vehicle or an oncoming vehicle detected by the vehicle outside information detection unit 12030 and can perform cooperative control for the purpose of anti-glaring such as switching a high beam to a low beam.

The audio and image output section 12052 transmits an output signal of at least one of a sound and an image to an output device capable of visually or aurally notifying a passenger of the vehicle or the outside of the vehicle of information. In the example of FIG. 26, an audio speaker 12061, a display section 12062, and an instrument panel 12063 are exemplified as the output device. For example, the display section 12062 may include at least one of an onboard display and a head-up display.

FIG. 27 is a diagram illustrating an example of an installation position of the imaging section 12031.

In FIG. 27, the vehicle 12100 includes imaging sections 12101, 12102, 12103, 12104, and 12105 as the imaging section 12031.

Imaging sections 12101, 12102, 12103, 12104, and 12105 are positioned, for example, at the front nose, a side mirror, the rear bumper, the back door, and the upper part of the windshield in the vehicle compartment of a vehicle 12100. The imaging section 12101 attached to the front nose and the imaging section 12105 attached to the upper part of the windshield in the vehicle compartment chiefly acquire images of the area ahead of the vehicle 12100. The imaging sections 12102 and 12103 attached to the side mirrors chiefly acquire images of the areas on the sides of the vehicle 12100. The imaging section 12104 attached to the rear bumper or the back door chiefly acquires images of the area behind the vehicle 12100. The image of the front side obtained by the imaging sections 12101 and 12105 is used chiefly to detect a preceding vehicle, a pedestrian, an obstacle, a traffic light, a traffic sign, a lane, or the like.

Additionally, FIG. 27 illustrates an example of the imaging ranges of the imaging sections 12101 to 12104. An imaging range 12111 represents the imaging range of the imaging section 12101 attached to the front nose. Imaging ranges 12112 and 12113 respectively represent the imaging ranges of the imaging sections 12102 and 12103 attached to the side mirrors. An imaging range 12114 represents the imaging range of the imaging section 12104 attached to the rear bumper or the back door. For example, overlaying image data captured by the imaging sections 12101 to 12104 offers an overhead image that looks down on the vehicle 12100.

At least one of the imaging sections 12101 to 12104 may have a function of acquiring distance information. For example, at least one of the imaging sections 12101 to 12104 may be a stereo camera including a plurality of image sensors or may be an image sensor that includes pixels for phase difference detection.

For example, the microcomputer 12051 can extract a 3-dimensional object traveling at a predetermined speed (for example, 0 or more km/h) in substantially the same direction as the vehicle 12100 as a preceding vehicle by particularly using a closest 3-dimensional object on a travel road of the vehicle 12100 by obtaining a distance to each 3-dimensional object within the imaging ranges 12111 to 12114 and a temporal change in the distance (a relative speed to the vehicle 12100) on the basis of distance information obtained from the imaging sections 12101 to 12104. Further, the microcomputer 12051 can set an inter-vehicle distance to be ensured in advance before a preceding vehicle and perform automatic brake control (also including follow-up stop control) or automatic acceleration control (also including follow-up oscillation control). In this way, it is possible to perform cooperative control for the purpose of automatic driving or the like that allows the vehicle to autonomously travel irrespective of any operation of a driver.

For example, the microcomputer 12051 can classify and extract 3-dimensional object data regarding 3-dimensional objects as other 3-dimensional objects such as motorcycles, normal vehicles, large vehicles, pedestrians, and electric poles on the basis of the distance information obtained from the imaging sections 12101 to 12104 and can use the other 3-dimensional objects to automatically avoid obstacles. For example, the microcomputer 12051 identifies obstacles around the vehicle 12100 as obstacles which can be viewed by a driver of the vehicle 12100 and obstacles which are difficult to view. Then, the microcomputer 12051 can determine a collision risk indicating a danger of collision with each obstacle and output a warning to the driver via the audio speaker 12061 or the display section 12062 in a situation in which there is a collision possibility since the collision risk is set to be equal to or greater than a set value or can perform driving assistance for collision avoidance by performing forced deceleration or avoidance steering iv via the drive line control unit 12010.

At least one of the imaging sections 12101 to 12104 may be an infrared camera that detects infrared light. For example, the microcomputer 12051 can recognize a pedestrian by determining whether there is the pedestrian in captured images of the imaging sections 12101 to 12104. The pedestrian can be recognized, for example, in a procedure in which feature points are extracted in the captured images of the imaging sections 12101 to 12104 serving as infrared cameras and a procedure in which a series of feature points indicating a contour of an object are subjected to a pattern matching process to determine whether there is the pedestrian. The microcomputer 12051 determines that there is the pedestrian in the captured images of the imaging sections 12101 to 12104. When the pedestrian is recognized, the audio and image output section 12052 controls the display section 12062 such that a rectangular contour line for emphasis is superimposed to be displayed on the recognized pedestrian. In addition, the audio and image output section 12052 controls the display section 12062 such that an icon or the like indicating the pedestrian is displayed at a desired position.

The example of the vehicle control system to which the technology according to the present disclosure can be applied has been described above. The technology according to the present disclosure can be applied to the imaging section 12031 in the above-described configuration. Specifically, the solid-state imaging device 1 illustrated in FIG. 1 can be applied to the imaging section 12031. When the technology according to the present disclosure is applied to the imaging section 12031, for example, it is possible to encrypt various types of information (for example, image information obtained as an imaging result or the like) acquired by the imaging section 12031 in the imaging section 12031 on the basis of the information specific to the device (the solid-state imaging device). Accordingly, for example, it is possible to further improve the security related to the protection of the information acquired by the imaging section 12031.

6. Conclusion

As described above, according to the embodiment of the present disclosure, the solid-state imaging device 1 which is capable of generating the specific information used for the encryption process without leaking out to the outside and completing the encryption process internally is provided. Since the solid-state imaging device 1 according to the embodiment of the present disclosure generates the specific information used for the encryption process without leaking out to the outside and completes the encryption process internally, it is possible to generate the specific information with a high degree of security and perform an extremely secure encryption process.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

It should be understood by those skilled in the art that various modifications, combinations, sub-combinations and alterations may occur depending on design requirements and other factors insofar as they are within the scope of the appended claims or the equivalents thereof.

It should be noted that the present technology may take the following configurations.

(1) A solid-state imaging device adapted to encrypt data, the solid-state imaging device comprising:
a sensor die comprising an array of imaging pixels formed on a first side of the sensor die and first wiring layers formed on a second side of the sensor die, wherein at least one of the imaging pixels is configured to generate specific signals;
a logic die comprising second wiring layers formed on a first side of the logic die; and
an encryption processor on the logic die configured to generate encrypted data using the specific signals, wherein the first side of the logic die is mounted adjacent to the second side of the sensor die and the first wiring layers electrically connect to the second wiring layers, wherein the at least one of the imaging pixels, the encryption processor, and a connecting conductor in which the specific signals pass through from the at least one of the imaging pixels to the encryption processor are located interior to the solid-state imaging device.

(2) The solid-state imaging device of (1), further comprising a specific information acquisition unit on the logic die and arranged to receive the specific signals from the sensor die.

(3) The solid-state imaging device of (1) or (2), further comprising a specific value calculator on the logic die and arranged to calculate a specific value from the specific signals and provide the specific value to the encryption processor, wherein the encryption processor is configured to generate the encrypted data using the specific value.

(4) The solid-state imaging device of any one of (1) through (3), wherein the specific signals are noise signals that include noise generated from at least one transistor in the sensor die.

(5) The solid-state imaging device of any one of (1) through (3), wherein the specific signals are noise signals that include noise generated from at least one photodiode of an imaging pixel on the sensor die.

(6) The solid-state imaging device of any one of (1) through (3), wherein the specific signals are dark current signals that include dark current from at least one photodiode located in a optically black region of the array of imaging pixels.

(7) The solid-state imaging device of any one of (1) through (6), further comprising a specific value calculator on the logic die and arranged to calculate a specific value from the specific signals, wherein the encryption processor is arranged to encrypt biometric information for authenticating a user using the specific value.

(8) The solid-state imaging device of any one of (1) through (7), wherein the connecting conductor comprises a first contact hole filled with a conductor that electrically connects to a second contact hole filled with a conductor.

(9) The solid-state imaging device of any one of (1) through (7), wherein the connecting conductor comprises a single contact hole filled with a conductor having a first portion that electrically connects to the first wiring layer and a second portion that electrically connects to the second wiring layer.

(10) The solid-state imaging device of any one of (1) through (7), wherein the connecting conductor comprises a first wiring contact of the first wiring layer that is in direct contact with a second wiring contact of the second wiring layer.

(11) A solid-state imaging device adapted to encrypt data, the solid-state imaging device comprising:
a sensor die comprising an array of imaging pixels, wherein at least one of the imaging pixels is configured to generate specific signals;
a logic die comprising an encryption processor, wherein the logic die is mounted adjacent to the sensor die and is configured to generate an encryption key using, at least in part, the specific signals received from the sensor die, wherein the at least one of the imaging pixels, the encryption processor, and a connecting conductor in which the specific signals pass through from the at least one of the imaging pixels to the encryption processor are located interior to the solid-state imaging device.

(12) The solid-state imaging device of (11), wherein the specific signals are noise signals that include noise generated from at least one transistor in the sensor die.

(13) The solid-state imaging device of (11), wherein the specific signals are noise signals that include noise generated from at least one photodiode of an imaging pixel on the sensor die.

(14) The solid-state imaging device of (11), wherein the specific signals are dark current signals that include dark current from at least one photodiode located in a optically black region of the array of imaging pixels.

(15) The solid-state imaging device of any one of (11) through (14), further comprising a specific value calculator on the logic die configured to generate a specific value from the specific signals and provide the specific value to the encryption processor.

(16) The solid-state imaging device of any one of (11) through (15), further comprising a biometric authenticator on the logic die arranged to receive a specific value from the specific value calculator and to receive biometric data for authenticating a user.

(17) The solid-state imaging device of (16), wherein the biometric authenticator is further configured to decrypt reference data using the specific value and compare the decrypted reference data with the biometric data.

(18) The solid-state imaging device of any one of (15) through (17), wherein the encryption processor is further configured to encrypt the biometric data using the specific value.

(19) The solid-state imaging device of any one of (16) through (18), wherein the biometric data comprises data specific to the user and acquired with the array of imaging pixels.

(20) A solid-state imaging device adapted to encrypt data, the solid-state imaging device comprising:
an array of pixels, wherein at least one of imaging pixels is configured to generate specific signals; and
an encryption processor configured to generate encrypted data using the specific signals, wherein the at least one of the imaging pixels, the encryption processor, and a path in which the specific signals pass through from the at least one of the imaging pixels to the encryption processor are located interior to the solid-state imaging device.

(21)
A solid-state imaging device, including:
a specific information generating unit configured to generate predetermined analog information;
a specific value generating unit configured to generate a predetermined specific value based on the predetermined analog information; and
an encryption processing unit configured to perform an encryption process using the predetermined specific value, in which the specific information generating unit, the specific value generating unit, and the encryption processing unit are covered by a predetermined layer.

(22)
The solid-state imaging device according to (21), in which two or more semiconductor substrates are joined.

(23)
The solid-state imaging device according to (22), in which the semiconductor substrates include a first semiconductor substrate on which a pixel region including at least a pixel array and the specific information generating unit are formed, and a second semiconductor substrate on which at least a logic circuit is formed.

(24)
The solid-state imaging device according to (23), in which the encryption processing unit is formed in the logic circuit.

(25)
The solid-state imaging device according to (23) or (24), in which a wiring of the first semiconductor substrate and a wiring of the second semiconductor substrate are directly joined.

(26)
The solid-state imaging device according to (25), in which the wiring is a copper wiring.

(27)
The solid-state imaging device according to any one of (21) to (26), in which the specific value generating unit includes a detecting unit configured to convert the predetermined analog information into digital information, and
a specific value calculating unit configured to calculate the predetermined specific value using the digital information.

(28)
The solid-state imaging device according to (27), in which the specific value calculating unit selects a piece of the digital information to be used for a calculation of the predetermined specific value from a plurality of pieces of the digital information.

(29)
The solid-state imaging device according to any one of (21) to (27), further including, a drive control unit configured to drive the specific information generating unit.

(30)
The solid-state imaging device according to (29), in which the drive control unit performs control such that driving performed in a case of outputting image data is different from driving performed in a case of outputting the predetermined analog information.

(31)
The solid-state imaging device according to (30), in which the drive control unit performs control such that a bias current used for the driving in a case of outputting the image data is different from a bias current used for the driving in a case of outputting the predetermined analog information.

(32)
The solid-state imaging device according to any one of (29) to (31), in which the drive control unit performs control such that driving in a case of driving the pixel region is different from driving in a case of driving the specific information generating unit.

(33)
The solid-state imaging device according to any one of (21) to (32), in which the specific information generating unit is shielded from external light.

(34)
The solid-state imaging device according to any one of (21) to (33), in which the specific value generating unit removes a noise component occurred when the predetermined specific value is generated.

(35)
The solid-state imaging device according to any one of (21) to (34), in which the predetermined analog information is information which does not serve as a basis of image data.

(36)
A specific value generation method of a solid-state imaging device, the method including:
generating, by a specific information generating unit, predetermined analog information;
generating, by a specific value generating unit, a predetermined specific value based on the predetermined analog information; and
performing, by an encryption processing unit, an encryption process using the predetermined specific value,
in which the specific information generating unit, the specific value generating unit, and the encryption processing unit are covered by a predetermined layer.

(37)
A stack type solid-state imaging device, including:
an imaging unit configured to generate a pixel signal;
a specific information generating unit configured to generate predetermined analog information; and
an encryption processing unit configured to perform an encryption process on the pixel signal using a predetermined specific value based on the predetermined analog information,
in which the imaging unit and the specific information generating unit are included in a first semiconductor substrate, and the encryption processing unit is included in a second semiconductor substrate.

(38)
A stack type solid-state imaging device, including:
a first pixel configured to generate a pixel signal in accordance with incident light;
a second pixel being covered with a light shielding section and configured to generate predetermined analog information; and
an encryption processing unit configured to perform an encryption process on the pixel signal using a predetermined specific value based on the predetermined analog information in which the first pixel and the second pixel are included in a first semiconductor substrate, and the encryption processing unit is included in a second semiconductor substrate.

(39)
A stack type solid-state imaging device, including:
an imaging unit configured to generate a pixel signal; and an encryption processing unit configured to perform an encryption process on the pixel signal,
in which the imaging unit is included in a first semiconductor substrate, and the encryption processing unit is included in a second semiconductor substrate.

(40)
The stack type solid-state imaging device according to any one of (37) to (39), in which the first semiconductor substrate and the second semiconductor substrate are joined.

(41)
The stack type solid-state imaging device according to (40), in which a wiring of the first semiconductor substrate and a wiring of the second semiconductor substrate are directly joined.

(42)
The stack type solid-state imaging device according to (41), in which the wiring is a copper wiring.

(43)
The stack type solid-state imaging device according to any one of (37) to (39), further including,
a third semiconductor substrate including a memory unit.

(44)
The stack type solid-state imaging device according to (43), in which the third semiconductor substrate is disposed between the first semiconductor substrate and the second semiconductor substrate.

REFERENCE SIGNS LIST 1 solid-state imaging device
2 pixel
3 pixel array
4 vertical driving circuit
5 column signal processing circuit
6 horizontal driving circuit
7 output circuit
8 control circuit
9 vertical signal line
10 horizontal signal line
11 semiconductor substrate
12 input/output terminal
101 control unit
111 pixel array unit
112 selecting unit
114 constant current circuit unit
121 pixel
122 pixel
131 switch
132 switch
133 switch
141 comparator
143 counter
151 comparator
153 counter
161 MOS transistor
162 MOS transistor

The invention claimed is:
1. A solid-state imaging device adapted to encrypt data, the solid-state imaging device comprising:
a sensor die comprising an array of imaging pixels formed on a first side of the sensor die and first wiring layers formed on a second side of the sensor die, wherein at least one of the imaging pixels is configured to generate specific signals, the specific signals being based on a physically unclonable function, the specific signals not output as an imaging result of the solid-state imaging device, wherein generating the specific signals not output as the imaging result of the solid-state imaging device comprises:
reading stored position information for each pixel block of a plurality of pixel blocks configured to generate pixel values that are not included within a range surrounding an average pixel value; and
using the stored position information for each pixel block, acquiring a respective pixel value for the pixel block;
a logic die comprising second wiring layers formed on a first side of the logic die; and
an encryption processor on the logic die configured to generate encrypted data using the specific signals, wherein the first side of the logic die is mounted adjacent to the second side of the sensor die and the first wiring layers electrically connect to the second wiring layers, wherein the at least one of the imaging pixels, the encryption processor, and a connecting conductor in which the specific signals pass through from the at least one of the imaging pixels to the encryption processor are located interior to the solid-state imaging device.

2. The solid-state imaging device of claim 1, further comprising a specific information acquisition unit on the logic die and arranged to receive the specific signals from the sensor die.

3. The solid-state imaging device of claim 1, further comprising a specific value calculator on the logic die and arranged to calculate a specific value from the specific signals and provide the specific value to the encryption processor, wherein the encryption processor is configured to generate the encrypted data using the specific value.

4. The solid-state imaging device of claim 3, wherein the specific signals are noise signals that include noise generated from at least one transistor in the sensor die.

5. The solid-state imaging device of claim 3, wherein the specific signals are noise signals that include noise generated from at least one photodiode of an imaging pixel on the sensor die.

6. The solid-state imaging device of claim 3, wherein the specific signals are dark current signals that include dark current from at least one photodiode located in a optically black region of the array of imaging pixels.

7. The solid-state imaging device of claim 1, further comprising a specific value calculator on the logic die and arranged to calculate a specific value from the specific signals, wherein the encryption processor is arranged to encrypt biometric information for authenticating a user using the specific value.

8. The solid-state imaging device of claim 1, wherein the connecting conductor comprises a first contact hole filled with a conductor that electrically connects to a second contact hole filled with a conductor.

9. The solid-state imaging device of claim 1, wherein the connecting conductor comprises a single contact hole filled with a conductor having a first portion that electrically connects to the first wiring layer and a second portion that electrically connects to the second wiring layer.

10. The solid-state imaging device of claim 1, wherein the connecting conductor comprises a first wiring contact of the first wiring layer that is in direct contact with a second wiring contact of the second wiring layer.

11. A solid-state imaging device adapted to encrypt data, the solid-state imaging device comprising:
a sensor die comprising an array of imaging pixels, wherein at least one of the imaging pixels is configured to generate specific signals, the specific signals being based on a physically unclonable function, the specific signals not output as an imaging result of the solid-state imaging device, wherein generating the specific signals not output as the imaging result of the solid-state imaging device comprises:
reading stored position information for each pixel block of a plurality of pixel blocks configured to generate pixel values that are not included within a range surrounding an average pixel value; and
using the stored position information for each pixel block, acquiring a respective pixel value for the pixel block;
a logic die comprising an encryption processor, wherein the logic die is mounted adjacent to the sensor die and is configured to generate an encryption key using, at least in part, the specific signals received from the sensor die, wherein the at least one of the imaging pixels, the encryption processor, and a connecting conductor in which the specific signals pass through from the at least one of the imaging pixels to the encryption processor are located interior to the solid-state imaging device.

12. The solid-state imaging device of claim 11, wherein the specific signals are noise signals that include noise generated from at least one transistor in the sensor die.

13. The solid-state imaging device of claim 11, wherein the specific signals are noise signals that include noise generated from at least one photodiode of an imaging pixel on the sensor die.

14. The solid-state imaging device of claim 11, wherein the specific signals are dark current signals that include dark current from at least one photodiode located in a optically black region of the array of imaging pixels.

15. The solid-state imaging device of claim 11, further comprising a specific value calculator on the logic die configured to generate a specific value from the specific signals and provide the specific value to the encryption processor.

16. The solid-state imaging device of claim 15, further comprising a biometric authenticator on the logic die arranged to receive a specific value from the specific value calculator and to receive biometric data for authenticating a user.

17. The solid-state imaging device of claim 16, wherein the biometric authenticator is further configured to decrypt reference data using the specific value and compare the decrypted reference data with the biometric data.

18. The solid-state imaging device of claim 17, wherein the encryption processor is further configured to encrypt the biometric data using the specific value.

19. The solid-state imaging device of claim 16, wherein the biometric data comprises data specific to the user and acquired with the array of imaging pixels.

20. A solid-state imaging device adapted to encrypt data, the solid-state imaging device comprising:
an array of imaging pixels, wherein at least one of the imaging pixels is configured to generate specific signals, the specific signals being based on a physically unclonable function, the specific signals not output as an imaging result of the solid-state imaging device, wherein generating the specific signals not output as the imaging result of the solid-state imaging device comprises:
reading stored position information for each pixel block of a plurality of pixel blocks configured to generate pixel values that are not included within a range surrounding an average pixel value; and using the stored position information for each pixel block, acquiring a respective pixel value for the pixel block; and an encryption processor configured to generate encrypted data using the specific signals, wherein the at least one of the imaging pixels, the encryption processor, and a path in which the specific signals pass through from the at least one of the imaging pixels to the encryption processor are located interior to the solid-state imaging device.

* * * * *